(12) United States Patent
Hunzinger et al.

(10) Patent No.: US 9,367,797 B2
(45) Date of Patent: Jun. 14, 2016

(54) METHODS AND APPARATUS FOR SPIKING NEURAL COMPUTATION

(76) Inventors: Jason Frank Hunzinger, Escondido, CA (US); Vladimir Aparin, San Diego, CA (US)

( * ) Notice: Subject to any disclaimer, the term of this patent is extended or adjusted under 35 U.S.C. 154(b) by 322 days.

(21) Appl. No.: 13/369,080

(22) Filed: Feb. 8, 2012

(65) Prior Publication Data

US 2013/0204820 A1    Aug. 8, 2013

(51) Int. Cl.
*G06N 3/04* (2006.01)
*G06N 3/08* (2006.01)

(52) U.S. Cl.
CPC . *G06N 3/049* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 6,363,369 B1 | 3/2002 | Liaw et al. | |
| 6,496,815 B1 | 12/2002 | Kawashima | |
| 6,581,046 B1 | 6/2003 | Ahissar | |
| 6,618,712 B1 | 9/2003 | Parker et al. | |
| 7,430,546 B1 | 9/2008 | Suri | |
| 7,657,313 B2 | 2/2010 | Rom | |
| 7,958,071 B2 | 6/2011 | Snider et al. | |
| 2010/0076916 A1 | 3/2010 | Van Der Made et al. | |
| 2010/0312736 A1 | 12/2010 | Kello | |
| 2011/0035215 A1 | 2/2011 | Sompolinsky et al. | |
| 2011/0235914 A1 | 9/2011 | Izhikevich et al. | |
| 2013/0204814 A1 | 8/2013 | Hunzinger et al. | |
| 2013/0204819 A1 | 8/2013 | Hunzinger et al. | |

OTHER PUBLICATIONS

Wang, R. et al. "A programmable axonal propagation delay circuit for time-delay spiking neural networks." Circuits and Systems (ISCAS), 2011 IEEE International Symposium on. pp. 869-872, May 2011.*
Schrauwen B., et al,. "Extending SpikeProp," Neural Networks, 2004. Proceedings. 2004 IEEE International Joint Conference on, vol. 1, no., pp. 475, Jul. 25-29, 2004,001: 10.1109/IJCNN.2004. 1379954.*
Abbott, L. F. "Balancing homeostasis and learning in neural circuits." Zoology 106.4 (2003): 365-371.*
Paugam-Moisy, H. et al. Computing with spiking neuron networks. G. Rozenberg, T. Back, J. Kok (Eds.), Handbook of Natural Computing, Springer-Verlag (2010) [retrieved Oct. 23, 2013]. [retrieved online from link.springer.com].*

(Continued)

*Primary Examiner* — Kakali Chaki
*Assistant Examiner* — Eric Nilsson
(74) *Attorney, Agent, or Firm* — Rubit M. Patel; Howard Seo

(57) ABSTRACT

Certain aspects of the present disclosure provide methods and apparatus for spiking neural computation of general linear systems. One example aspect is a neuron model that codes information in the relative timing between spikes. However, synaptic weights are unnecessary. In other words, a connection may either exist (significant synapse) or not (insignificant or non-existent synapse). Certain aspects of the present disclosure use binary-valued inputs and outputs and do not require post-synaptic filtering. However, certain aspects may involve modeling of connection delays (e.g., dendritic delays). A single neuron model may be used to compute any general linear transformation x=AX+BU to any arbitrary precision. This neuron model may also be capable of learning, such as learning input delays (e.g., corresponding to scaling values) to achieve a target output delay (or output value). Learning may also be used to determine a logical relation of causal inputs.

29 Claims, 27 Drawing Sheets

(56) References Cited

OTHER PUBLICATIONS

Jolivet, R. et al. "Generalized integrate-and-fire models of neuronal activity approximate spike trains of a detailed model to a high degree of accuracy." Journal of neurophysiology 92.2 (2004): 959-976.*

Cichocki, A. et al. "Neural networks for solving systems of linear equations and related problems." Circuits and Systems I: Fundamental Theory and Applications, IEEE Transactions on. vol. 39 No. 2 pp. 124-138, 1992.*

Eliasmith, C., "A Unified Approach to Building and Controlling Spiking Attractor Networks," Neural Computation, 2005, vol. 17, pp. 1276-1314.

Eliasmith, et al., "Neural Engineering: Computation, Representation and Dynamics in Neurobiological Systems," MIT Press, Jan. 2003, 85 pages.

Kello, et al., "Critical branching neural computation," The 2010 International Joint Conference on Neural Networks (IJCNN), Jul. 18-23, 2010, pp. 1-7.

Ghosh-Dastidar S., et al., "Third generation Neural Networks: Spiking Neural Networks, "Advances in Intelligent and Soft Computing. vol. 116, 2009, pp. 167-178 [retrieved Oct. 23, 2013]. [Retrieved from link.springer.com].

Paugam-Moisy H., et al., "Computing with spiking neuron networks, "Handbook of Natural Computing, Springer-Verlag (2010) [retrieved Oct. 23, 2013], [retrieved online from link.springer.com].

Pfister J., et al., "Optimal Spike-Timing-Dependent Plasticity for Precise Action Potential Firing in Supervised Learning," Neural Computing, vol. 18, No. 6, Apr. 28, 2006, pp. 1318-1348. [retrieved Oct. 23, 2013]. [retrieved online from ebscohost.com].

Abbott L.F., "Balancing homeostasis and learning in neural circuits", Zoology, Elsevier, Amsterdam, NL, vol. 106, No. 4, Jan. 1, 2003, pp. 365-371, XP004956539, ISSN: 0944-2006, DOI: 10.1078/0944-2006-00133.

Arena, P., et al., "STDP with adaptive synaptic delay for robot navigation control", Proceedings of SPIE, vol. 6592, May 18, 2007, XP055049378, ISSN: 0277-786X, DOI: 10.1117/12.724204 pp. 65920J-1-pp. 65920J-9, paragraph 3.

Bako L., et al., "Hardware Implementation of Delay-Coded Spiking-RBF Neural Network for Unsupervised Clustering," in 11th International Conference on Optimization of Electrical and Electronic Equipment (OPTIM), 2008, pp. 51-56.

Brette R., "Adaptive Exponential Integrate-and-Fire Model as an Effective description of Neuronal Activity", Journal of Neurophysiology, vol. 94, No. 5, Nov. 1, 2005, pp. 3637-3642, XP055071140, ISSN: 0022-3077, DOI: 10.1152/jn.00686.2005.

Gruning A., et al., "Supervised Learning of Logical Operations in Layered Spiking Neural Networks with Spike Train Encoding", Neural Processing Letters, Kluwer Academic Publishers, BO, vol. 36, No. 2, May 15, 2012, pp. 117-134, XP035108697, ISSN: 1573-773X, DOI: 10.1007/S11063-012-9225-1.

Ijichi H., et al., "Analysis of m:n. Lockings from Pulse-Coupled Asynchronous Sequential Logic Spiking Neurons", IEICE Transactions on Fundamentals of Electronics,Communications and Computer Sciences, Engineering Sciences Society, Tokyo, JP, vol. E94A, No. 11, Nov. 1, 2011, pp. 2384-2393, XP001572119, ISSN: 0916-8508, DOI: 10.1587/TRANSFUN.E94.A.2384 [retrieved on Nov. 1, 2011].

International Search Report and Written Opinion—PCT/US2013/025219—ISA/EPO—Jul. 23, 2013.

Pham D.T., et al., "A self-organising spiking neural network trained using delay adaptation", Industrial Electronics, 2007. ISIE 2007. IEEE International Symposium on, IEEE, P1, Jun. 1, 2007, pp. 3441-3446, XP031156706, ISBN: 978-1-42440754-5.

Schmitt M., "On computing Boolean functions by a spiking neuron", Annals of Mathematics and Artificial Intelligence, Kluwer Academic Publishers, DO, vol . 24, No. 1-4, Mar. 1, 1998, pp. 181-191, XP019228258, ISSN: 1573-7470, DOI: 10.1023/A:1018953300185.

Wang R., et al., "A programmable axonal propagation delay circuit for time-delay spiking neural networks", Circuits and Systems (ISCAS), 2011 IEEE International Symposium on, IEEE, May 15, 2011, pp. 869-872, XP031997769, DOI: 10.1109/ISCAS.2011.5937704 ISBN: 978-1-4244-9473-6.

Schrauwen B., et al,. "Extending SpikeProp," Neural Networks, 2004. Proceedings. 2004 IEEE International Joint Conference on , vol. 1, no., pp. 475, Jul. 25-29, 2004, DOI: 10.1109/IJCNN.2004.1379954.

Watanabe M., et al "A dynamic neural network with temporal coding and functional connectivity" , Biological cybernetics, 1998, vol. 78 (2), pp. 87-93.

* cited by examiner

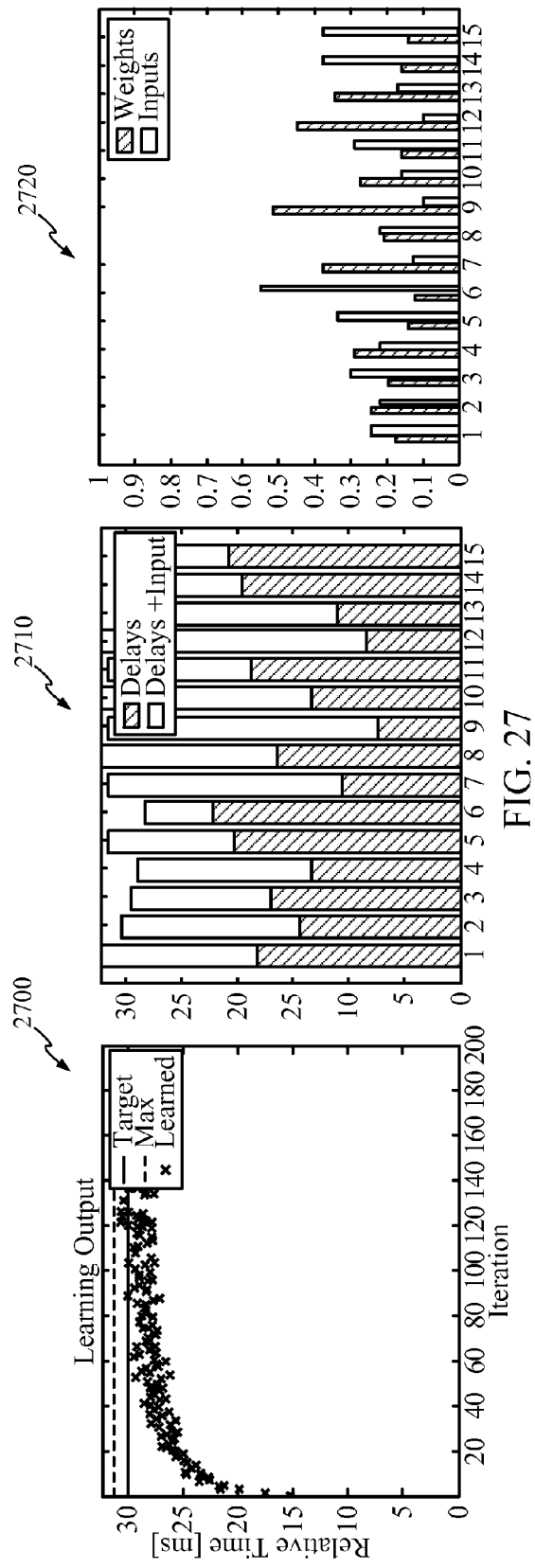
FIG. 27
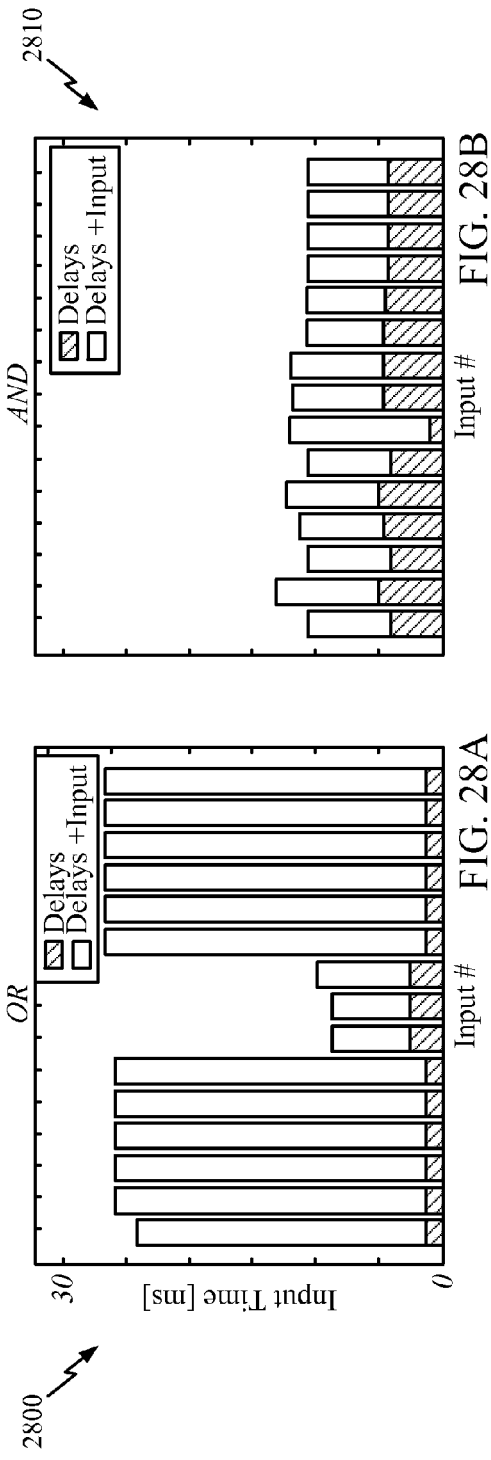
FIG. 28B
FIG. 28A

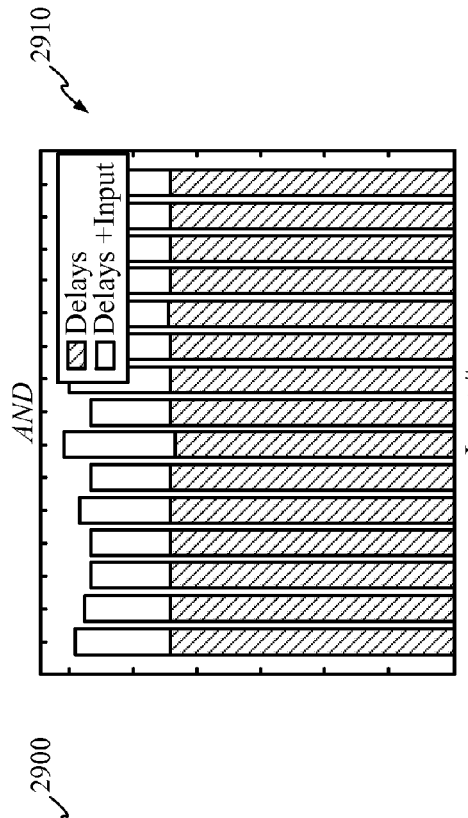
FIG. 29A
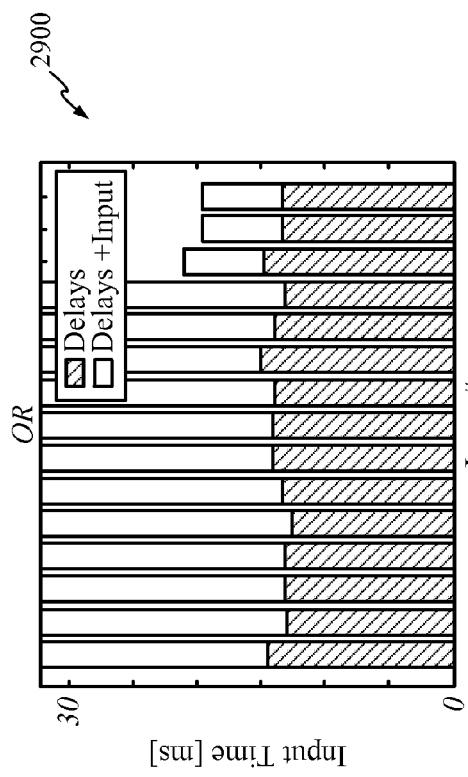
FIG. 29B
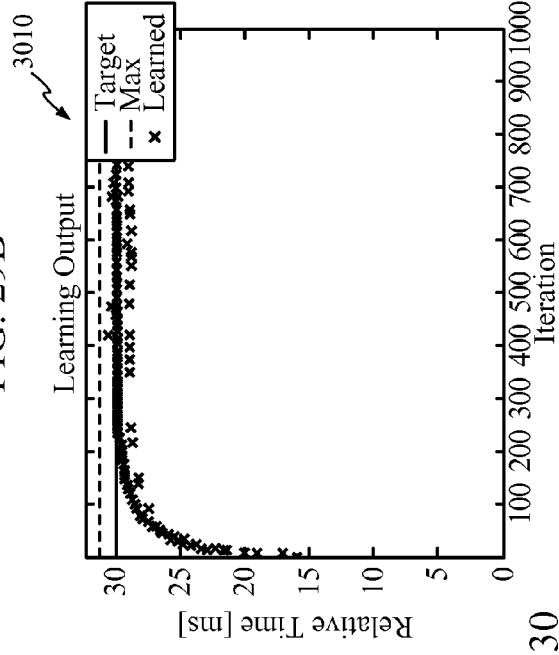
FIG. 30
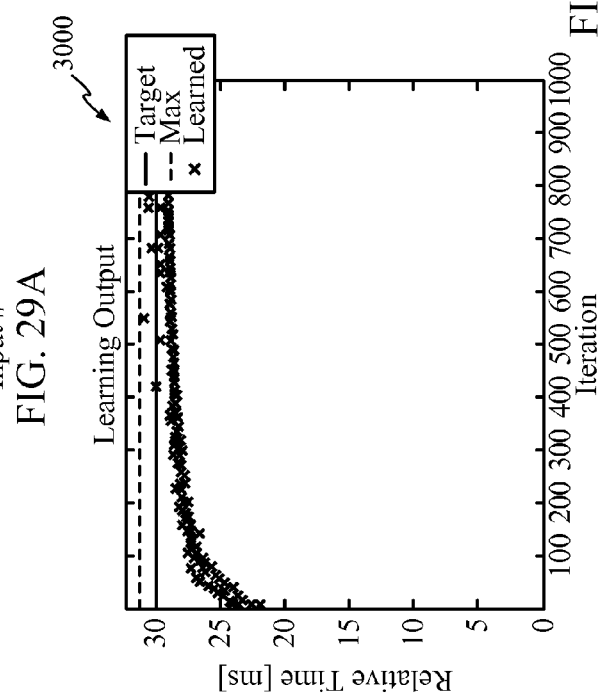

METHODS AND APPARATUS FOR SPIKING NEURAL COMPUTATION

CROSS-REFERENCE TO RELATED APPLICATIONS

This application is related to U.S. patent application Ser. No. 13/368,994, filed Feb. 8, 2012 and entitled "METHODS AND APPARATUS FOR SPIKING NEURAL COMPUTATION," and to U.S. patent application Ser. No. 13/369,095, filed Feb. 8, 2012 and entitled "METHODS AND APPARATUS FOR SPIKING NEUTRAL COMPUTATION," which are both herein incorporated by reference.

BACKGROUND

1. Field

Certain aspects of the present disclosure generally relate to neural networks and, more particularly, to operating a spiking neural network composed of one or more neurons, wherein a single neuron is capable of computing any general transformation to any arbitrary precision.

2. Background

An artificial neural network is a mathematical or computational model composed of an interconnected group of artificial neurons (i.e., neuron models). Artificial neural networks may be derived from (or at least loosely based on) the structure and/or function of biological neural networks, such as those found in the human brain. Because artificial neural networks can infer a function from observations, such networks are particularly useful in applications where the complexity of the task or data makes designing this function by hand impractical.

One type artificial neural network is the spiking neural network, which incorporates the concept of time into its operating model, as well as neuronal and synaptic state, thereby increasing the level of realism in this type of neural simulation. Spiking neural networks are based on the concept that neurons fire only when a membrane potential reaches a threshold. When a neuron fires, it generates a spike that travels to other neurons which, in turn, raise or lower their membrane potentials based on this received spike.

Traditionally, information was thought to be coded largely, if not exclusively, in the rate of firing of a neuron. If information is coded in neuron firing rate, there may be significant computational overhead to model neurons with membrane dynamics, spiking events with temporal precision, and spike-timing dependent plasticity (STDP) compared to merely modeling neurons as firing rate transforms with rate-based learning rules, such as the Oja rule.

SUMMARY

Certain aspects of the present disclosure generally relate to spiking neural computation and, more particularly, to using one or more neurons in a spiking neural network, wherein a single neuron is capable of computing any general transformation to any arbitrary precision and wherein information is coded in the relative timing of the spikes.

Certain aspects of the present disclosure provide a method for implementing a spiking neural network. The method generally includes receiving at least one input at a first neuron model; based on the input, determining a relative time between a first output spike time of the first neuron model and a reference time; and emitting an output spike from the first neuron model based on the relative time.

Certain aspects of the present disclosure provide an apparatus for implementing a spiking neural network. The apparatus generally includes a processing unit configured to receive at least one input at a first neuron model; to determine, based on the input, a relative time between a first output spike time of the first neuron model and a reference time; and to emit an output spike from the first neuron model based on the relative time.

Certain aspects of the present disclosure provide an apparatus for implementing a spiking neural network. The apparatus generally includes means for receiving at least one input at a first neuron model; means for determining, based on the input, a relative time between a first output spike time of the first neuron model and a reference time; and means for emitting an output spike from the first neuron model based on the relative time.

Certain aspects of the present disclosure provide a computer-program product for implementing a spiking neural network. The computer-program product generally includes a computer-readable medium having instructions executable to receive at least one input at a first neuron model; to determine, based on the input, a relative time between a first output spike time of the first neuron model and a reference time; and to emit an output spike from the first neuron model based on the relative time.

Certain aspects of the present disclosure provide a method of learning using a spiking neural network. The method generally includes delaying an input spike in a neuron model according to a current delay associated with an input to the neuron model, wherein the input spike occurs at an input spike time relative to a reference time for the neuron model; emitting an output spike from the neuron model based, at least in part, on the delayed input spike; determining an actual time difference between the emission of the output spike from the neuron model and the reference time for the neuron model; and adjusting the current delay associated with the input based on a difference between a target time difference and the actual time difference, the current delay, and an input spike time for the input spike.

Certain aspects of the present disclosure provide an apparatus for learning using a spiking neural network. The apparatus generally includes a processing unit configured to delay an input spike in a neuron model according to a current delay associated with an input to the neuron model, wherein the input spike occurs at an input spike time relative to a reference time for the neuron model; to emit an output spike from the neuron model based, at least in part, on the delayed input; to determine an actual time difference between the emission of the output spike from the neuron model and the reference time for the neuron model; and to adjust the current delay associated with the input based on a difference between a target time difference and the actual time difference, the current delay, and an input spike time for the input spike.

Certain aspects of the present disclosure provide an apparatus for learning using a spiking neural network. The apparatus generally includes means for delaying an input spike in a neuron model according to a current delay associated with an input to the neuron model, wherein the input spike occurs at an input spike time relative to a reference time for the neuron model; means for emitting an output spike from the neuron model based, at least in part, on the delayed input; means for determining an actual time difference between the emission of the output spike from the neuron model and the reference time for the neuron model; and means for adjusting the current delay associated with the input based on a difference between a target time difference and the actual time difference, the current delay, and an input spike time for the input spike.

Certain aspects of the present disclosure provide a computer-program product for learning using a spiking neural network. The computer-program product generally includes a computer-readable medium having instructions executable to delay an input spike in a neuron model according to a current delay associated with an input to the neuron model, wherein the input spike occurs at an input spike time relative to a reference time for the neuron model; to emit an output spike from the neuron model based, at least in part, on the delayed input; to determine an actual time difference between the emission of the output spike from the neuron model and the reference time for the neuron model; and to adjust the current delay associated with the input based on a difference between a target time difference and the actual time difference, the current delay, and an input spike time for the input spike.

Certain aspects of the present disclosure provide a method of learning using a spiking neural network. The method generally includes providing, at each of one or more learning neuron models, a set of logical inputs, wherein a true causal logical relation is imposed on the set of logical inputs; receiving varying timing between input spikes at each set of logical inputs; and for each of the one or more learning neuron models, adjusting delays associated with each of the logical inputs using the received input spikes, such that the learning neuron model emits an output spike meeting a target output delay according to one or more logical conditions corresponding to the true causal logical relation.

Certain aspects of the present disclosure provide an apparatus for learning using a spiking neural network. The apparatus generally includes a processing unit configured to provide, at each of one or more learning neuron models, a set of logical inputs, wherein a true causal logical relation is imposed on the set of logical inputs; to receive varying timing between input spikes at each set of logical inputs; and to adjust, for each of the one or more learning neuron models, delays associated with each of the logical inputs using the received input spikes, such that the learning neuron model emits an output spike meeting a target output delay according to one or more logical conditions corresponding to the true causal logical relation.

Certain aspects of the present disclosure provide an apparatus for learning using a spiking neural network. The apparatus generally includes means for providing, at each of one or more learning neuron models, a set of logical inputs, wherein a true causal logical relation is imposed on the set of logical inputs; means for receiving varying timing between input spikes at each set of logical inputs; and means for adjusting, for each of the one or more learning neuron models, delays associated with each of the logical inputs using the received input spikes, such that the learning neuron model emits an output spike meeting a target output delay according to one or more logical conditions corresponding to the true causal logical relation.

Certain aspects of the present disclosure provide a computer-program product for learning using a spiking neural network. The computer-program product generally includes a computer-readable medium having instructions executable to provide, at each of one or more learning neuron models, a set of logical inputs, wherein a true causal logical relation is imposed on the set of logical inputs; to receive varying timing between input spikes at each set of logical inputs; and to adjust, for each of the one or more learning neuron models, delays associated with each of the logical inputs using the received input spikes, such that the learning neuron model emits an output spike meeting a target output delay according to one or more logical conditions corresponding to the true causal logical relation.

Certain aspects of the present disclosure provide a system for neural computation of general linear systems. The system generally includes an anti-leaky integrate-and-fire neuron having a membrane potential, wherein the membrane potential increases exponentially in the absence of input, wherein the membrane potential increases in a step upon input, wherein the membrane potential is reset at a reference time to a reset potential, and wherein the neuron spikes if the membrane exceeds a threshold; and one or more synapses connecting input to the anti-leaky integrate-and-fire neuron having delays but no weights and no post-synaptic filtering. For certain aspects, the anti-leaky-integrate-and-fire neuron spikes upon the membrane potential exceeding a threshold and the reference time is a time at or after the spike and, upon the reset, the synaptic inputs subject to delays are cleared.

Certain aspects of the present disclosure provide a method of general neuron modeling. The method generally includes, upon a delayed input event for a neuron, applying the input to the neuron's state and computing the neuron's predicted future spike time; rescheduling a spiking event for the neuron at the predicted future spike time; upon a spike event for the neuron, resetting the membrane potential and computing the neuron's next predicted future spike time, wherein the resetting of the membrane potential is to a value that ensures the neuron will spike within a time duration.

Certain aspects of the present disclosure provide a method of computing a linear system using a spiking neuron. The method generally includes determining an input time spike time relative to an input reference time based on the negative of a logarithm of an input value; delaying the input by a time delay logarithmically related to a linear coefficient; and computing an output spike time relative to an output reference time based on an anti-leaky-integrate-and fire neuron model. For certain aspects, the logarithm has a base equal to an exponential value of the coefficient of change of the membrane potential as a function of the membrane potential. According to certain aspects, a neuron output to a post-synaptic neuron represents a negative value by the absolute value and inhibition for a positive coefficient and excitation for a negative coefficient, wherein a neuron output to a post-synaptic neuron represents a positive value by the absolute value and inhibition for a negative coefficient and excitation for a positive coefficient. For certain aspects, an input value that may be negative or positive is represented using two neurons, one representing the positive domain as the rectified value and the other representing the negative domain as the rectified negative of the value.

Certain aspects of the present disclosure provide a method of converting timing information in a spiking neural network. The method generally includes applying a propagating reference frame wave as input to two or more groups of one or more neurons, wherein the reference frame wave is a oscillating excitatory and/or inhibitory potential which is delayed by a different amount before application to each of the two or more groups; and encoding and/or decoding information in the time of a spike of a neuron relative to the propagating reference frame wave as applied to that neuron (or the neuron to which the spike is input).

Certain aspects of the present disclosure provide an apparatus for converting a self-referential relative time to a non-self-referential relative time using a neuron. The apparatus generally includes an input state which is set upon an input and decays exponentially following that input; an input latch which stores the input state at a subsequent input before the input state is reset; and a membrane state which is incremented by the input latch value upon a reference input and thereafter grows exponentially until exceeding a threshold, whereupon the membrane state is reset and where the membrane state does not grow after reset until a reference input.

Certain aspects of the present disclosure provide a method of learning delays in a spiking neural network. The method generally includes delaying input by a current input delay wherein input is in the form of a spike occurring at time relative to a first reference; determining a current firing delay as an output spike time relative to a second reference; computing a difference between a target firing delay and the current firing delay; and adjusting the input delay by an amount depending on the difference between the target firing delay and the current firing delay, the current input delay, and the input spike relative time and a learning rate.

Certain aspects of the present disclosure provide a method for operating a spiking neural network. The method generally includes determining an input spike time of an input spike at a neuron model, the input spike time relative to a first reference time; determining a first output spike time for an output spike relative to a second reference time in the presence of a plurality of input spikes, the output spike time based on the input spike time relative to the first reference time; and determining a second output spike time for the output spike relative to the second reference time in the absence of the plurality of input spikes based on a depolarization-to-spike delay of the neuron model.

Certain aspects of the present disclosure provide a method for operating a spiking neural network. The method generally includes sampling a value at a first reference time; encoding the sampled value as a delay; and inputting the value to a neuron model by generating an input spike at a time delay relative to a second reference time.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 27 illustrates example results of learning coefficients for a noisy real-valued input vector, in accordance with certain aspects of the present disclosure.

FIG. 28A is a graph of the delays after the first iteration for a logical OR relation, in accordance with certain aspects of the present disclosure.

FIG. 28B is a graph of the delays after the first iteration for a logical AND relation, in accordance with certain aspects of the present disclosure.

FIG. 29A is a graph of the delays after a number of iterations for a logical OR relation, in accordance with certain aspects of the present disclosure.

FIG. 29B is a graph of the delays after a number of iterations for a logical AND relation, in accordance with certain aspects of the present disclosure FIG. 30 illustrates the convergences (as a function of the number of iterations) for learning the logical relations, in accordance with certain aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
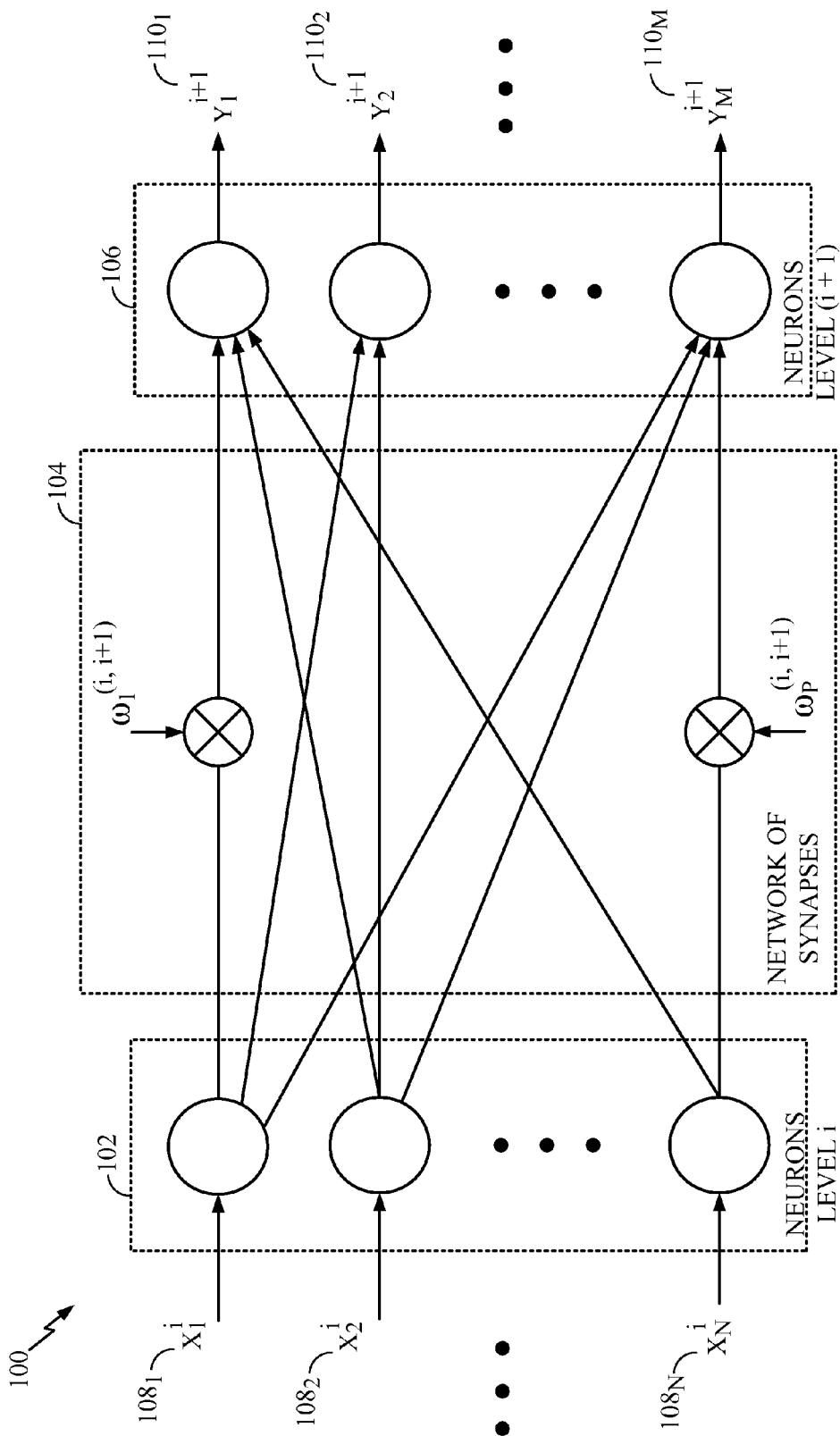
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104. For simplicity, only two levels of neurons are illustrated in FIG. 1, although fewer or more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input (e.g., an input current) to the level 102 neuron. Such inputs may be accumulated on the neuron membrane to charge a membrane potential. When the membrane potential reaches its threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104). For certain aspects, these signals may be scaled according to adjustable synaptic weights $w_1^{(i,i+1)}, \ldots, w_P^{(i,i+1)}$ (where P is a total number of synaptic connections between the neurons of levels 102 and 106). For other aspects, the synapses 104 may not apply any synaptic weights. Further, the (scaled) signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated in software or in hardware (e.g., by an electrical circuit) and utilized in a large range of applications, such as image and pattern recognition, machine learning, motor control, and the like. Each neuron (or neuron model) in the neural system 100 may be implemented as a neuron circuit. The neuron membrane charged to the threshold value initiating the output spike may be implemented, for example, as a capacitor that integrates an electrical current flowing through it.

Example Spiking Neural Computation

Various methods for designing neural networks have been proposed. For example, a method of engineering or synthesizing neural simulations was recently proposed by Eliasmith and Anderson using a Neural Engineering Framework (NEF). See, e.g., Chris Eliasmith & Charles H. Anderson, *Neural Engineering: Computation, Representation, and Dynamics in Neurobiological Systems*, MIT Press (2003), http://compneuro.uwaterloo.ca and Chris Eliasmith, *A Unified Approach to Building and Controlling Spiking Attractor Networks*, Neural Computation 17, 1276-1314 (2005). This method relies on representing an encoded value in the activities $\{a_i\}$ of a set of neurons (indexed by i). A value may be estimated by linear function of the activities, $$\hat{x} = \sum_i a_i \phi_i$$

In order to represent the value, the activities of the neuron population must be sufficiently diverse such that there exists a set $\{\phi_i\}$ that can estimate the value from those activities. For example, if all neurons have the same dynamics, the activities may be insufficiently diverse to obtain an accurate or precise representation of the value.

Neuron firing rate may be used as the neuron activity measure. However, it was proposed that a temporal code may be incorporated by expressing the activity as a filtered spike train:

$$a_i(t) = h_i(t) * y_i(t)$$

where $y_i(t)$ is a binary value (1 representing a spike and 0 representing no spike). But for conservation of significant information, this relies on having a post-synaptic filter $h_i(t)$ per synapse and that $h_i(t)$ has a significant time constant. Eliasmith and Anderson actually assumed that the dynamics of the post-synaptic filter dominate the dynamics of a neuron's response and modeled the filter with time constant $\tau$ as $$h_t(t) = \frac{1}{\tau} e^{-t/\tau}$$

Effectively, this converts a Boolean time series $y_i(t)$ into a real-valued time series $a_i(t)$ similar to a firing rate. Unfortunately, this results in information loss (or from another perspective, the resolution of the represented values are limited). This may be compensated for by increasing the neuron population size. Finally, the method uses synaptic weights to linearly transform inputs to achieve a desired function (assuming it is other than identity).

A full neural description for NEF includes: (1) post-synaptic filters $h_{ij}(t)$ of the form described above for each input neuron i to each neuron j, (2) synaptic weights $w_{ij}$ for each input neuron i to each neuron j to decode the inputs, (3) synaptic weights to re-encode the inputs, and (4) the soma dynamics.

However, there are a number of problems with this method. First, it is an inefficient solution in spiking neuron form because the method can be applied merely using firing rates. In other words, what is the motivation to use a spiking neural network if a rate-based neural network can be used? The method merely converts Boolean sequences into real-valued sequences. Second, the method is computationally complex, requiring post-synaptic filters per synapse and encoding and decoding transformations and weights. Third, a diverse population of neurons must be used to represent a system because there must be sufficient basis for the encoding/decoding to represent the value-space. This means that a system requires neurons with different tuning curves (firing rates as a function of input). Fourth, learning is an open problem.

Similarly, other prior methods have represented information in the firing rate of a neuron or in the firing activity of a population of neurons. This population coding type of scheme is often used with probabilistic firing models of neurons (such as Poisson firing neurons). These types of schemes require windows of observations of the spiking behavior to determine the population coded average firing rate, which represent the information. The probabilistic methods are also inherently noisy even before introducing external noise and thus at a disadvantage. None of these schemes solves the problems because of this use of firing rate as the code, use of precise weights, and complex computational schemes.

Accordingly, what is needed are techniques and apparatus for implementing a highly efficient, biologically consistent spiking neural network that applies universally. Consequently, three key problem areas are presented in the above statement: efficiency, biological consistency, and universality or generality.

As used herein, the term "efficiency" generally refers to, a neuron computation system that does not require multiple neurons or neuron populations to compute basic scalar functions and does not require significant time to observe outputs, convert, and average out the output to obtain firing rate values. The neuron should also be computationally non-complex, be non-probabilistic, and not require computation of filters or precise floating point computations.

As used herein, the term "biologically consistent" generally means that the neuron dynamics and connection processing should be biologically motivated (realistic) and not merely specified by engineering or computational convenience. Moreover, information should ideally be coded in the spiking of neurons rather than their average firing rate. Neuron parameters, and parameter ranges, such as synaptic strength distribution, should likewise be biologically consistent.

As used herein, the term "universal" generally refers to a neural computational system equivalent to general computational or control systems. Such systems may be modeled as a linear system or a combination of linear subsystems. Any linear system may be described by the equations $$\dot{x}(t) = Wx(t) \text{ or } x(t+\Delta t) = Wx(t)$$

This formulation of a linear system is general in that the vectors x may include inputs, internal state variables, or outputs (typical formulations of the first type separate inputs and states by expressing $\dot{x}(t)=Ax(t)+Bu(t)$). Any linear control system may be expressed in these terms (although some of the matrix W entries may be zero depending on the system so "inputs" may be updated by external event rather than by the equation itself). Fundamentally, one is thus concerned with the element $$\dot{x}_k(t)=wx(t) \text{ or } x_k(t+\Delta t)=wx(t)$$

which expresses the dynamics of each element of the vector x. Although aspects of the present disclosure are not limited to a linear system, this is a very general framework in which to describe certain aspects because the linearity can be replaced by desired nonlinear functions, or the linearity can be used to model nonlinear functions with linear system models.

Aspects of the present disclosure include a method for spiking neural networks. However, weights are unnecessary. In other words, a connection may either exist (significant synapse) or not (insignificant or non-existent synapse). Certain aspects of the present disclosure use binary valued inputs and outputs and do not require post-synaptic filtering. However, certain aspects of the present disclosure may involve modeling of connection delays.

According to certain aspects of the present disclosure, using the methods described herein, any linear system may be efficiently computed using spiking neurons without the need for synaptic weights or post-synaptic filters, and information is coded in each individual spike. Information may be coded in the relative timing of each spike so there is no need to accumulate activity to determine information in rates. Neuron spike response time may be computed directly (deterministic), in discrete or continuous time, in an event-based manner, thus further saving on computation and memory access. Because a single neuron can represent a linear transformation of arbitrary precision, certain aspects of the present disclosure may use the minimal number of neurons for any set of variables. Moreover, certain aspects do not require neurons with different tuning curves to retain fidelity. Certain aspects of the present disclosure also do not require probabilistic firing or population coding. Certain aspects may also be interfaced with neurons that classify temporally coded patterns. In other words, certain aspects of the present disclosure may be used to compute transformations of input, which may then be used to classify or recognize aspects of the input. Conversely, responses of neurons to temporal patterns may be supplied to a set of neurons operating according to the certain aspects.

Certain aspects of the present disclosure exhibit behavior that is biologically consistent. For example, certain aspects do not use synaptic weights. Either there is a connection between neurons, or there is not. In biology, dendritic spines tend to either grow into synapses of nominal strength (depending on location) or disappear. As another example, certain aspects use a propagating reference frame wave to convert information coded in time from a self-referential form to a non-self-referential form. In biology, local oscillations between excitation and inhibition have been observed, including offsets between different cortical areas. As yet another example, certain aspects use a neuron model that is at or close to a depolarization threshold above which the neuron's membrane potential increases even without further input. Biological neural circuits may operate at or near this depolarization threshold, as well.

Certain aspects of the present disclosure may also be used with probabilistic or deterministic firing models. And, noise may be added (tolerated) on top of either of these model types. Since such models may be operated in an underlying deterministic mode (absent noise), these models may perform fast and reliable computations and gracefully handle the addition of noise.

Certain aspects of the present disclosure may also reduce power consumption because they include an event-based or scheduled neuron method in which the cost of computation may be independent of the temporal resolution. This may also explain how/why biological brains make use of sparse coding for efficient power consumption.

Another advantage for certain aspects of the present disclosure is that these aspects may operate in asynchronous or synchronous modes or forms. In asynchronous form, the sampling rate may be proportional to the significance of the input. When input is negligible or low, the sampling rate may be low, thus saving power and resources. When the input is significant or large, the sampling rate may increase, thus increasing both precision and response time.

These and additional advantages will become apparent in the description that follows. Note that many of the advantages for aspects of the present disclosure may be expressed in terms of the lack of a particular disadvantage for other conventional methods and neuron models.

Coding Information in Relative Time

Suppose that information may be encoded in the relative time between spikes of a neuron or in the relative time between spikes of one neuron and another (or even more generally, as will become apparent later, between the spike of one neuron and some reference time). In certain aspects, information may be represented in the relative timing between spikes in two basic forms: (1) the relative time between consecutive spikes of the same neuron; and (2) the relative time between a spike of one neuron and a spike of another neuron (or reference).

Strictly speaking, in the first case the relative time need not be between consecutive spikes, and in the second case the relative time need not be between the pre-synaptic neuron and the post-synaptic neuron. Regardless, let this relative time be $\tau$ such that it is related to value x as follows, $$x=q^{-\tau} \text{ or } \tau=-\log_q x$$

Effectively, the relative time is the logarithm in base q of the value. The above transformation converts relative time (spike timing) domain to/from real-valued (variable) domain. Thus, any scaling of the value is merely a time difference in the relative time, $$x_k=w_{jk}x_j \rightarrow \tau_k=\tau_j+\Delta\tau_{jk}$$

where $\Delta\tau_{jk}=-\log_q w_{jk}$. Thus, a value represented in the delay between spikes may be scaled by an arbitrary amount by merely adding a delay.

Figure 2:
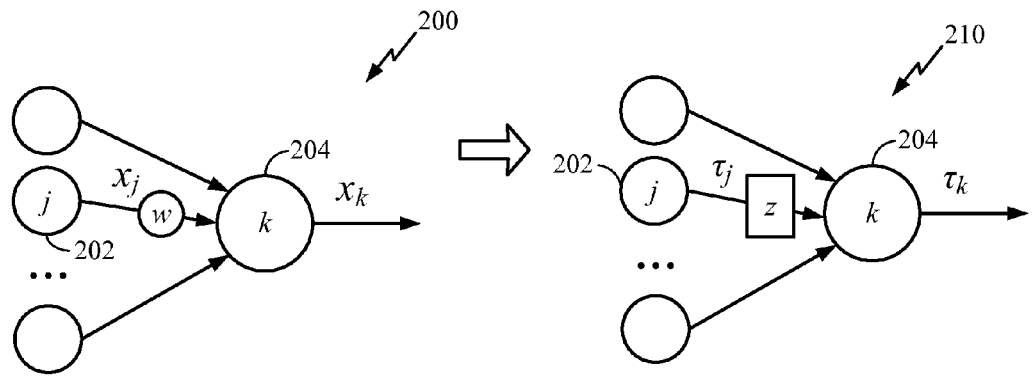
FIG. 2 illustrates a transformation from the real-valued domain to the spike-timing domain, in accordance with certain aspects of the present disclosure.

FIG. 2 illustrates a transformation from the real-valued domain 200 to the spike-timing domain 210, in accordance with certain aspects of the present disclosure. In the real-valued domain 200, output value $x_j$ of neuron j 202 is scaled by w to obtain output value $x_k$ of neuron k 204. In the spike-timing domain 210, delay z is added to relative time $\tau_j$ of neuron j 202 to determine relative time $\tau_k$ of neuron k 204.

Note that in a causal system, time delays are positive. However, scaling a value by a factor of less than one may be achieved by shortening the delay between the spikes by an arbitrarily large nominal amount and then adding back an amount sufficient to achieve the overall scaling $\Delta\tau_{jk}'=-T+\Delta\tau_{jk}$, or $$\tau_k=\tau_j-T+\Delta\tau_{jk}'$$

How this may be done with neurons will be explained in detail further below. For the moment, it may be assumed that any arbitrary scaling may be achieved using this concept if any scaling equal to or larger than one may be achieved. In a practical network, relative time delays may be limited to a certain maximum (given by a nominal neuron firing rate in the absence of input or by the maximum delay that can be incurred by a connection from one neuron to another). This may not limit the scaling that may be achieved because a desired value range may be covered by scaling the underlying values.

Converting between forms of relative timing may include: (1) converting a relative time $\tau_i$ between consecutive spikes of the same neuron i to a relative time $\tau_{jk}$ between spikes of neuron j and neuron k (or reference k); and (2) converting a relative time $\tau_{jk}$ between spikes of neuron j and neuron k (or reference k) to a relative time $\tau_i$ between consecutive spikes of the same neuron i.

The difference between a self-referential relative time $\tau_i$ and a non-self-referential relative time $\tau_{jk}$ may be seen by considering spike trains. Let the spiking output of a neuron j be described by $y_j(t)$, $$y_j(t) = \sum_s \delta(t - t_j^s)$$

where s is the index of spike ($1^{st}$, $2^{nd}$, $3^{rd}$ and so forth). Thus, $y_j(t)$ is merely a binary sequence. The relative time between consecutive spikes of neuron j is $$\tau_j(s) = t_j^s - t_j^{s-1}$$

However, the relative time between spikes s of neuron j and r of neuron k (or reference k) is $$\tau_{jr}(s,r) = t_j^s - t_k^r$$

Now, suppose output $y_j(t)$ from neuron j is submitted as an input to neuron k. If at a time t that is subsequent to processing of all input spikes prior to spike s, then only spike s may be of concern, so, $$y_j(t) = \delta(t - t_j^s)$$

Now, the time may also be shifted to an arbitrary reference time $t_r$ where $t = t_r + t'$. Now, in the shifted time, $$y_{jr}(t') = y_j(t_r + t') = \delta(t_r + t' - t_j^s) = \delta(t' - \tau_{jr}^s)$$

Now, applying the same time shift to the spike, $\tau_{jr}^s = t_j^s - t_r$, and using the short hand $\tau_{jr} = \tau_{jr}^s$, one obtains $$y_{jr}(t') = \delta(t' - \tau_{jr})$$

Figure 3:
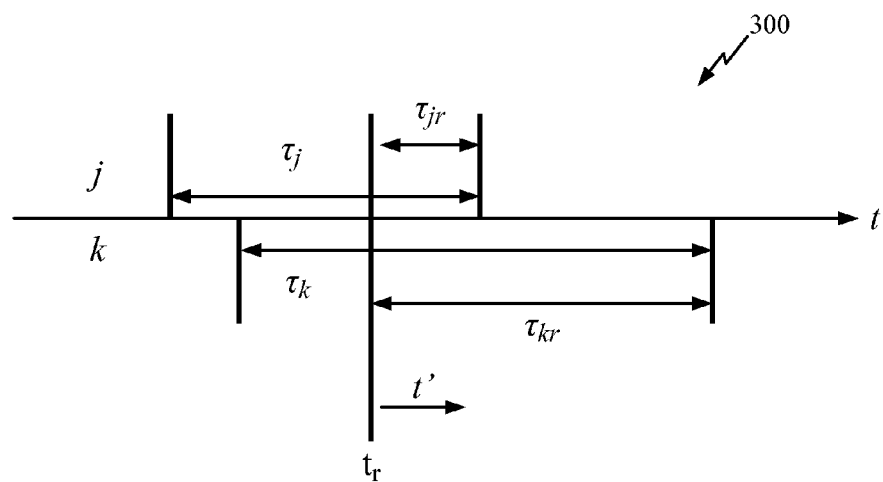
FIG. 3 is a timing diagram illustrating the relationships between relative times and shifted time frames, in accordance with certain aspects of the present disclosure.

FIG. 3 is a timing diagram 300 illustrating the relationships between relative times and shifted time frames, as described above. From the timing diagram 300 and the equations above, it may be seen that any spike train input from one neuron to another may be considered in terms of the timing of the next spike relative to a reference time and accounting for delay in the connection. These concepts of relative time and time reference shifting will be central to the explanation of certain aspects of the present disclosure below.

General Spiking Neural Systems

Many biologically consistent models of neurons have been proposed. One spiking neuron model that is particularly biologically consistent and flexible is the Izhikevich simple model described by the following pair of differential equations, $$\frac{dv}{dt} = c_1(v - v_r)(v - v_t) - c_2 u + c_3 I;$$

$$\frac{du}{dt} = c_4(c_5(v - v_r) - u)$$

and the spiking condition, if $v(t) > v_\theta \to y(t) = 1, v(t+\epsilon) = v_r, u(t+\epsilon) = u(t) - c_6$ where $c_i$'s are neuron parameters (derived from conductance, etc.) and $v_r$, $v_t$, and $v_\theta$ are membrane voltage thresholds, I is the net input at time t, and where generally $v_\theta > v_t > v_r$ and generally $v > v_r$ other than in a refractory time period. The output $y(t) = 0$ if the spiking condition is not met. However, the voltage equation operates in two domains: (1) $v < v_t$ where the neuron operates like a leaky-integrate-and-fire (LIF) neuron; and (2) $v > v_t$ where the neuron operates like an anti-leaky-integrate-and-fire (ALIF) neuron.

Note that when $v < v_t$, the larger the magnitude of the difference $v - v_t$, the smaller the magnitude of the difference $v - v_r$, so that the two may be considered to balance one another. Moreover, without loss of generality, one may set $v_r = 0$ and scale the parameters according to $c_3$, $c_4$, and $c_5$ so that one may simplify and write for $v < v_t$, $$\frac{dv}{dt} = \rho v - \gamma u + I$$

where $\rho < 0$. Here, the voltage domain has been shifted by the amount $v_t$ without loss of generality. In contrast, when $v > v_t$, the term $(v - v_t)$ grows with a larger slope than $(v - v_r)$, and thus, one may be motivated to simplify and write for $v > v_t$, $$\frac{dv}{dt} = \rho v - \gamma u + I$$

where $\rho > 0$. The key is that the sign of $\rho$ is flipped so that the voltage grows and grows increasingly faster.

In general, given any background input activity, input noise level, or prior spikes, any given spike may tip the balance from $v < v_t$ to $v > v_t$. The above generalization reflects that a neuron level may be maintained within a margin of this balance so one may generalize and set $v_t = 0$ initially (after spiking or after a refractory period following a spike). However, due to these generalizations, to reconcile the voltages in the two different domains may most likely entail a compensation computation to convert between them (i.e., when v reaches a threshold $v_\theta$ in the $\rho < 0$ domain, v is converted to $v = v - v_\theta \cong 0$ in the $\rho < 0$ domain and vice versa). Although this is straightforward to do, it is unnecessary for the aspects of this disclosure because there may be no need to move between domains, as will become apparent later. It may also be observed that for particular parameter settings of $c_2$, $c_4$, and $c_5$, the state variable u may have negligible contribution to these dynamics so one may generally simplify to $$\frac{dv}{dt} = \rho v + I$$

Effectively, one can see that the Izhikevich simple model may be simplified to (i.e., modeled as) a leaky or anti-leaky-integrate-and-fire (ALIF) neuron depending on the domain of operation. Moreover, if no post-synaptic filtering and no weights are assumed, the input spikes may be used as the inputs to neuron k subject to some connection delays (such as dendritic or axonal delay), such that $$I_k = \sum_l y_l(t - \Delta \tau_{lk})$$

Figure 4:
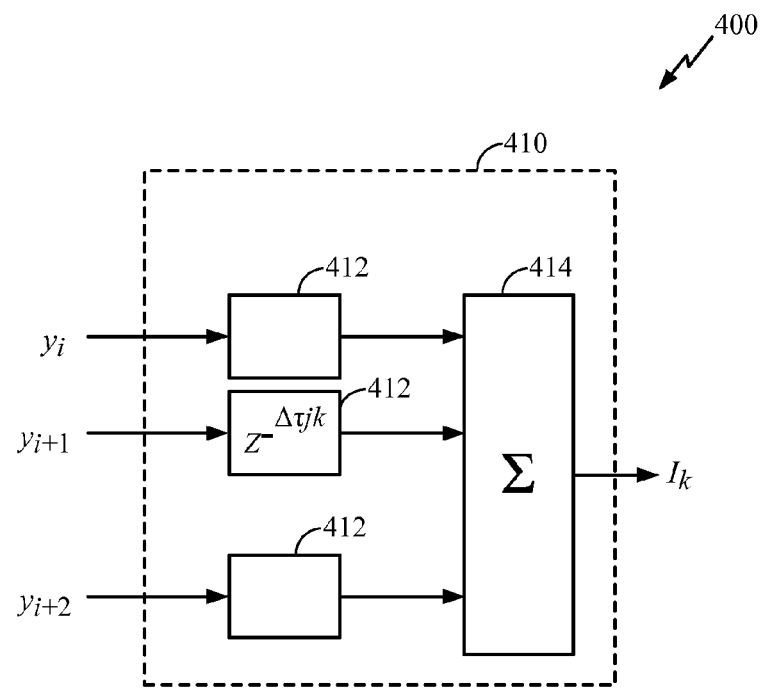
FIG. 4 is a block diagram of a neuron model illustrating dendritic delays, in accordance with certain aspects of the present disclosure.

FIG. 4 is a block diagram 400 of a neuron model 410 depicting the connection delays as dendritic delay lines, in accordance with certain aspects of the disclosure. The dendritic input lines for inputs $y_l$ are coupled to dendritic delay elements 412 representing connection delays for each input $y_l$. The delayed inputs are then summed (linearly) by the summer 414 to obtain $l_k$.

Now, assume that superscript + represents the $\rho > 0$ domain and superscript − represents the $\rho < 0$ domain. For the anti-leaky domain for neuron k, $$\frac{dv_k^+(t)}{dt} = \rho^+ v_k^+(t) + \sum_l y_{c^-(k,l)}(t - \Delta \tau_{c^-(k,l)k})$$

where $c^-(k, l)$ is the index of the pre-synaptic neuron corresponding to synapse l for post-synaptic neuron k. Such a neuron will typically have an exponentially growing membrane potential, beginning at a reference time $t_r$ when the potential is bumped up above zero (i.e., above zero by some amount or threshold).

Figure 5:
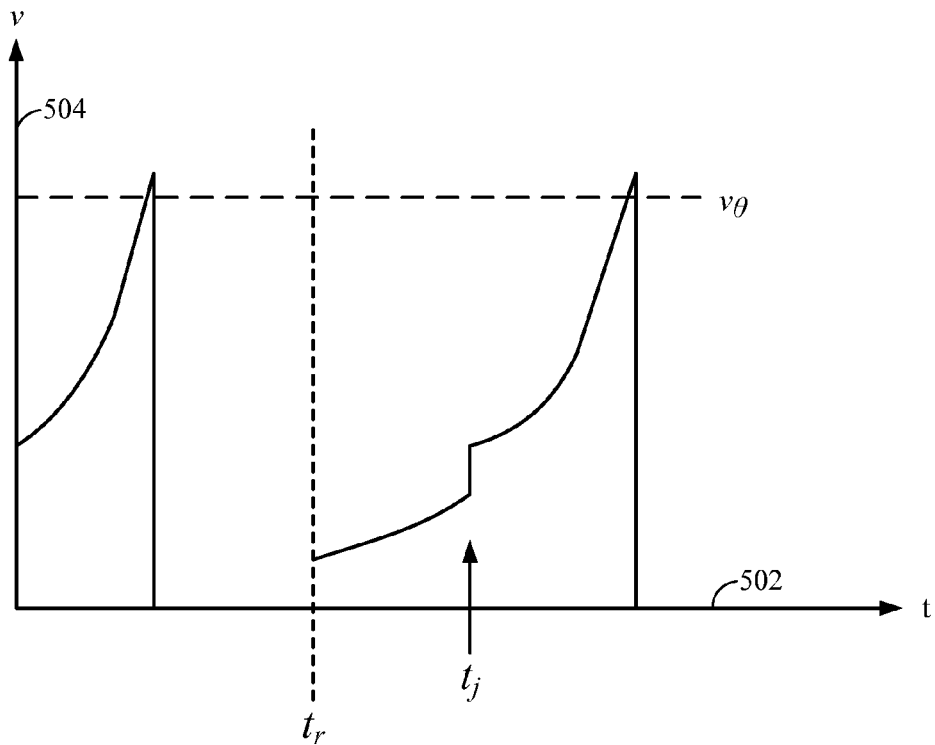
FIG. 5 illustrates an exponentially growing membrane potential and firing of a neuron, in accordance with certain aspects of the present disclosure.

For example, FIG. 5 illustrates such an exponentially growing membrane potential and firing of a neuron with respect to time. In FIG. 5, the y-axis 504 represents the membrane potential of the neuron, and the x-axis 502 represents time. As shown, when, at reference time $t_r$, the membrane potential of the neuron is above zero by a certain amount, the potential grows exponentially. After this point, the neuron will typically fire unless there are inhibitory inputs sufficient to bring the potential back to zero or below. Typically, excitatory inputs will merely cause the neuron to fire sooner. For example, as shown in FIG. 5, an input from neuron j at time $t_j$ causes the neuron to fire sooner. This is a general formulation. For example, one could set the reference time to the time the neuron fires. Then, upon firing the neuron merely has the voltage reset to a small value above zero immediately.

One may write equivalently using indices of the pre-synaptic neurons $$\frac{dv_k^+(t)}{dt} = \rho^+ v_k^+(t) + \sum_j y_j(t - \Delta \tau_{jk})$$

Taking the Laplace transform, one may obtain $$V_k^+(s) = \frac{v_k^+(t_k^-) + \sum_j e^{-(\tau_{jk} + \Delta \tau_{jk})s}}{s - \rho^+}$$

where according to the generalization $v_k^+(t_k^-) \neq 0$. For the moment, a reference time may be used that is actually the last spike of the neuron k, so $y_j(t) = \delta(t - t_k^- - \tau_{jk})$. Taking the inverse Laplace transform in shifted time $\tau_k = t - t_k^-$ yields $$v_k^+(\tau_k) =$$

$$v_k^+(t_k^-)e^{\rho^+ \tau_k} + \sum_j e^{\rho^+(\tau_k - (\tau_{jk} + \Delta \tau_{jk}))} = e^{\rho^+ \tau_k}\left[v_k^+(t_k^-) + \sum_j e^{-\rho^+(\tau_{jk} + \Delta \tau_{jk})}\right]$$

Solving for $\tau_k$, $$\tau_k = \frac{1}{\rho^+}\log v_k^+(\tau_k) - \frac{1}{\rho^+}\log\left[v_k^+(t_k^-) + \sum_j e^{-\rho^+(\tau_{jk} + \Delta \tau_{jk})}\right]$$

Manipulation yields, $$v_k^+(\tau_k)e^{-\rho^+ \tau_k} = v_k^+(t_k^-) + \sum_j e^{-\rho^+(\tau_{jk} + \Delta \tau_{jk})}$$

Defining $q = e^{\rho^+}$, $$\left(\frac{1}{q}\right)^{\tau_k} = \Delta \omega_k + \sum_j \omega_{jk}\left(\frac{1}{q}\right)^{\tau_{jk}}$$

where $w_{jk} = e^{-\rho^+ \Delta \tau_{jk}}/v_k(\tau_k)$ and $\Delta \omega_k = v_k(t_k^-)/v_k(\tau_k)$.

In discrete time form with temporal resolution $\Delta t$, $$v_k^+(t) = (1 + \Delta t \rho)v_k^+(t - \Delta t) + \sum_j y_j(t - \Delta t - \Delta \tau_{jk})$$

Defining $q = (1 + \Delta t \rho^+)^{1/\Delta t}$, $$v_k^+(t) = q^{\Delta t} v_k^+(t - \Delta t) + \sum_j y_j(t - \Delta t - \Delta \tau_{jk})$$

In non-recursive form in shifted time $\tau_k = t - t_k^-$, $$v_k^+(\tau_k)q^{-\tau_k} = v_k^+(t_k^-) + \sum_j q^{-(\tau_{jk} + \Delta \tau_{jk})} u(\tau_k - (\tau_{jk} + \Delta \tau_{jk}))$$

Supposing a spike occurs at self-referential time $\tau_k$, and assuming all inputs considered (i.e., without loss of generality) occur before that spiking time, $$\left(\frac{1}{q}\right)^{\tau_k} = \Delta \omega_k + \sum_j \omega_{jk}\left(\frac{1}{q}\right)^{\tau_{jk}},$$

where $\omega_{jk} = q^{-\Delta \tau_{jk}}/v_k^+(\tau_k)$, and $\Delta \omega_k = v_k^+(t_k^-)/v_k^+(\tau_k)$.

As described above, a desired linear system may be expressed as follows:

$$x_k(t) = \sum_j \omega_{jk} x_j(t) + \eta_k$$

and a transformation from value to time may be expressed as $x=q^{-\tau}$ or $\tau=-\log_q x$. Accordingly, a single neuron k may be utilized in an effort to compute the desired linear result by the conversion $$\tau_{jk}=-\log_q x_j$$

$$\tau_k=-\log_q x_k$$

To minimize $\eta_k$, which is nominally modeled by $\eta_k=\Delta\omega_k$, one typically desires $\Delta\omega_k \to 0$ or that the neurons spike threshold $v_k(\tau_k) \gg v_k(t_k^-)$. Minimizing $\eta_k$ is not strictly necessary, but it promotes a motivation for a precise mapping.

To implement a desired operation, one may simply set the delays, $$\Delta\tau_{jk}=-\log_q(\omega_{jk}v_k^+(\tau_k))$$

Without a loss of generality, one may set $v_k^+(t_k^-)=v_0=1$, so that $\Delta\omega_k=1/v_k^+(\tau_k)=1/v_\theta$, and thus, one may control the minimally required size of the $\eta_k$ term by choosing a sufficiently large spiking threshold.

Also note that this single neuron k may process real-valued operations with infinite resolution if given infinite time resolution (i.e., $\Delta t \to 0$) in which case $q=e^{\rho^+}$. However, in practice this may not be necessary. Note that this is not necessarily undesirable because operating in continuous time does not require continuous updates. One may most likely only update equations on events (inputs or spikes, and these events may be computed given the un-nested expressions provided above). Nevertheless, for a discrete time system operating in time steps at $\Delta t > 0$, $$q=(1+\Delta t \rho^+)^{1/\Delta t}$$

And as the base of the logarithm for the conversion between values and relative times, q impacts how temporal resolution will impact value resolution in log scale. In turn, this depends on the parameter $\rho^+$ which is subject to $\rho^+>0$.

Finally, this may be labeled as neuronal operation $\tau_k=g_k^+(\{\tau_{jk}\}_j)$. In the spike-timing domain, $$g_k^+(\{\tau_{jk}\}_j) = \tau_k = -\log_q\left[\Delta\omega_k + \sum_j \omega_{jk}\left(\frac{1}{q}\right)^{\tau_{jk}}\right]$$

But in the value-domain, $$g_k^+(\{x_j\}_j) = x_k(t) = \sum_j \omega_{jk} x_j(t) + \eta_k$$

This operation may not actually be computed, but rather, an equivalent computation is carried out by a spiking neuron governed by the differential equation, $$\frac{dv_k^+(t)}{dt} = \rho^+ v_k^+(t) + \sum_j y_{jk}(t)$$

where $$y_{jk}(t)=y_j(t-\Delta\tau_{jk})$$

and spiking condition, $$v_k^+(t)>v_\theta=v_k(\tau_k) \to y_k(t)=1, v_k^+(t+\epsilon)=v_0=v_k^+(t_k^-)$$

If there is no input, the neuron will fire at $$t_k^{+\prime} = \log_q \frac{v_k^+(t)}{v_k^+(t_k^-)} = \log_q \frac{v_\theta}{v_0}$$

Thus, the maximum non-self-referential input time (for the input to affect the soonest spiking time) is $\tau_{jk} \leq t_k^{+\prime}$ (assuming minimum delays). Similarly, for delays: $\Delta\tau_{jk} \leq t_k^{+\prime}$. Thus, $$\omega_{jk} \geq e^{-t_k^{+\prime}/\Delta t}/v_\theta \text{ or } \omega_{jk} \geq e^{-t_k^{+\prime}}/v_\theta$$

Conversely, the smallest non-zero time delay in a discrete time system with resolution $\Delta t$ is $\Delta t$. Thus, for a non-zero effect, $$\omega_{jk} \leq e^{-\Delta t}/v_\theta \text{ or } \omega_{jk} \leq q^{-1}/v_\theta$$

Similarly, the output of a neuron (if non-zero/not-instantaneous) is limited in range to $[\Delta t, t_k^{+\prime}]$. Thus, the coded value is in the range, $$q^{t_k^{+\prime}} \leq x_k \leq q^{-1}$$

It may be noted that a value of $x_k=1$ yields an input delay 0 and that a value of $x_k=q^{-t_k^{+\prime}} \cong 0$ yields an input delay of $t_k^{+\prime}$. Thus, one may generally operate with inputs in the range [0,1]. However outputs may be offset by $\Delta\omega_k$ and be, at most, $N/qv_\theta$ (for N inputs) because of the weight range. Thus, the meaning of outputs may be arbitrarily redefined as follows:

$$x_k' = \frac{(x_k - \Delta\omega_k)v_\theta}{N} \cong x_k v_\theta/N$$

What this means in terms of feeding output of one neuron to the input of another neuron will be explained in the description below.

Figure 6:
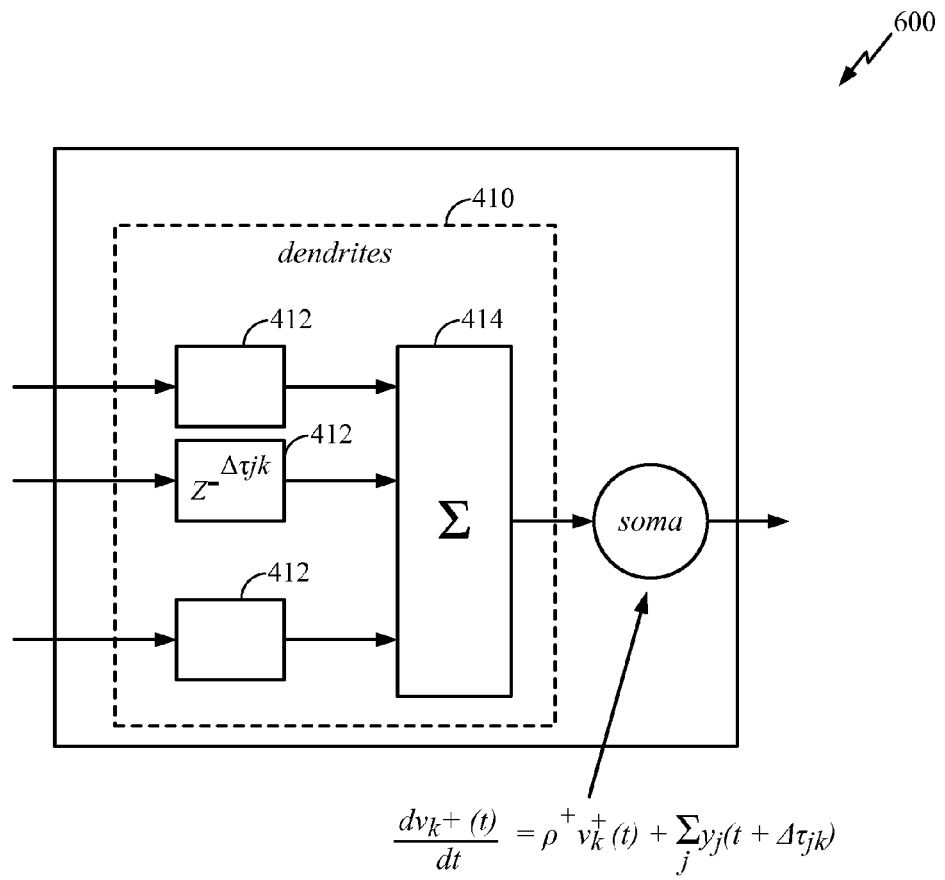
FIG. 6 is a block diagram of the architecture for a single anti-leaky-integrate-and-fire (ALIF) neuron model, in accordance with certain aspects of the present disclosure.

In summary, a neuronal framework for universal computation of a linear expression—which is powerful enough to compute a value of arbitrary precision with a single neuron given sufficient temporal resolution—has now been provided. The neuron is an anti-leaky-integrate-and-fire (ALIF) neuron, which has a voltage reset to a nominal setting above zero after spiking or after a refractory period. The neuron's synapses have no weights and no post-synaptic filters. However, the connections have delays. FIG. 6 is a block diagram 600 of the architecture for a single anti-leaky-integrate-and-fire (ALIF) $g_k^+$ neuron k, in accordance with certain aspects of the disclosure.

A simulation or implementation of the neuron may be conducted in continuous time or discrete time. The discrete time operation may proceed step-by-step by iteration of the above discrete time equation (s). However, continuous time (and discrete time) implementation may also be executed in an event-based manner as follows upon an input event occurring at time t:

1. Update the neuron state variable $v_k^+(t)$ based on the state at the previous event time $t_k^{last}$, using either the continuous time or discrete time equations, $$v_k^+(t)=e^{\rho^+(t-t_k^{last})}v_k^+(t_k^{last}) \text{ or } v_k^+(\tau_k)=q^{(t-t_k^{last})}v_k^+(t_k^{last})$$

2. Add the input, $$v_k^+(t)=v_k^+(t)+1 \text{ (for excitatory)}$$

$$v_k^+(t)=v_k^+(t)-1 \text{ (for inhibitory)}$$

3. Check for spike, if $v_k^+(t) \geq v_\theta$, then $y_k(t)=1$ and reset $v_k^+(t)=v_0$.

4. Schedule events for each neuron l with a synapse from neuron k at time $t+\Delta\tau_{kl}$ 5. Check when the neuron will fire without further input using either the continuous time or discrete time equations, $$t_k^{next} = t + \log(v_\theta/v_k^+(t))/\rho^+ \text{ or}$$

$$t_k^{next} = t + \log_q(v_\theta/v_k^+(t))/\rho^+$$

6. Reschedule the currently scheduled firing-absent-further-input event to time $t_k^{next}$. Note that if the neuron will not fire without further input, the time $t_k^{next}$ may effectively be set to infinity or some sufficiently large number or indicator thereof (alternatively to a time in the past so that it will never be executed).
7. Upon a firing-absent-further-input event, set $y_k(t)=1$ and reset $v_k^+(t)=v_0$.

Note that if operating in discrete time, the scheduled times of events may be either rounded or otherwise converted to the nearest multiple of the time resolution $\Delta t$, for example, $$t_k^{next} = \text{ceil}(t_k^{next}/\Delta t)\Delta t$$

Figure 7:
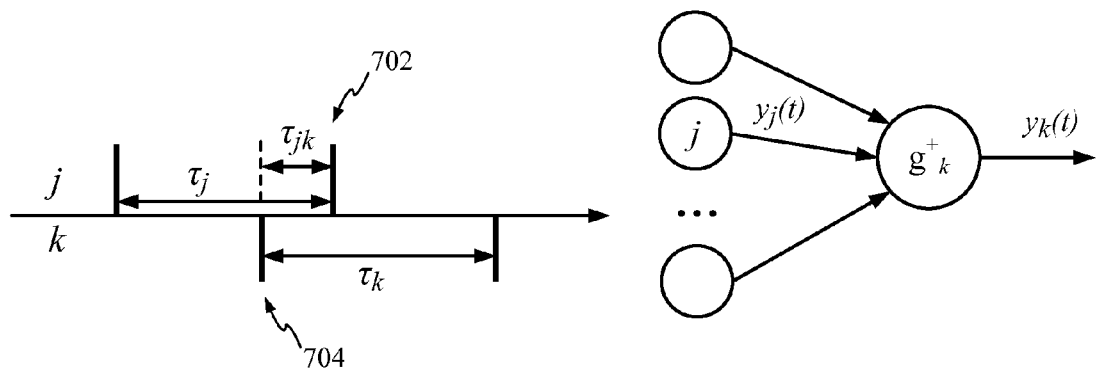
FIG. 7 is a timing diagram and associated pre-synaptic and post-synaptic neurons illustrating the difference between non-self-referential post-synaptic neuron (NSR-POST) reference time and a self-referential (SR) reference time, in accordance with certain aspects of the present disclosure.

As described above, the information in the input is coded in the time difference ($\tau_{jk}$) of spikes between the input spike time 702 and the prior output spike time 704 of the post-synaptic neuron (e.g., neuron k) or non-self-referential form relative to the post-synaptic neuron or (NSR-POST), as illustrated in FIG. 7. In contrast, the information in the output is coded in the time difference ($\tau_k$) between consecutive spikes of the post-synaptic neuron or self-referential (SR) form.

The method described above may be generalized and may use SR or NSR (whether NSR relative to the post-synaptic neuron or some third neuron) for input or output forms. This generalization is described in more detail below.

Converting Information for External Input or Output

Input may be provided to a synapse as a spike train $y_t(t)$. However, a sensory input sequence is often in a real-valued form $x_t(t)$. Such a sequence may be converted into a SR or NSR spike train in several ways. First, basic forms are considered.

A sequence $x_t(t)$ may be converted to an SR temporally coded spike sequence $y_t(t)$ according to the following algorithm:
1. Let $t_i^-$ be the last time neuron i spiked (arbitrarily initialized to 0) (i.e., set $t_i^-$ to the previous value of $t_i^+$).
2. Compute $\tau_i = -\log_q \bar{x}_i(t)$, where $\bar{x}_i(t)$ is a function of $x_i(t)$ (such as the mean value) over a short time period T after $t_i^-$ (or alternatively a short time period T prior to $t_i^-$).
3. Let the time of the next spike be $t_i^+ = t_i^- + \tau_i$.

To perform the reverse conversion $x_t(t)$ may be set to $x_t(t_t^- < t)$ until a spike occurs at time t. Then, set $x_t(t) = q^{-\tau_t}$ where $\tau_t = t - t_t^-$.

A sequence $x_t(t)$ may be converted to an NSR temporally coded spike sequence $y_t(t)$ according to the following algorithm:
1. Let $t_k^-$; be the last time neuron k spiked (arbitrarily initialized to 0) (i.e., set $t_k^-$ to the previous value of $t_k^+$).
2. Compute $\tau_{ik} = -\log_q \bar{x}_i(t)$, where $\bar{x}_i(t)$ is a function of $x_i(t)$ (such as the mean value) over a short time period T after $t_k^-$ (or alternatively a short time period T prior to $t_k^-$).
3. Let the time of the next spike be $t_i^+ = t_k^- + \tau_{ik}$.

To perform the reverse conversion, $x_t(t)$ may be set to $x_t(t_t^- < t)$ until a spike occurs at time t. Then, set $x_t(t) = q^{-\tau_t}$ where $\tau_{ik} = t - t_k^-$.

At this point, it may now be evident that a single neuron may be used to implement a linear transformation from any number of inputs to a single output. However, by using multiple neurons, any transformation from N inputs to M outputs, $$x_{out}(t) = W x_{in}(t)$$

may be computed by M neurons with delays computed given the rows of matrix W. Moreover, some of those outputs may be fed back as inputs (i.e., there can be overlap).

Above, only the soonest spike that would occur for each input frame has been considered. This is a subtlety in the neuron model. Effectively, the ALIF neuron was modeled as described above with an additional operation upon firing (namely, when checking for a spike, if $v_k^+(t) \geq v_\theta$, then $y_k(t)=1$, reset $v_k^+(t)=v_0$, and clear all inputs $y_k(t_{clear})$ for $t_{clear} < t$). What this means is that upon firing, the neuron forgets about any inputs that have not yet propagated to the soma. Thus, the neuron will not fire again merely because of superfluous inputs.

However, this is not strictly necessary. Alternatively, the neuron may be allowed to fire again and merely accept an occasional error. Another way to deal with this is to set up an oscillation that drives the system in a frame-like mode where only particular outputs are taken to have meaning. Another way is to use inhibition to prevent firing for some time and clear the system for the next computation. Thus, there are many ways to get around this. The remainder of the disclosure will continue using the above model.

It may also be noted that a different base (e.g., a different q) may be used for every neuron if desired. For a single input, assuming $\Delta \omega_k \to 0$, $$g_k^+(\tau_{jk}) = \tau_k = \Delta \tau_{jk} + \tau_{jk}$$

If a different parameter q is used for the input $q_j$ and the output $q_k$, $$\tau_{jk} = -\log_{q_j} x_j$$

$$\tau_k = -\log_{q_k} x_k$$

In the value domain, this not only provides another means of scaling, but it also allows one to operate different neurons in different ranges and interface them.

For certain aspects, an alternative to the above conversions is to use a proxy neuron to convert real-valued input to either SR spikes or NSR spikes (for this purpose any type of neuron might be used).

Next, negative weights (coefficients) are considered. There are no non-complex valued delays corresponding to negative weights in the value domain. To apply a negative weight, the input may be switched to inhibitory instead of excitatory. I.e., one may merely flip the sign. Recall $$\left(\frac{1}{q}\right)^{\tau_k} = \Delta \omega_k + \sum_j \omega_{jk} \left(\frac{1}{q}\right)^{\tau_{jk}}$$

where $\omega_{jk} = q^{-\Delta \tau_{jk}}/v_k^+(\tau_k)$. Thus for a negative value of $\omega_{jk}$, use the absolute value of $\omega_{jk}$ to determine $\Delta \tau_{jk}$, $$\Delta \tau_{jk} = -\log_q(|\omega_{jk}|v_k^+(\tau_k))$$

but then set the input to a negative value to achieve $$\left(\frac{1}{q}\right)^{\tau_k} = \Delta \omega_k + \sum_j \text{sign}(\omega_{jk}) q^{-\Delta \tau_{jk}}/v_k^+(\tau_k) \left(\frac{1}{q}\right)^{\tau_{jk}}$$

Figure 8:
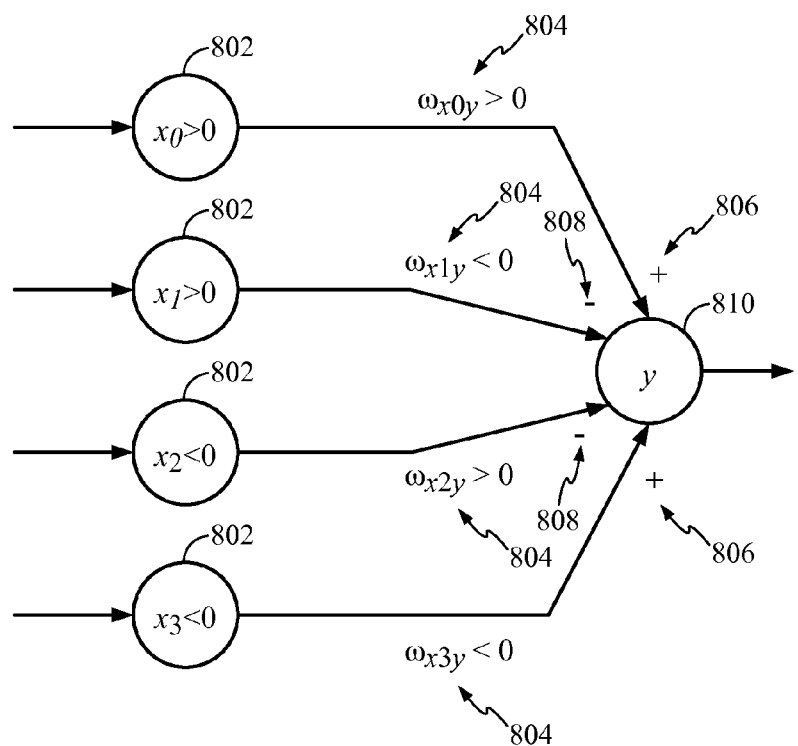
FIG. 8 illustrates all possible combinations of positive and negative values and positive and negative scaling values leading to excitatory and inhibitory inputs on a neuron, in accordance with certain aspects of the present disclosure.

FIG. 8 illustrates all possible combinations of positive and negative input values 802 and positive and negative scaling values 804 leading to excitatory and inhibitory inputs 806, 808 on a neuron 810, in accordance with certain aspects of the present disclosure.

However, a different problem is representing both negative and positive values of the same variable. One way to overcome this is to use the negative of the input instead of a negative weight. Thus, the problem becomes one of creating a negative input, as well as a positive input.

$$x_t(t)=[x_t(t)]_+ - [-x_t(t)]_+$$

However, each may only take on positive magnitudes (i.e., the negative input cannot represent a double negative or positive value, and the positive input cannot represent a negative value) or zero. Note that zero translates to an infinite (or very large) relative input timing.

Figure 9:
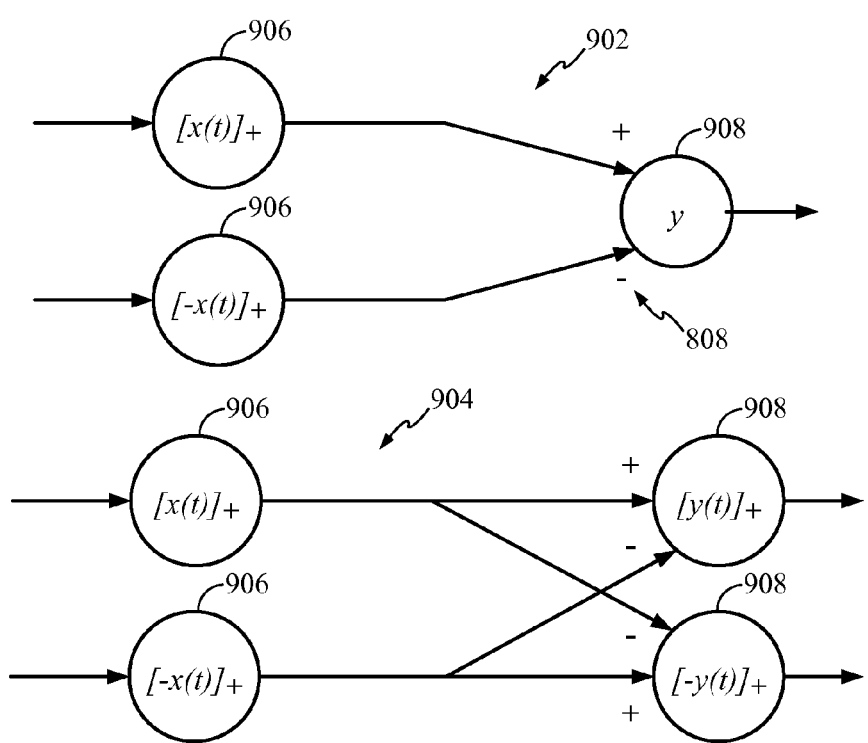
FIG. 9 illustrates representing a negative value with a neuron coding $[-x_i(t)]_+$ positively and connected as an inhibitory input, in accordance with certain aspects of the present disclosure.

Now, the equivalent may be done to the above weight negation to deal with a negative input with a positive weight. The negative value may be represented with a neuron coding $[-x_t(t)]_+$ positively and connected as an inhibitory input 808, as illustrated in the upper diagram 902 of FIG. 9. If both the value and weight are negative, they cancel out, and one need not do anything different. While the upper diagram 902 illustrates representing the positive and negative values for an input neuron 906, the lower diagram 904 of FIG. 9 illustrates representing positive and negative values for both an input and an output neuron 908.

The key is to separate the domains (+ve) and (−ve) (if both are involved) into separate representations for output and then recombine them (using excitation and inhibition) upon input. If the input is constrained to a particular domain (e.g., positive), then this separation need not be done.

Example A

Scaling a Scalar

Certain aspects of the present disclosure may be demonstrated with a scaling example. In this example, a spiking neuron may perform $x_k=a_{ik}x_i(t)$. In other words, the desired output is a scaled version of the input. This example uses an all spiking network (all input and output is in the form of spikes) in an asynchronous frame mode using the output neuron's spikes as the reference time. Recall that the time resolution may be infinite (continuous) or discrete (whether in fixed or variable steps).

Figure 10:
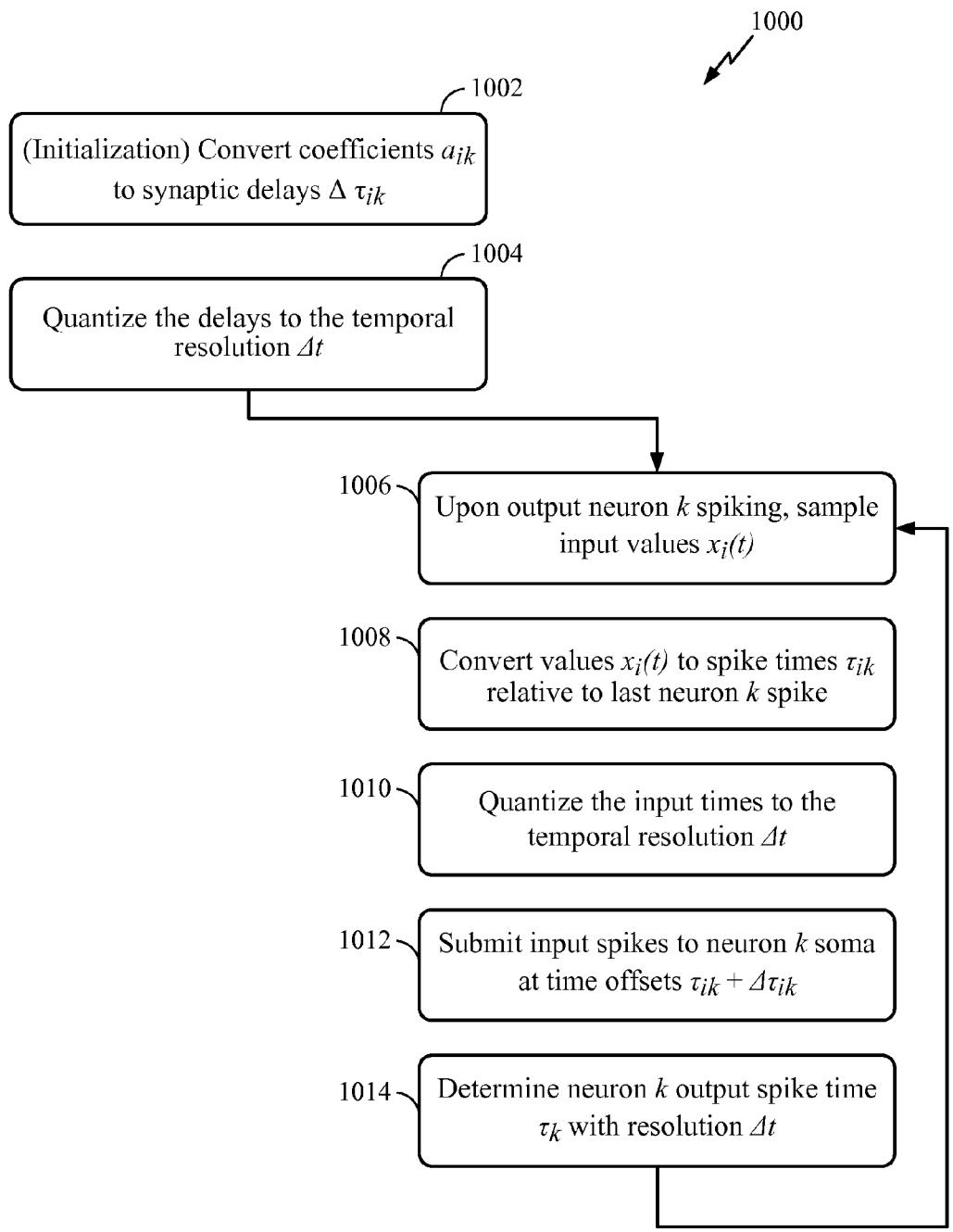
FIG. 10 is a flow diagram of example operations for scaling a scalar value using a neuron model, in accordance with certain aspects of the present disclosure.

FIG. 10 is a flow diagram of example operations 1000 for scaling a scalar value using a neuron model, in accordance with certain aspects of the present disclosure. The operations 1000 may begin with initialization at 1002 and 1004. At 1002, synaptic delays $\Delta\tau_{ik}$ corresponding to the coefficients $a_{ik}$ for the desired linear computation may be computed. At 1004, the delays may be quantized to the temporal resolution $\Delta t$. Thereafter, the operations 1000 enter a loop. At 1006, input values $x_i(t)$ are sampled upon spiking of output neuron k. At 1008, values $x_i(t)$ are converted to spike times $\tau_{ik}$ relative to the last spike of neuron k. At 1010, the input spike times are quantized to the temporal resolution $\Delta t$. At 1012, the input spikes are submitted to the soma of neuron k at time offsets $\tau_{ik}+\Delta\tau_{ik}$. At 1014, the output spike time τk of neuron k is determined with resolution $\Delta t$.

Each iteration of the loop in the operations 1000 corresponds to one output spike of the neuron k. Thus, the timing is asynchronous because the frame duration depends on the inter-spike interval of neuron k. When using this kind of asynchronous frame (reference), the sampling rate of the input is variable. Specifically, if the total input is large (value-domain) so the input delays are small, the neuron k fires earlier and, thus, samples the input again in a short time. The converse occurs if the total input is small (value-domain). Accordingly, the sampling rate of the input is proportional to the magnitude of the output value. This has an advantage in that significant input values are sampled more often, while insignificant inputs tend to be sampled at a low or minimal rate, thereby saving computational power and resources.

To see how this works, the desired scalar linear result may be obtained with just a single spiking neuron k. As described above, for initialization one may compute $\Delta\tau_{tk}=-\log_q(v_k^+(\tau_k))$. For this example, a discrete time system (instead of continuous time) is used to demonstrate the effects of time resolution. Suppose for this example, $\Delta t=0.1$ ms and let $\rho^+=0.1$, arbitrarily small $\Delta\omega_k=0.01$ with $v_0=1$. This yields $v_\theta=100$ and a minimum neuron firing rate of about 21 Hz or a period of 48 ms (absent any input). The parameter g≅1.1. The operable coefficient range is 0.0001 to 0.01. An arbitrary coefficient $a_{ik}$ is chosen for this example (e.g., ½ of the coefficient maximum), and a time offset sinusoid is submitted of the form, $$x_t(t)=(1+\sin(2\pi f_t(t+T_t)))/2$$

The output will be on a scale of 0.01 (due to $\Delta\omega_k$) to a maximum of 0.02, if $a_{ik}=½$ is chosen.

Figure 11A:
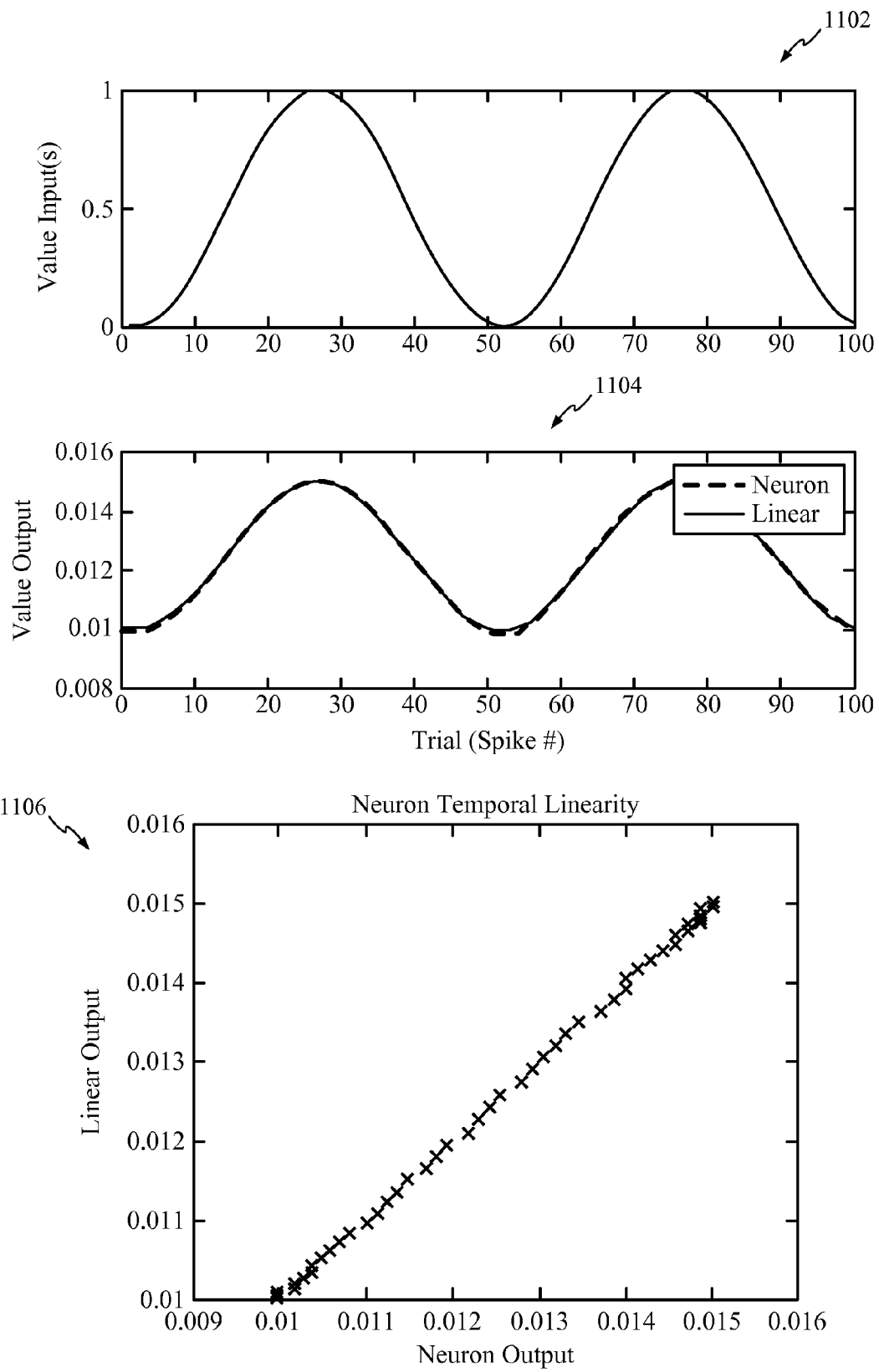
FIG. 11A illustrates example input values over time, output values over time, and linearity when scaling a scalar input on a single dendritic input of a single neuron model using a temporal resolution of 0.1 ms, in accordance with certain aspects of the present disclosure.
Figure 11B:
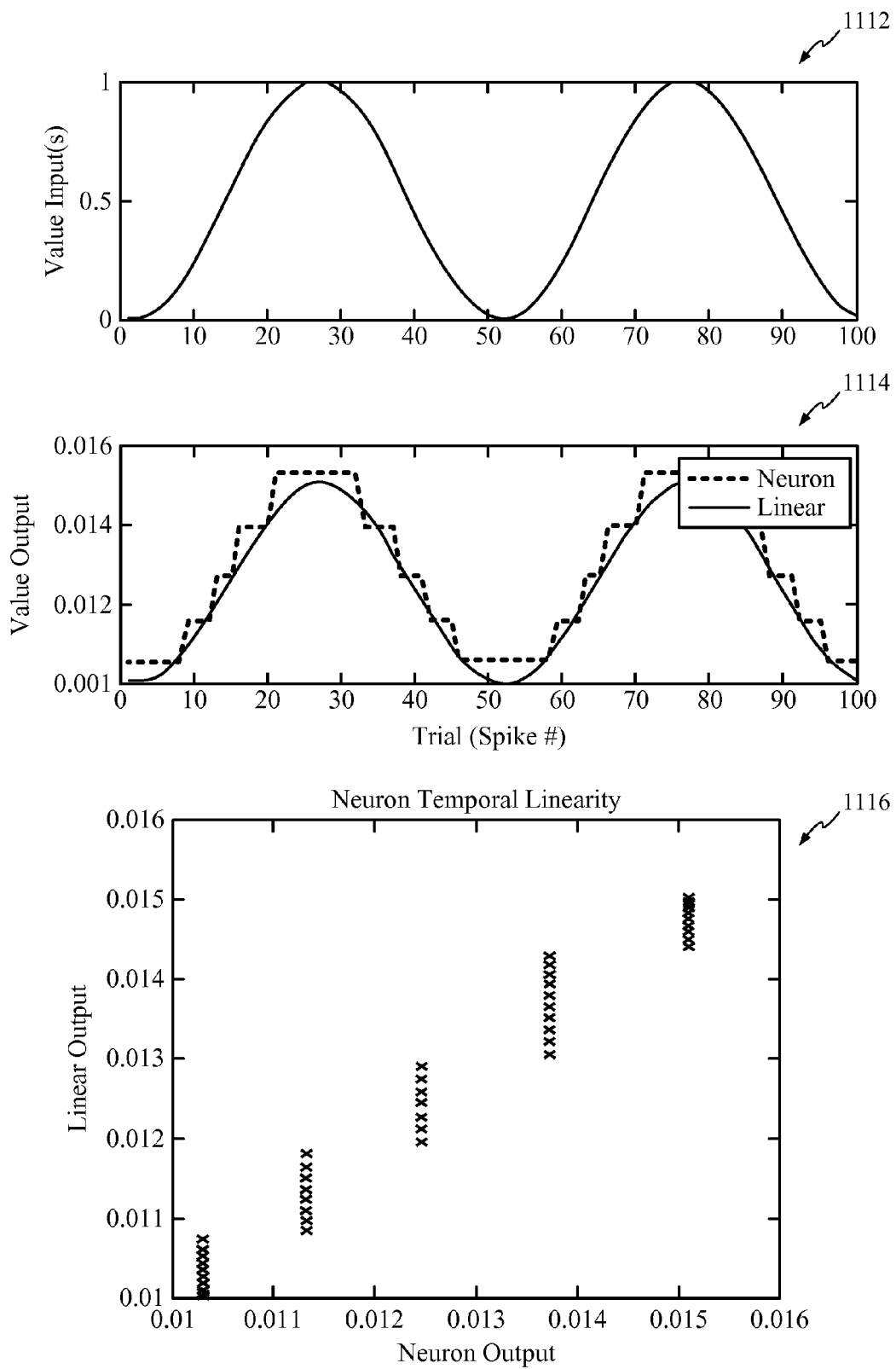
FIG. 11B illustrates example input values over time, output values over time, and linearity when scaling a scalar input on a single dendritic input of a single neuron model using a temporal resolution of 1.0 ms, in accordance with certain aspects of the present disclosure.

FIG. 11A illustrates a graph 1102 of example input values over time, a graph 1104 of output values over time, and a linearity graph 1106 when scaling a scalar input on a single dendritic input of a single neuron model using a temporal resolution of 0.1 ms, in accordance with certain aspects of the present disclosure. FIG. 11B illustrates a graph 1112 of example input values over time, a graph 1114 of output values over time, and a linearity 1116 when scaling a scalar input on a single dendritic input of a single neuron model using a temporal resolution of 1.0 ms, in accordance with certain aspects of the present disclosure. As illustrated, the neuron model is highly linear in the temporal coding domain. Of course, the precision depends on the time resolution. So, when the time resolution degraded by 10×, the errors due to temporal resolution become noticeable in the output.

Example B

Linear Transformation

In this example, the same Example A is used, but more inputs are added. The neural model desired is $$x_k(t) = \sum_i a_{ik} x_i(t)$$

The coefficients are set exactly as in the example above. Ten inputs are used, and arbitrary coefficients are chosen across the range, say fractions [0.5 0.65 0.55 0.5 0.39 0.59 0.4 0.81 0.87 0.35] of the maximum coefficient value. One may use the same input format as the prior example (an offset sinusoid), except offset each input by a different amount. From trigonometry, one knows the result $x_k(t)$ is a scaled sinusoid if the frequencies are the same, so this example uses a different frequency for each input to make it more interesting. A single neuron is used to compute this, and the synaptic delays are assigned according to the coefficients, just as in the example above, yielding delays of [6.9 4.3 6 7 9.5 5.3 9.2 2.1 1.4 10.5] in ms.

Figure 12A:
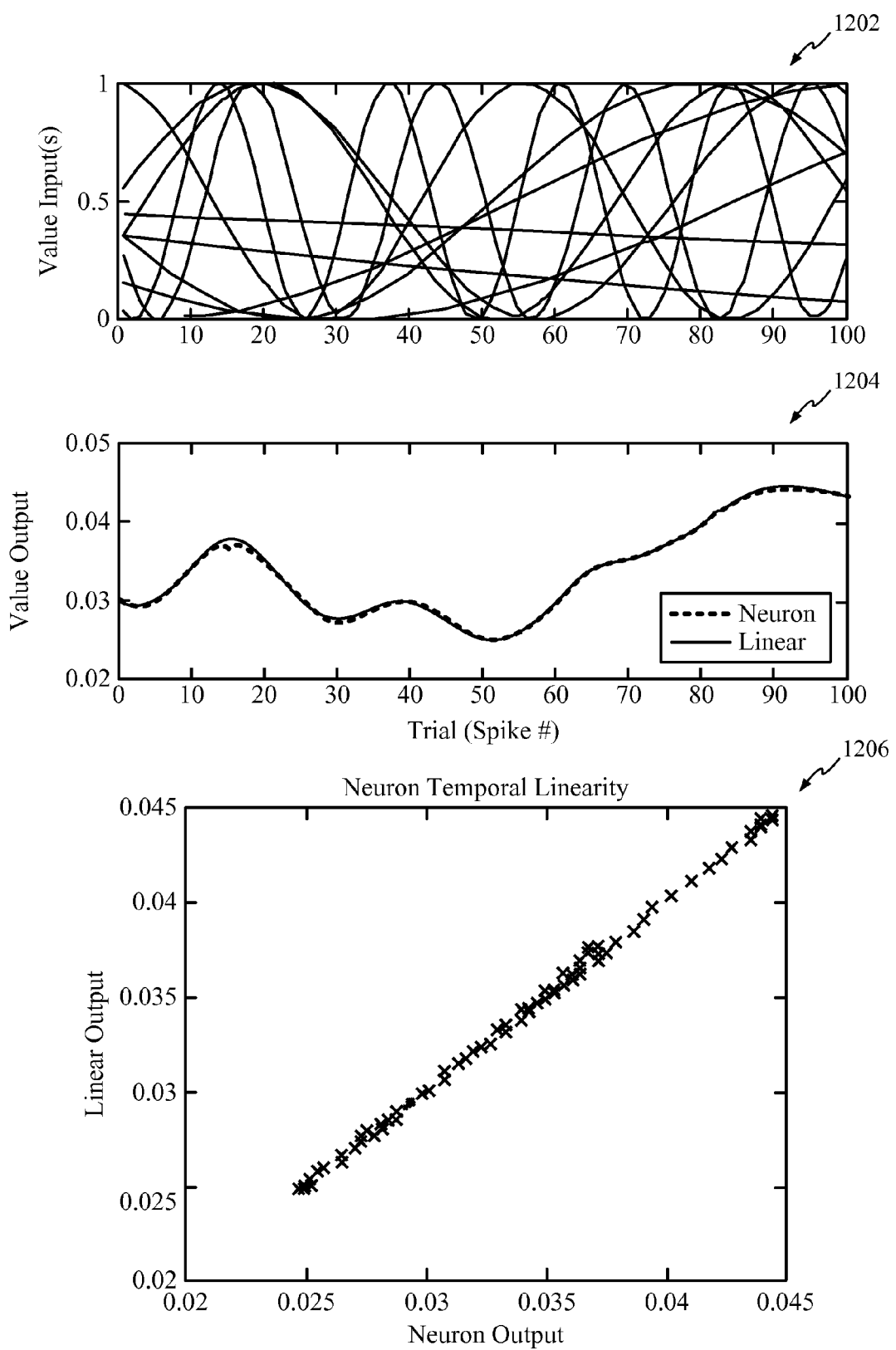
FIG. 12A illustrates example input values over time, output values over time, and linearity when scaling scalar inputs on ten dendritic inputs of a single neuron model using a temporal resolution of 0.1 ms, in accordance with certain aspects of the present disclosure.
Figure 12B:
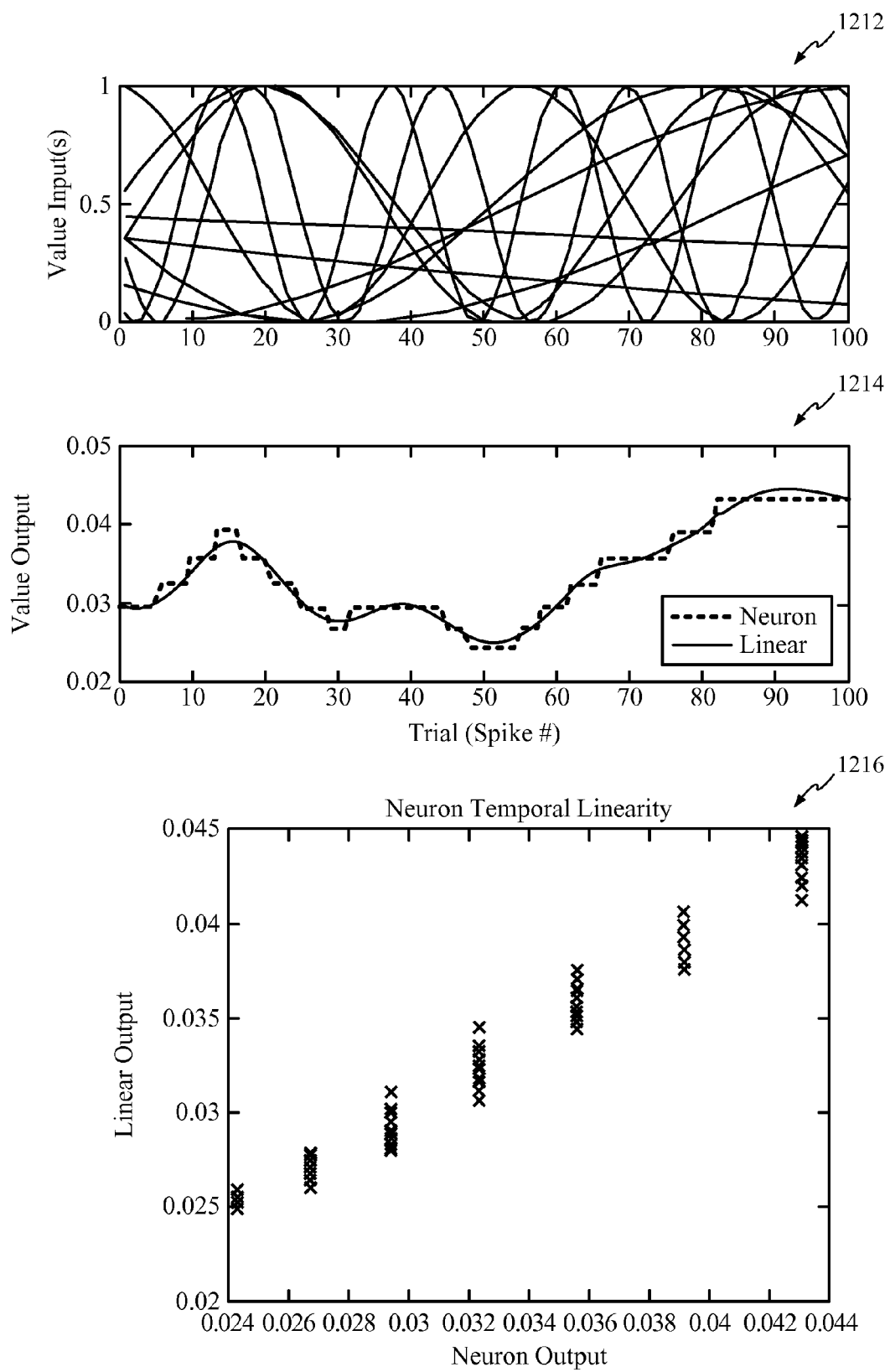
FIG. 12B illustrates example input values over time, output values over time, and linearity when scaling scalar inputs on ten dendritic inputs of a single neuron model using a temporal resolution of 1.0 ms, in accordance with certain aspects of the present disclosure.

FIG. 12A illustrates a graph 1202 of example input values over time, a graph 1204 of output values over time, and a linearity graph 1206 when scaling scalar inputs on ten dendritic inputs of a single neuron model using a temporal resolution of 0.1 ms, in accordance with certain aspects of the present disclosure. FIG. 12B illustrates a graph 1212 of example input values over time, a graph 1214 of output values over time, and a linearity graph 1216 when scaling scalar inputs on ten dendritic inputs of a single neuron model using a temporal resolution of 1.0 ms, in accordance with certain aspects of the present disclosure. Note that when Δt=1 ms, the synaptic delays also lose resolution and become [7 4 6 7 10 5 9 2 1 11]. The sensitivity to time resolution decreases as one adds inputs. This may be seen in the number of vertical bins of results in the linearity graph 1216 of FIG. 12B. Effectively, the range of output timing becomes larger with more inputs. The mean output error in time for the Δt=0.1 ms case was below 0.01 ms and for the Δt=1 ms case was below 0.1 ms. Basically, this means the neuron has an error of one time resolution about 1 in 10 spikes.

Example C

Positive and Negative Coefficients

In this example, the same example as above is used, but negative coefficients are included. Ten inputs are used, and arbitrary coefficients are chosen across the range, say fractions [0.5 0.65 0.55 0.5 −0.39 −0.59 −0.4 0.81 0.88 0.35]. The absolute values of these are used to compute the delays. However, for negative valued inputs, the synapse is switched to inhibitory.

Figure 13A:
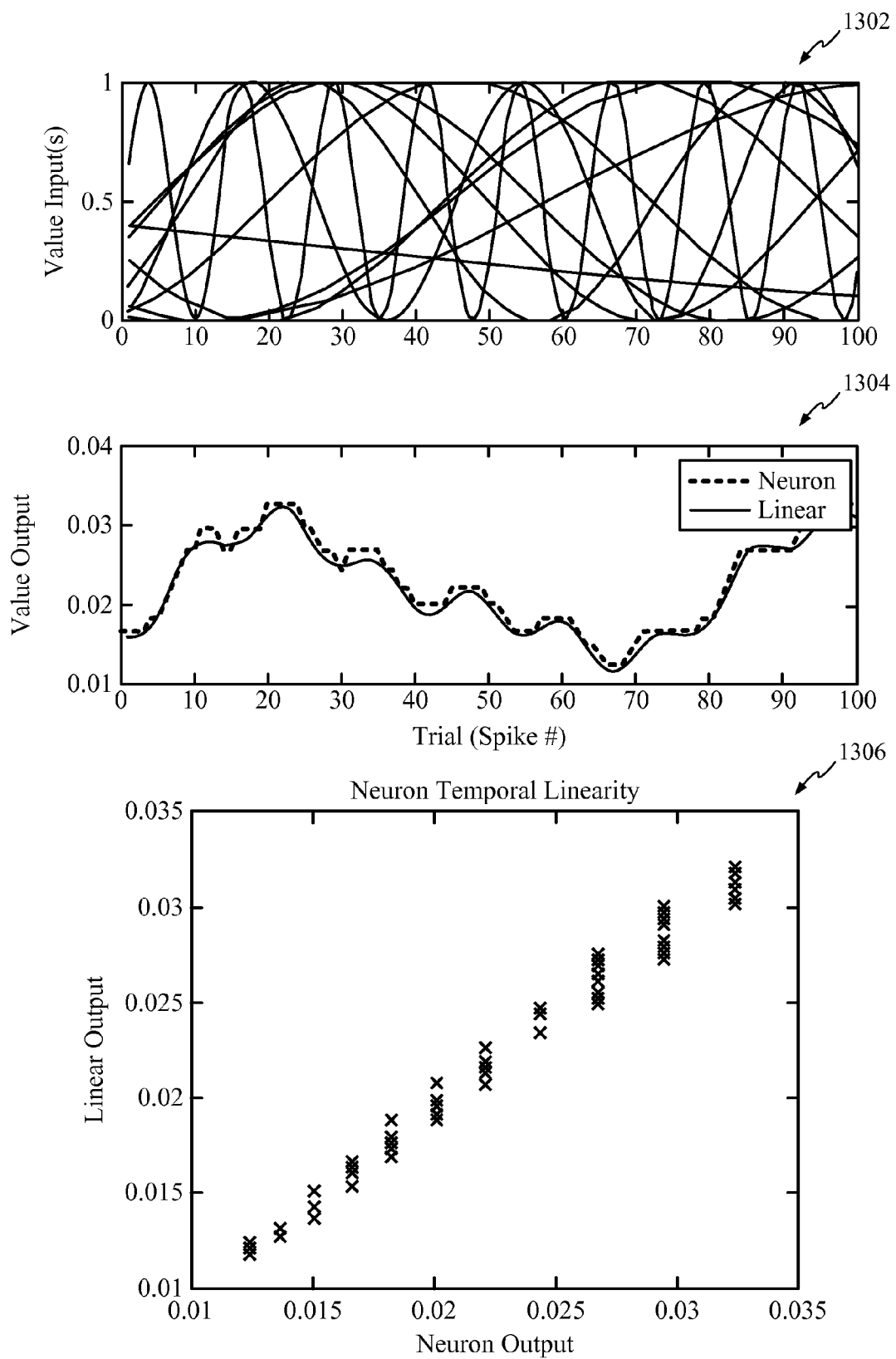
FIG. 13A illustrates example input values over time, output values over time, and linearity when scaling scalar inputs on ten dendritic inputs of a single neuron model using a temporal resolution of 1.0 ms, using both positive and negative scaling values, in accordance with certain aspects of the present disclosure.
Figure 13B:
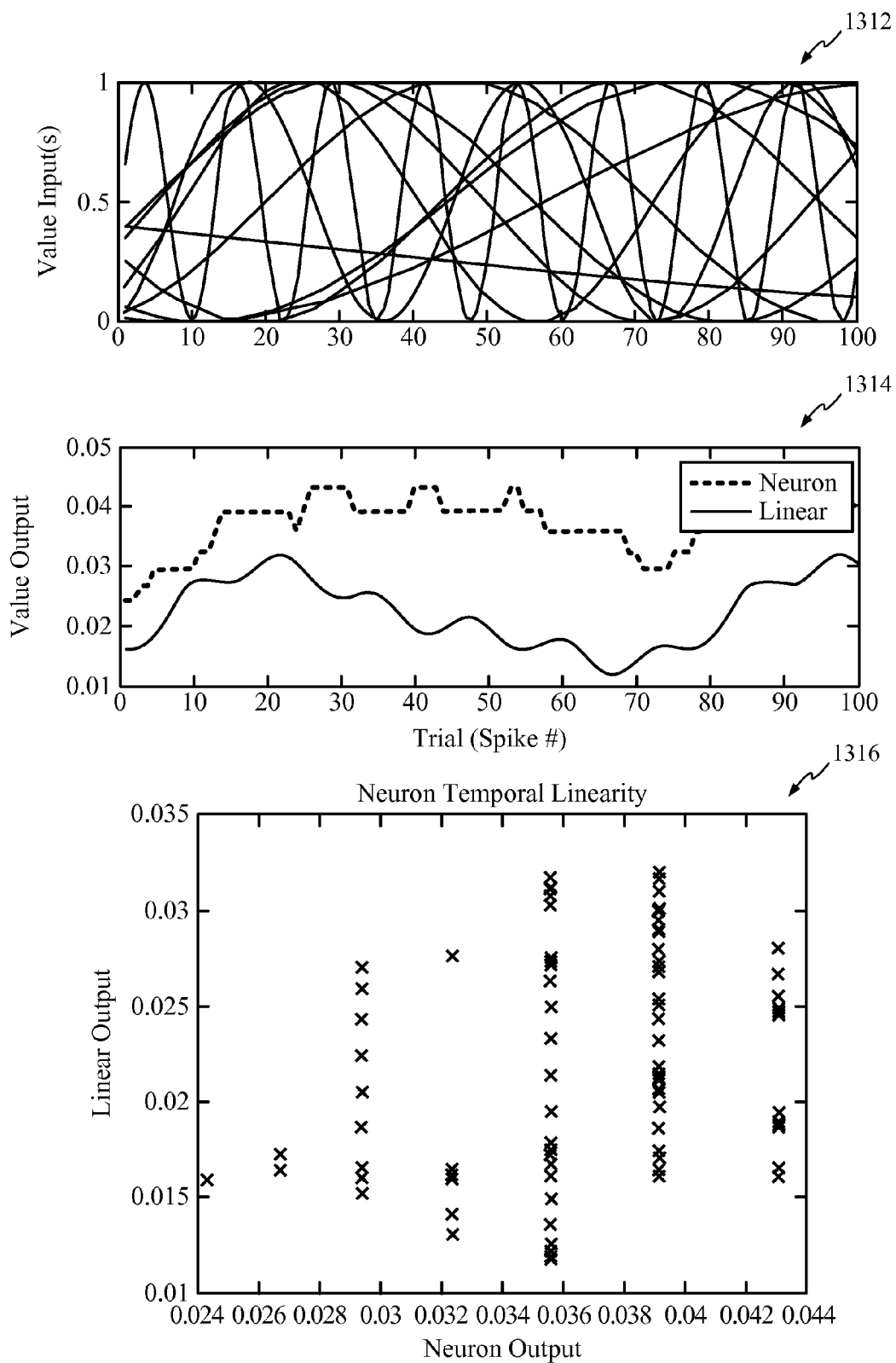
FIG. 13B illustrates example input values over time, output values over time, and linearity when scaling scalar inputs on ten dendritic inputs of a single neuron model using a temporal resolution of 1.0 ms, using both positive and negative scaling values, but erroneously omitting the flip to inhibition for comparison with FIG. 13A, in accordance with certain aspects of the present disclosure.

FIG. 13A illustrates a graph 1302 of example input values over time, a graph 1304 of output values over time, and a linearity graph 1306 when scaling scalar inputs on ten dendritic inputs of a single neuron model using a temporal resolution of 1.0 ms, using both positive and negative scaling values, in accordance with certain aspects of the present disclosure. FIG. 13B illustrates a graph 1312 of example input values over time, a graph 1314 of output values over time, and a linearity graph 1316 when scaling scalar inputs on ten dendritic inputs of a single neuron model using a temporal resolution of 1.0 ms, using both positive and negative scaling values, but erroneously omitting the flip to inhibition.

Example D

Noisy ALIF

Noise may be added to an ALIF model by adding a noise term in any of various suitable ways. One simple way is to add a noise term to the differential equation coefficient $\rho^+$:

$$\rho^{+'} = \rho^+ + \rho_\epsilon$$

This is an aggressive form of noise because as the membrane potential gets larger, the same value for the noise term generates a larger and larger change in membrane potential. However, this is arguably biologically consistent since this is what would happen if a superfluous input hits the neuron when this neuron is closer to firing.

Figure 14:
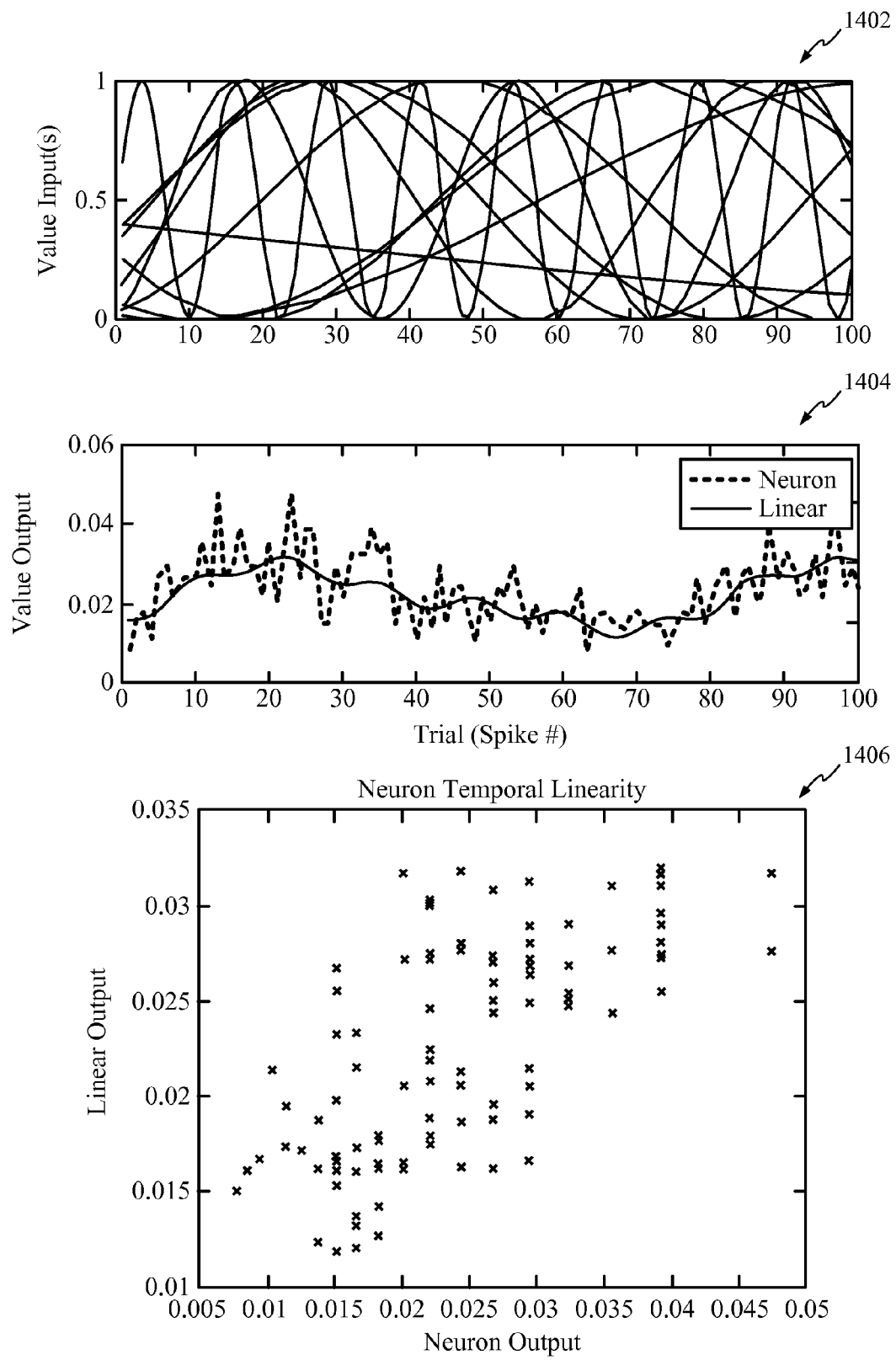
FIG. 14 illustrates example input values over time, output values over time, and linearity when scaling scalar inputs on ten dendritic inputs of a single neuron model using a temporal resolution of 1.0 ms, using both positive and negative scaling values and a noise term added to the membrane potential of the neuron model, in accordance with certain aspects of the present disclosure.

In this example as illustrated in FIG. 14, the Example C above is repeated (with positive and negative coefficients), except the noise term above has been added, the noise term having a Gaussian distribution with zero mean and standard deviation 10% of the value of $\rho^+$, assuming Δt=1 ms. The noise term is assumed to be white (i.e., additive white Gaussian noise (AWGN)).

FIG. 14 illustrates a graph 1402 of example input values over time, a graph 1404 of output values over time, and a linearity graph 1406 when scaling scalar inputs on ten dendritic inputs of a single neuron model using a temporal resolution of 1.0 ms, using both positive and negative scaling values and a noise term added to the membrane potential of the neuron model, in accordance with certain aspects of the present disclosure. One can see that despite a significant noise disruption to the linearity for any given time point in the linearity graph 1406, on average, the neuron is able to follow the linear transformation remarkably well, as illustrated in the graph 1404.

Converting Relative Time References

This section addresses converting between the two relative time forms, namely self-referential (SR) and non-self-referential (NSR). Converting a self-referential (SR) time to a non-self-referential post-synaptic neuron time (NSR-POST) is of particular interest because the neuron model described above (e.g., with respect to FIG. 7) accepts NSR-POST input timing and outputs SR timing. To feed that neuron's input to another may most likely entail conversion. The distinction of NSR sub-forms is one between whether the pre-synaptic spike time is relative to the post-synaptic neuron spike time (NSR-POST) or relative to a third neuron's spike time (NSR-THIRD).

A key insight is that the ALIF neuron model defined above includes resetting the membrane potential $v_k^+(t)=v_0$ at the time of spiking. However, this may just as easily be redefined to resetting $v_k^+(t)=v_\phi$ upon spiking, where $v_\phi \leq 0$. Effectively, this models a simple neuron in a sub-threshold condition, until the potential is increased above zero by input. Without loss of generality, one may set input magnitude to $v_0$. Now, all the SR output timing will get translated to NSR timing relative to the input which occurs first.

However, if the input which occurs first is designated as input r, the temporal conversions may be controlled across neurons because providing the same input r to two neurons (one pre-synaptic and one post-synaptic) converts $$g_k^+(\{\tau_{jk}\}_j) = \tau_k$$

to $$g_k^+(\{\tau_{jr}\}_j) = \tau_{kr}$$

Figure 15:
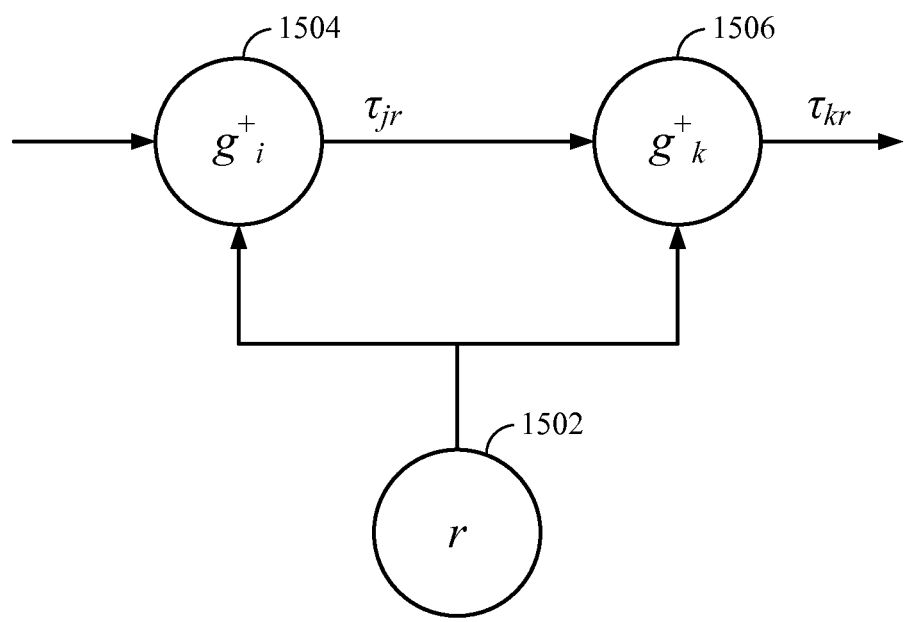
FIG. 15 illustrates providing the same reference to two neurons, in accordance with certain aspects of the present disclosure.

As an example, FIG. 15 illustrates providing the same input r 1502 to a pre-synaptic neuron 1504 and a post-synaptic neuron 1506.

Figure 16:
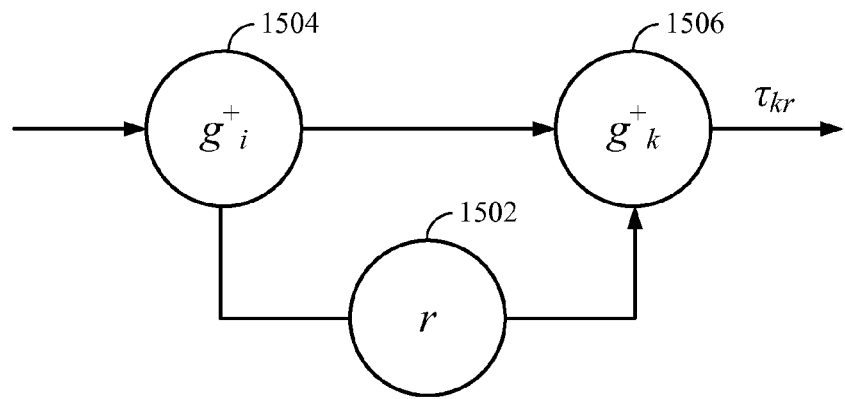
FIG. 16 illustrates a feed-forward case of using a reference for two neurons, in accordance with certain aspects of the present disclosure.

However, an actual reference need not even exist because whichever input occurs first automatically provides a reference. The only prerequisite is that the information is coded in the relative time difference between inputs. This may be achieved in a variety of ways, including using lateral inhibition between inputs to create interdependence. Alternatively, the reference may be driven by connecting all inputs as inputs to the reference with one being sufficient to cause the reference to fire. Thus, the reference will fire as a function of the first input firing. This solves the problem, as well, and also provides a single element (the reference) as an indication for relative readout of the output. FIG. 16 illustrates this feedforward case for a single input.

Figure 17:
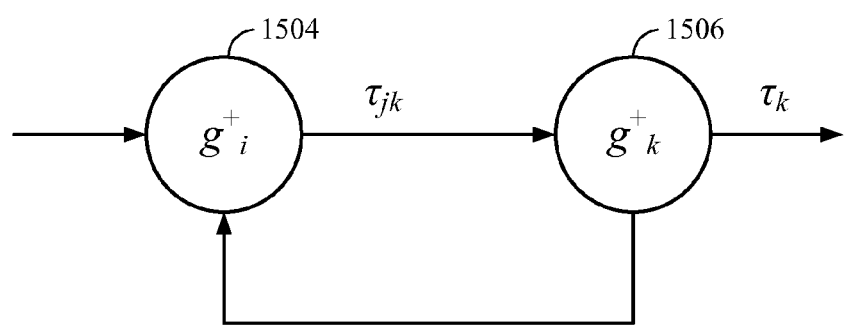
FIG. 17 illustrates a feedback case of using a reference for two neurons, in accordance with certain aspects of the present disclosure.

For certain aspects, feedback may also be used to accomplish the above as depicted in FIG. 17. Although this is a less general case since the immediately downstream neuron is used as the reference, it is a natural case to show because it corresponds exactly to $\tau_{jk}$ as input to compute $\tau_k$.

The above modification (i.e., resetting the neuron's potential to a value other than $v_0$) may be used for another purpose.

Suppose that upon spiking (or other reference time), instead of $v_k^+(t)=v_0$ let $v_k^+(t)=v_+$. If $v_+>v_0$ this will advance the next firing (i.e., decrease $\tau_k$). Alternatively, if $v_+<v_0$ this will delay the next firing (i.e., increase $\tau_k$). This is assuming the configuration of the neuron remains as computed given $v_0$ (i.e., that the value of $v_0$ is not changed to equate to $v_+$). For example, assuming there would have been no input between the reference time and the hypothetical time the neuron potential would have reached $v_+$ if it had been reset to $v_0$ (instead of $v_+>v_0$), the change in $\tau_k$ is given by $$\Delta\tau_k=\log_q(v_0/v_+)$$

The opposite (an increase) may be achieved by setting $v_+<v_0$. Recalling the definition of the value $\tau_k=-\log_q x_k$, the effect of the above on the value is, $$x'_k=w'_k x_k=q^{-\Delta\tau_k}q^{-\tau_k}$$

or $w'_k=q^{-\Delta\tau_k}$. Thus, one may arbitrarily alter the output of a $g_k^+$ neuron by a factor $w'_k$ in the value domain simply by adjusting the reset voltage $v_+$, $$v_+=v_0 q^{\Delta\tau_k}=v_0 w'^{-1}_k$$

The $g_k^+$ neuron may also operate in different time ranges for input and output. Output timing may generally vary in the range of $[\Delta t, t_k^{+'}]$, where $$t_k^{+'}=\log_q\frac{v_\theta}{v_0}$$

(assuming the reset potential is $v_0$). This upper bound is the time at which the neuron will fire absent input. However, the minimum observed time is typically not going to be $\Delta t$ because of the combination of input timing and input delays. This will effectively compress the output time range against the upper bound so that it may be desirable to re-expand this range for input to a subsequent neuron. This may be easily done by using a new reference that is delayed from the prior reference by the implicated amount.

Suppose the minimum delay is $\tau_k^{min}$, such that $$x'_k=q^{-\tau_{jk}+\tau_k^{min}}$$

Thus, by changing to a reference that has a spike timing of $\tau_k^{min}$ later (may alternatively be earlier), one may scale the value by $Q^{\tau_k^{min}}$ by offsetting the time range. For example, if the minimum delay $\tau_k$ is 20 ms, one may subtract 20 ms by using a reference that is 20 ms later. This will scale the value domain amount up to a larger range. Although the discrete time forms of the equations are used above, the analogous operations may be done in continuous form as demonstrated above.

For certain aspects, one may time a multi-neuron system (e.g., the neural system 100 of FIG. 1) using a propagating reference wave. A propagating reference wave serves as a reference reset time for neurons, which resets different neurons at different times. Thus, the outputs of pre-synaptic neurons may be appropriately converted to inputs for post-synaptic neurons by providing the appropriately delayed reference change.

Figure 18:
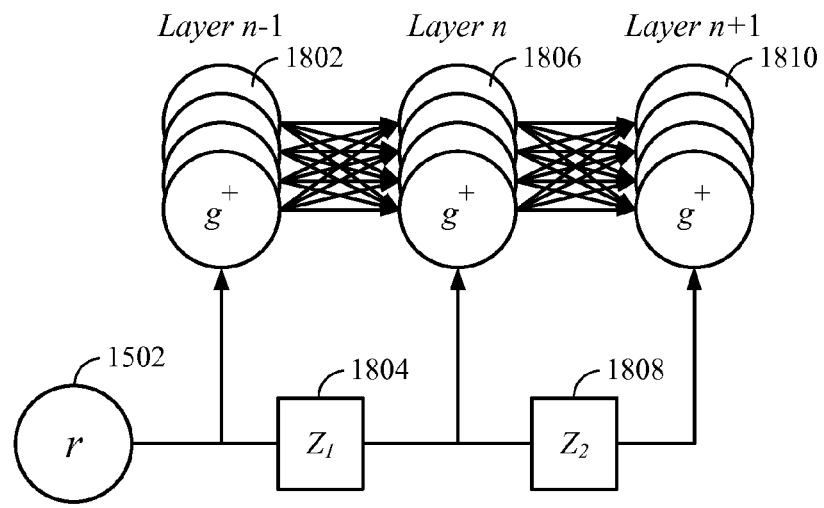
FIG. 18 illustrates a propagating reference wave for a series of neurons, in accordance with certain aspects of the present disclosure.

FIG. 18 illustrates a propagating reference wave for a series of neurons, in accordance with certain aspects of the present disclosure. In FIG. 18, layer n−1 neurons 1802 receive input r 1502 as a reference. Input r 1502 is delayed by a first delay ($z_1$) 1804, and the delayed r (delayed') serves as a reference for the layer n neurons 1806. The delayed r is further delayed by a second delay ($z_2$) 1808, and the resulting delayed r (delayed") serves as a reference for the layer n+1 neurons 1810. The first delay 1804 may be the same or different from the second delay 1808.

For certain aspects, this propagating reference frame wave may also be used as a reference for input (write in) and output (read out). The reference may also be supplied as a background noise or oscillation level that propagates across the layers. The reference frame wave may also be self-generated as mentioned above (i.e., by the prior layer(s) or prior frame of subsequent layer(s) or a combination thereof).

Another optional benefit of the frame wave is that it provides an alternative way to deal with late inputs that may cause superfluous firing of the post-synaptic neuron (unless cleared out): output is clocked through the system using the reference in waves of excitation and inhibition so that only outputs following the reference within a prescribed time are acted upon.

Figure 19:
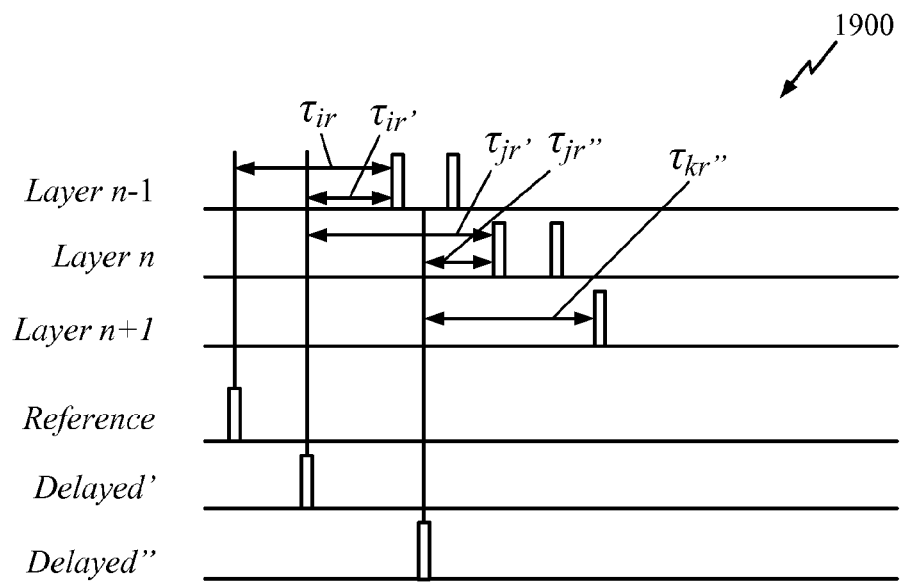
FIG. 19 illustrates an example timing diagram for the series of neurons having the propagating reference wave of FIG. 18, in accordance with certain aspects of the present disclosure.

FIG. 19 illustrates an example timing diagram 1900 for the series of neurons having the propagating reference wave of FIG. 18, in accordance with certain aspects of the present disclosure. The layer n−1 neurons 1802 may be considered as neurons i, the layer n neurons 1806 may be considered as neurons j, and the layer n+1 neurons 1810 may be considered as neurons k.

Figure 20:
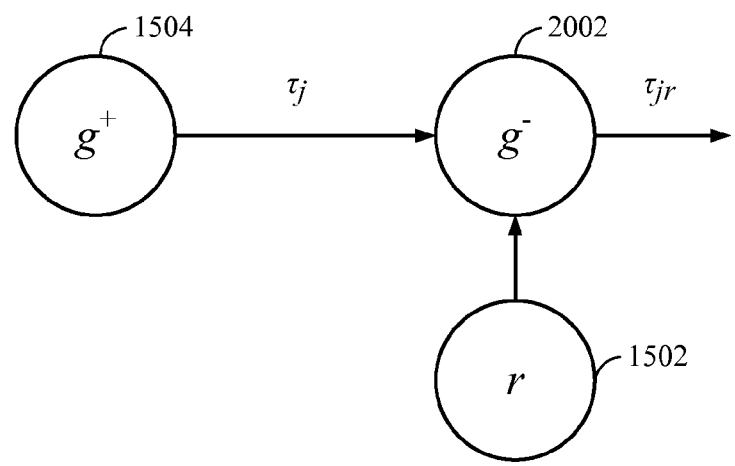
FIG. 20 illustrates using an example g-neuron, in accordance with certain aspects of the present disclosure.

For certain aspects, an alternative may be to use what is deemed a $g^-$ neuron 2002 as portrayed in FIG. 20. The purpose of this type of neuron is to convert SR to NSR, or $\tau_j$ to $\tau_{jr}$, as depicted in FIG. 20. One way to accomplish this is with a special dynamic operation for the $g^-$ neuron in which SR input timing is latched and used to drive the neuron's depolarization. By conditioning the depolarization on the reference input (which is treated differently from other inputs), the output timing may be determined in NSR form. This is explained in greater detail below.

Let the neuron $g_j^-$'s dynamics be defined by $$\frac{du_j(t)}{dt}=\alpha u_j(t)+y_{c^-(j)}(t)$$

$$\frac{d\bar{u}_j(t)}{dt}=\lambda\bar{u}_j(t)+u_j(t)y_{c^-(j)}(t)$$

$$\frac{dv_j^-(t)}{dt}=\beta v_j^-(t)+y_{c'(j)}(t)\hat{u}_j(t)$$

where $u_j$ is the input state, $\bar{u}_j$ is the input latch, and $v_j^-$ is the neuron membrane potential or neuron's state.

Taking the Laplace transform yields $$U_j(s)=\frac{u_j(0)+Y_{c^-(j)}(s)}{s-\alpha}$$

$$\bar{U}_j(s)=\frac{\bar{u}_j(0)+U_j(s)Y_{c^-(j)}(s)}{s-\lambda}$$

$$V_j^-(s)=\frac{v_j^-(0)+Y_{c1(j)}(s)}{s-\beta}$$

Let $c^-(j)=i$ and $y_r(t)=\delta(t-t_t^-)+\delta(t-t_t^-+\tau_t)$. Assuming $u_j(t_t^-  -\epsilon)=0$, $$U_j(s)=\frac{e^{-t_t^- s}}{s-\alpha}$$

Computing the inverse Laplace transform assuming $t\geq t_t^-+\tau_t$, $$u_j(t)=e^{\alpha(t-t_t^-)}$$

Assuming $\bar{u}_j(t_t^-+\epsilon)=0$ and $\lambda=0$, $$\bar{u}_j(t)=u_j(t_t^-\tau_t)=e^{\alpha\tau_t}$$

Further assuming initialization to $v_j(0)=0$, $$V_j^-(s) = \frac{e^{-t_{c1}^-(j)s+}e^{\alpha\tau_i}}{s-\beta}$$

Taking the inverse Laplace transform assuming $t \geq t_{c1(j)}^-$, $$v_j^-(t) = e^{\alpha\tau_i}e^{\beta(t-t_{c1(j)}^-)}$$

Defining the operation upon spiking as $v_j^-(t_j^+)=0, y_j(t_j^+)=1$ (otherwise $y_j(t_j^+)=0$) upon condition threshold $v_j^-(t=t_j^+) \geq \theta_j^-$, $$\tau_{ij} \triangleq (t_{c1(j)}^+ - t_{c1(j)}^-) = \frac{1}{\beta}[\log \hat{v}_j^- - \alpha\tau_i]$$

Accordingly, one can see that a transformation from SR $\tau_t$ to NSR $\tau_{tj}$ may be modeled as $$\tau_{ij} = g_{ij}^-(\tau_i) \triangleq \eta^- + \mu^-\tau_i$$

$$\eta^- = \frac{1}{\beta}\log \hat{v}_j^-, \mu^- = -\frac{\alpha}{\beta}$$

For linearity $\mu^-=1 \rightarrow \alpha=-\beta$. For equivalence, $\eta^-=0$. In contrast, however, let $$\eta^- = -T^- \rightarrow \theta_j^- = e^{-\beta T^-}$$

The same may be done in discrete time resolution $\Delta t$ analogously:

$$u_j(t) = (1+\Delta t\alpha)u_j(t-\Delta t) + y_{c^-(j)}(t-\Delta t)$$

$$\bar{u}_j(t) = (1+\Delta t\lambda)\bar{u}_j(t-\Delta t) + u_j(t-\Delta t)y_{c^-(j)}(t-\Delta t)$$

$$v_j^-(t) = (1+\Delta t\beta)v_j^-(t-\Delta t) + y_{c'(j)}(t-\Delta t)\bar{u}_j(t-\Delta t)$$

For delay resolution $\Delta\tau$, $$\bar{u}_{max} = (1+\Delta t\alpha)^{\Delta\tau/\Delta t}$$

$$\theta_j^- = (1+\Delta t\beta)^{\Delta\tau/\Delta t}\bar{u}_{max} = (1-(\Delta t\beta)^2)^{\Delta\tau/\Delta t}$$

Equating to above, $$e^{-\beta T^-} = (1-(\Delta t\beta)^2)^{\Delta\tau/\Delta t}$$

Therefore, $$\beta = -\frac{\Delta\tau}{T^-\Delta t}\log(1-(\Delta t\beta)^2)$$

Synthesizing in general one may select $\Delta t$ (e.g., $\Delta t=1$), $\Delta\tau$ (e.g., $\Delta\tau=T^-$), and $\alpha=-\beta=\log(1-(\Delta t\beta)^2) \cong 0.2$.

The $g_j^-$ neuron form (which nominally transforms SR input to NSR output) may thus be used in combination with (interfaced with) $g_j^+$ neuron forms (which nominally transform NSR-POST input to SR output). Effectively, one may connect these neurons to the opposite type. If these neurons are connected such that no neuron connects to a neuron of the same type, then there is no need for other forms of conversion between SR and NSR relative timing.

Characterization of ALIF Linearity with Number of Inputs

Figure 21:
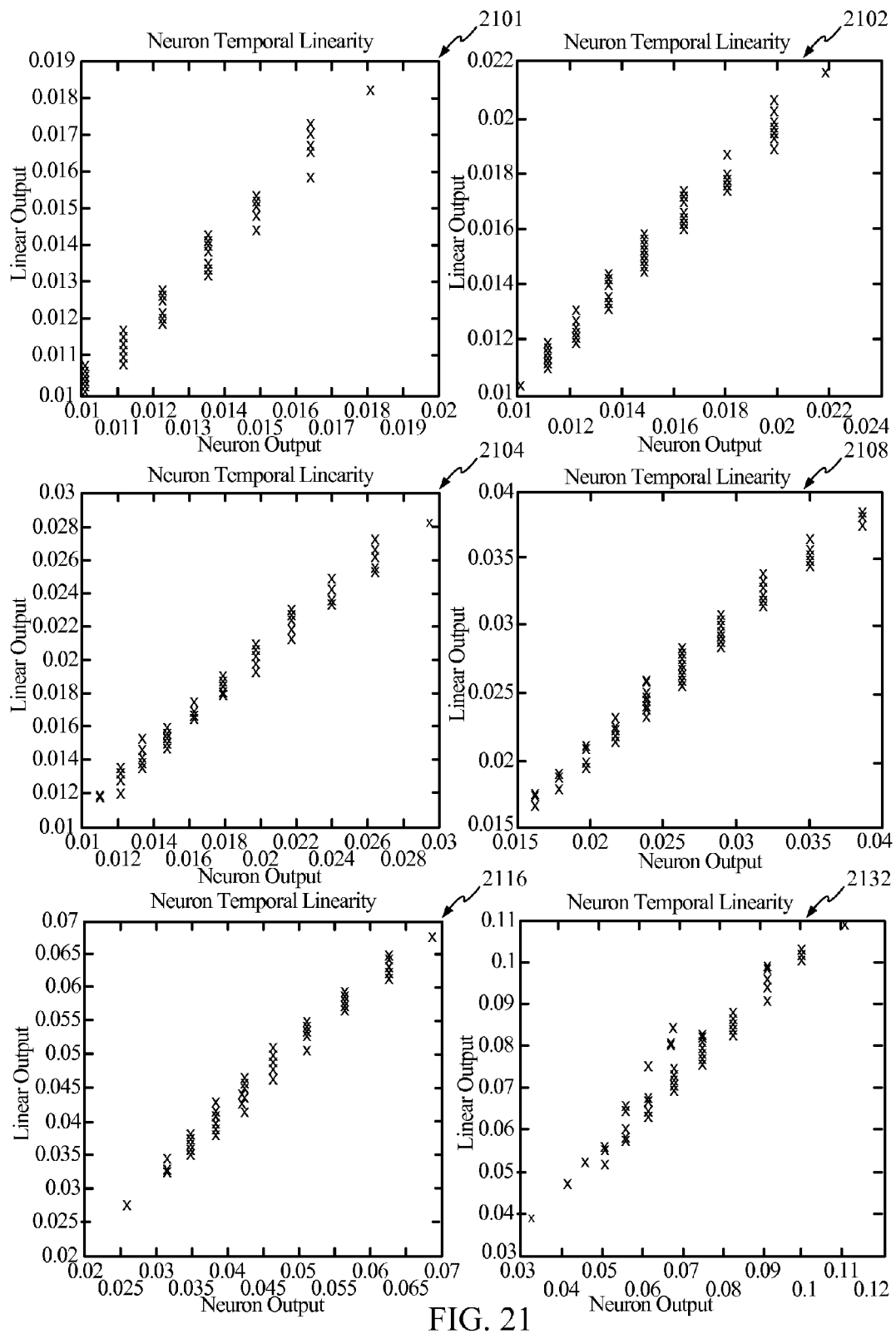
FIG. 21 illustrates linearity graphs for 1, 2, 4, 8, 16, and 32 inputs to a neuron model, in accordance with certain aspects of the present disclosure.

This section addresses characterization of the linearity of the neuron model described above with a varying number of inputs. For this characterization, random inputs and random coefficients are used. A discrete system is arbitrarily selected for this characterization, and for simplicity, a time resolution of $\Delta t=1$ ms is used. Linearity graphs 2101, 2102, 2104, 2108, 2116, and 2132 are shown in FIG. 21 for 1, 2, 4, 8, 16, and 32 inputs, respectively. As the number of inputs increases, the effective resolution increases because the range increases. However, the precision may decrease. This is merely a result of the uniform distribution. Note that the effect may vary depending upon the range of value of the output (and inputs and coefficients). The precision typically also improves radically with better time resolution, as was shown in examples above.

Why ALIF?

To a certain extent, LIF and other neuron models, including the simple model, have linearly predictable firing. The difference lies in the fidelity or accuracy with which one can predict using a linear predictor.

To understand why using an ALIF neuron is suggested, the $g_k^+$ neuron form is examined in the temporal domain:

$$g_k^+(\{\tau_{jk}\}_j) = \tau_k = -\log_q\left[\Delta\omega_k + \sum_j \omega_{jk}\left(\frac{1}{q}\right)^{\tau_{jk}}\right]$$

where $$q = (1+\Delta t\rho+)^{1/\Delta t}$$

If one chooses $\rho^+ > 0$ the model is ALIF. But, if one chooses $\rho^+ < 0$, the model is LIF. In effect, if $\rho^+ < 0$, then $q<1$ (i.e., a fraction), and $1/q>1$. A logarithm with a fractional base will be negative for any argument greater than one. The time to fire absent further input is $$t_k^{next} - t = \log_q(v_\theta/v_k^+(t))/\rho^+$$

Thus, for the time to be positive (causal), $v_k^+(t) > v_\theta$, which is contradictory because this means the neuron has already spiked (exceeded threshold). This does not mean a LIF is not somewhat predictable. It merely means that one cannot easily design the neuron model for ideal linear predictability using the LIF, as is done with the ALIF.

Figure 22:
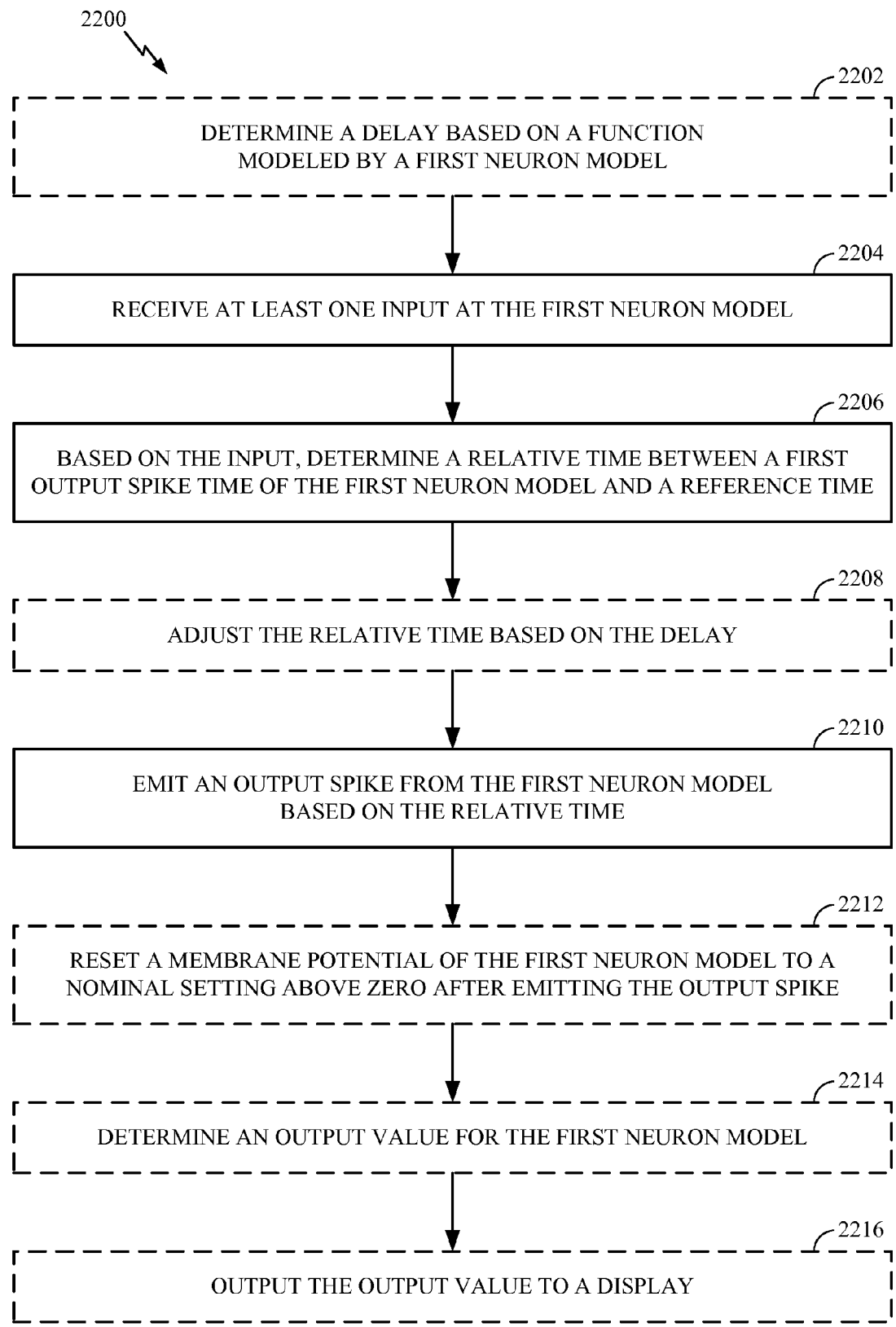
FIG. 22 is a flow diagram of example operations for emitting an output spike from a neuron model based on relative time, in accordance with certain aspects of the present disclosure.

FIG. 22 is a flow diagram of example operations 2200 for emitting an output spike from a neuron model based on relative time, in accordance with certain aspects of the present disclosure. The operations 2200 may be performed in hardware (e.g., by one or more processing units), in software, or in firmware.

The operations may begin, at 2204, by receiving at least one input at a first neuron model. The input may comprise an input in the spike-time domain, such as a binary-valued input spike or spike train. For certain aspects, the input may comprise an input in the real-value domain.

The first neuron model may be an ALIF neuron model, for example. For certain aspects, the first neuron model may have an exponentially growing membrane potential and may continue to depolarize in the absence of an inhibitory input. An excitatory input may cause the first neuron model to fire sooner than the first neuron model would fire without the excitatory input.

At 2206, a relative time between a first output spike time of the first neuron model and a reference time may be determined, based on the received input. When the input comprises an input value (as opposed to an input spike), determining the relative time at 2206 may include encoding the input value as the relative time. This encoding may comprise calculating the relative time as a negative of a logarithm of the input value, wherein the logarithm has a base equal to an exponential value of a coefficient of change of a membrane potential as a function of the membrane potential for the first neuron model.

At 2210, an output spike may be emitted from the first neuron model based on the relative time. For certain aspects, a membrane potential of the first neuron model may be reset to a nominal setting above zero at 2212, after emitting the output spike.

According to certain aspects, the reference time may comprise a second output spike time of the first neuron model, the second output spike time occurring before the first output spike time. For other aspects, the reference time may comprise a second output spike time of a second neuron model, wherein an output of the first neuron model is coupled to an input of the second neuron model and wherein the second output spike time occurs before the first output spike time. The first neuron model may have a first coefficient of change of a first membrane potential for the first neuron model, and the second neuron model may have a second coefficient of change of a second membrane potential for the second neuron model different than the first coefficient of change. For certain aspects, the second neuron model may use another reference time that is delayed from the reference time for the first neuron model.

For certain aspects, the operations 2200 may include determining a delay in the at least one input based on a function (e.g., a scaling function or other linear transformation) modeled by the first neuron model at 2202, which may, but need not, occur before receiving the at least one input at 2204. The relative time may be adjusted based on the delay at 2208, such that the output spike is emitted based on the adjusted relative time. For example, the function may comprise multiplication by a scalar, wherein determining the delay at 2202 comprises computing an absolute value of the scalar to determine the delay, wherein a synapse associated with the input to the first neuron model is used as an inhibitory synapse if the scalar is negative, and wherein the synapse associated with the input to the first neuron model is used as an excitatory synapse if the scalar is positive. For certain aspects, the function may be a learning function based on a homeostatic process or a target output delay, as described in greater detail below. According to certain aspects, determining the delay at 2202 may involve quantizing the delay to a desired temporal resolution, wherein adjusting the relative time at 2208 comprises adjusting the relative time based on the quantized delay. The precision of the function may depend on the temporal resolution.

According to certain aspects, receiving the input at 2204 may involve sampling the input with a sampling rate based on a desired temporal resolution. In such aspects, determining the relative time at 2206 may comprise quantizing the relative time to the temporal resolution.

For certain aspects, the operations 2200 may further comprise determining an output value for the first neuron model at 2214. The output value may be determined based on a time difference between a time of the emitted output spike and the reference time, wherein the output value is an inverse of an exponential value of a coefficient of change of a membrane potential for the first neuron model, the exponential raised to the power of the time difference before taking the inverse. At 2216, the output value may be output to a display or any other suitable means for indicating the output value.

Learning

Learning in spiking networks is typically modeled using a pair-wise spike-timing-dependent plasticity (STDP) rule comprising both long-term potentiation (LTP) and long-term depression (LTD). LTP increases synaptic weights, typically when the post-synaptic neuron fires after the pre-synaptic neuron. LTD decreases the synaptic weights, typically when the reverse order appears. Typically, an exponential model is used for both.

Specifically, with a basic STDP rule, the weight is increased if the post-synaptic spike time $t_{post}$ occurs after the pre-synaptic spike time $t_{pre}$ and decreased if the order is reversed. The changes may have different magnitudes as determined by the following equation:

$$\delta w = \beta_{LTP}(\Delta T > 0)e^{-|\Delta \tau|/\tau_{LTP}} + \beta_{LTD}(\Delta T < 0)e^{-|\Delta \tau|/\tau_{LTD}}$$

where $\Delta T = t_{post} - t_{pre}$ and $\beta$ values determine the learning rate for LTP and LTD and $\tau$'s are the time constants for the exponential decays of LTP and LTD (which may also differ).

However, in the general spiking neural computation described herein, weights are unnecessary. Nevertheless, connections may be muted (disconnected/disabled) and unmuted (reconnected/enabled). To understand how this fits with aspects of the present disclosure, one may consider the frame of reference. For certain aspects, information is coded temporally in the relative time between a spike and another spike (or a reference time). If an input arrives before a neuron fires (including synaptic delay), then the input may influence the firing time. However, if the input arrives after the neuron fires, the input may only impact the next firing (at most).

Figure 23:
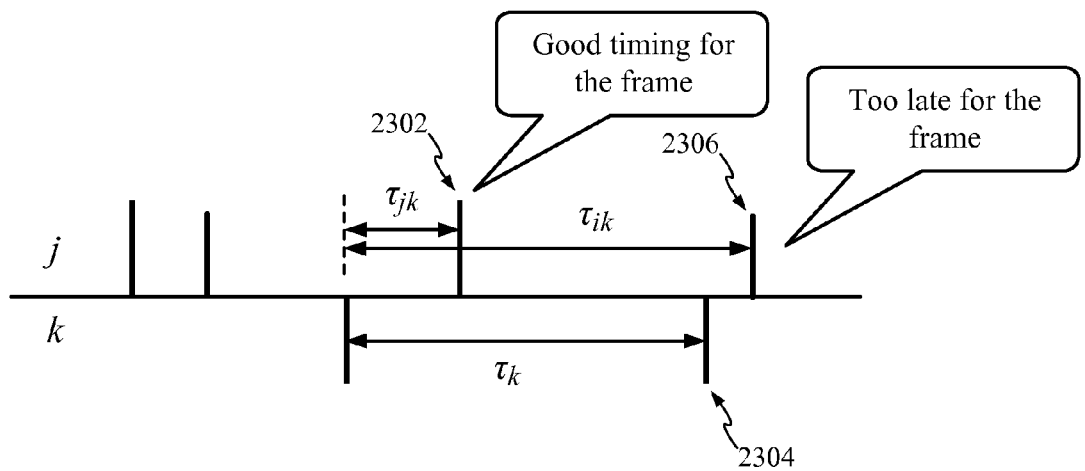
FIG. 23 illustrates an input spike that may likely influence firing of a post-synaptic neuron and another input spike that will not, in accordance with certain aspects of the present disclosure.

For example, as illustrated in FIG. 23, one input spike for post-synaptic neuron k (the output spike of neuron j at 2302 plus the connection delay) arrives before neuron k fires at 2304 and is timely to have an influence on the firing at 2304. Another input spike for post-synaptic neuron k (the output spike of neuron j at 2306 plus the connection delay) arrives after neuron k fires at 2304 and is too late for the frame to have any influence on this firing.

According to aspects of the present disclosure, in the value domain, $x = q^{-\tau}$, so a small value corresponds to a long time $\tau$ (since generally $q > 1$). Thus, if an input has a small enough value, it may by insignificant relative to the output (result), arriving too late to have any influence on the output spike timing. Above, various ways of preventing this late arrival from influencing the next firing time are described. However, there is also an automatic way of learning this, by applying an STDP-like rule to temporarily mute inputs that are effectively insignificant. If, later, that input becomes significant, then the synapse may be unmuted.

For certain aspects of the present disclosure, synaptic delay represents weight in the value domain. Learning the delay corresponds to learning a linear transformation. Therefore, a learning rule may be employed for learning value weights (coefficients) in the value domain, and these weights may be translated into delays (in the spike-timing domain).

Alternatively, adaptation may be applied directly to delays by transforming to the time domain and executing delay adaptation rules in the time domain.

To see how this may be accomplished, consider a neuron k which has an output delay $\tau_k$ for a given set of inputs. However, let the target output delay be $\hat{\tau}_k$. To obtain the target output delay, target input delays $\{\Delta \hat{t}_{jk}\}_j$ are desired according to the following:

$$\hat{\tau}_k = -\log_q\left[\Delta\omega_k + \sum_j \left(\frac{1}{q}\right)^{\tau_{jk}+\Delta\hat{t}_{jk}} \bigg/ v_\theta^+\right]$$

Taking the gradient results in $$\frac{\partial \hat{\tau}_k}{\partial \Delta \hat{t}_{ik}} = \frac{\left(\frac{1}{q}\right)^{\tau_{ik}+\Delta\hat{t}_{ik}}}{v_\theta^+ \Delta\omega_k + \sum_j \left(\frac{1}{q}\right)^{\tau_{jk}+\Delta\hat{t}_{jk}}}$$

Reversing leads to $$\frac{\partial \Delta \hat{t}_{ik}}{\partial \hat{\tau}_k} = v_\theta^+ \Delta\omega_k q^{\tau_{ik}+\Delta\hat{t}_{ik}} + 1 + \sum_{j\neq i} q^{(\tau_{ik}+\Delta\hat{t}_{ik})-(\tau_{jk}+\Delta\hat{t}_{jk})}$$

This provides a learning rule for the delays, $$\Delta\Delta\hat{t}_{ik} = \varphi\left[v_\theta^+ \Delta\omega_k q^{\tau_{ik}+\Delta\hat{t}_{ik}} + 1 + \sum_{j\neq i} q^{(\tau_{ik}+\Delta\hat{t}_{ik})-(\tau_{jk}+\Delta\hat{t}_{jk})}\right](\hat{\tau}_k - \tau_k)$$

which may be simplified (assuming $\Delta\omega_k \to 0$) to $$\Delta\Delta\hat{t}_{ik} = \varphi\left[\sum_j q^{(\tau_{ik}+\Delta\hat{t}_{ik})-(\tau_{jk}+\Delta\hat{t}_{jk})}\right](\hat{\tau}_k - \tau_k)$$

Assuming that the particular input i contribution to the denominator of the gradient above is small, one may combine and simplify even further to $$\Delta\Delta\hat{\tau}_{jk} = \phi q^{96_{jk}+\Delta\tau_{jk}}(\hat{\tau}_k - \tau_k)$$

which depends on the difference between the target firing time and the actual firing time, as well as the input time and the current delay. The parameter φ controls the adaptation rate.

Whichever version is used, it is recommended that delays not be adjusted for those inputs that have a time of arrival at the soma that is after the post-synaptic neuron firing time. Rather such inputs may either have no delay adjustment or be adjusted according to an STDP-like manner as described above (i.e., decremented by a very small amount).

Next, consider the target. The target depends only on what is desired from the neuron. The target may even be set arbitrarily, and the neuron may then be allowed to learn the coefficients for the inputs. Alternatively, one may choose a target purposely to make use of the non-linearity at the bounds of the range. The learning may be used to determine a logical relation of causal inputs or to compute any arbitrary linear equation.

Finally, it may be noted that the target may be interpreted as a homeostatic process regulating the firing rate, activity, or resource (energy) usage of the neuron. From this viewpoint, the delay learning rules may be called "homeostatic learning."

Example E

Learning Coefficients for Noisy Binary Inputs

Figure 24:
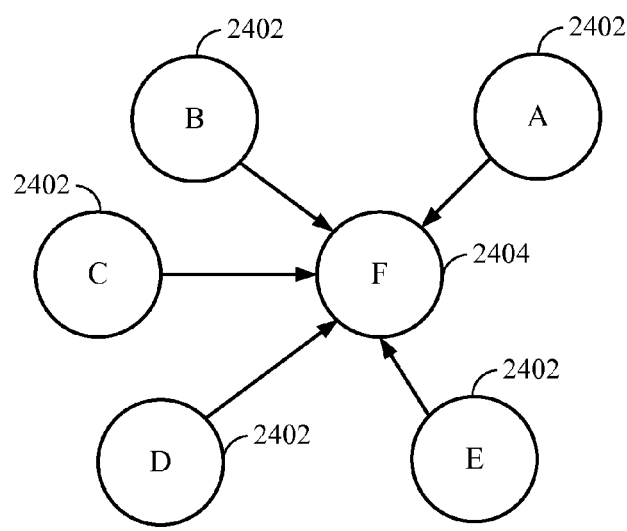
FIG. 24 illustrates five representative pre-synaptic neurons and a post-synaptic neuron, in accordance with certain aspects of the present disclosure.

In this example, the delay learning rule is used to learn coefficients for a noisy binary input vector. Suppose there are 15 inputs (pre-synaptic neurons) and one synapse/connection from each to a post-synaptic neuron (for a total of 15 inputs). By repeatedly exposing the post-synaptic neuron to the same binary input combination (chosen randomly), the delay learning rule allows the post-synaptic neuron to learn delays which result in firing at the desired target time. An early input (i.e., a short relative input time) may be used to represent a Boolean 1, and a late input (i.e., a long relative input time) may be used to represent a Boolean 0. FIG. 24 illustrates five representatives of the fifteen pre-synaptic neurons (A-E) 2402 and the post-synaptic neuron (F) 2404, in accordance with certain aspects of the disclosure.

All white Gaussian noise (AWGN) is added to the input in the temporal domain, with a standard deviation of 2.5 ms. This is a substantial amount of noise because it is a large fraction of the overall temporal range. However, aspects of the present disclosure are still able to successfully learn.

Figure 25A:
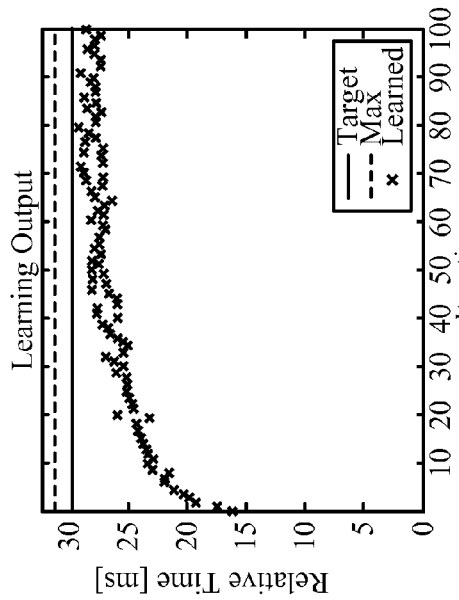
FIGS. 25A and 25B illustrate example results of learning coefficients for a noisy binary input vector, in accordance with certain aspects of the present disclosure.
Figure 25B:
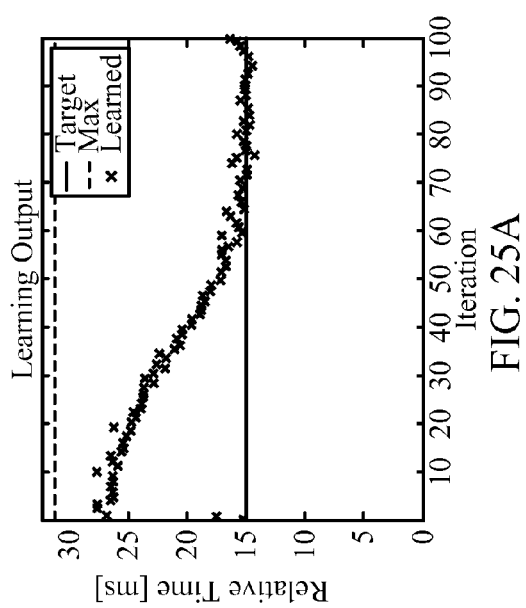

FIGS. 25A and 25B illustrate example results of learning the input delays to achieve a target output delay, in accordance with certain aspects of the disclosure. For demonstration purposes, two different cases are shown. In FIG. 25A, the delays are initialized large, and the target is set low. In FIG. 25B, the delays are initialized small, and the target is set high. In either case, learning is successful and fast.

Figure 26:
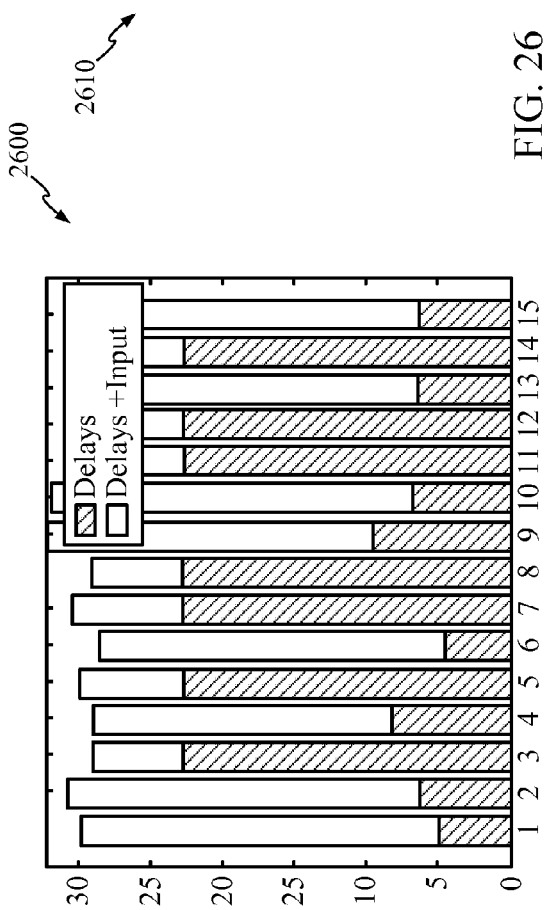
FIG. 26 illustrates example results of learning coefficients for a noisy binary input vector in graphs of the delays and the weights for each of the inputs, in accordance with certain aspects of the present disclosure.

FIG. 26 illustrates the result of learning coefficients for the noisy binary input vector in a graph 2600 of the delays (in ms) and in a graph 2610 of the coefficients (value-domain real-valued) for each of the inputs (x-axis), in accordance with certain aspects of the disclosure. Note that the delays have adapted to learn the input correspondence.

Example F

Learning Coefficients for Noisy Real-Valued Inputs

In this example, the delay learning rule is used to learn coefficients for a noisy real-valued input vector. This example is the same as the above example except that the values in the input vector are real-valued instead of Boolean.

FIG. 27 illustrates example results of learning coefficients for a noisy real-valued input vector, in accordance with certain aspects of the present disclosure. The results in the graphs 2700, 2710, and 2720 of FIG. 27 show that the delay learning rule works equally well for noisy real-valued inputs.

Example G

Learning Noisy Causal Logical Relations for Boolean Inputs

In this example, the delay learning rule is applied to learn the causal logical relation of a varying Boolean input vector. Here the input vector is changing over time, but a consistent logical relation in the input is imposed to see if the delay learning rule can learn what the logical relation is. In the first case, a set of three inputs are chosen (set to 1) to represent an OR relation. In the second case, all inputs are chosen (set to 1) to represent an AND relation. Noise is added as for the prior examples. For this example, the settings are the same as the previous examples.

FIG. 28A is a graph 2800 of the delays after the first iteration for an OR relation, while FIG. 28B is a graph 2810 of the delays after the first iteration for an AND relation. It may be noted that some of the delays are slightly increased from the initial value of 1 ms already after this single iteration. It may also be noted that the relation in the input may be seen. In FIG. 28A, only one of the pre-synaptic neurons fires early so only three of the inputs reach the soma early (~10 ms). The others are later (~0.25 ms). In FIG. 28B, all the pre-synaptic neurons fire early. However, the neuron does not yet fire at the target time; rather, it fires substantially early.

FIG. 29A is a graph 2900 of the delays after a number of iterations for the OR relation corresponding to FIG. 28A, while FIG. 29B is a graph 2910 of the delays after a number of iterations for the AND relation corresponding to FIG. 28B. Now, one can see that the post-synaptic neuron has learned delays which code the logical expression (OR or AND according to the input). Furthermore, the output time is on target (not shown in the figures). In FIG. 29A, one pre-synaptic early firing is sufficient (i.e., a logical OR) to cause the post-synaptic neuron to fire on target (the other inputs have delays that make them too late to have an effect, as can be seen given their total delay exceeds 30 ms (the target)). In FIG. 29B, the logical relation AND has been learned since all inputs are generally required for the post-synaptic neuron to fire on time. This most likely involves larger delays.

FIG. 30 illustrates the convergences (as a function of the number of iterations) for learning the logical relations. The graph 3000 illustrates the convergence for the logical OR relation, while the graph 3010 illustrates the convergence for the logical AND relation.

General Logical Condition or Causal Learning

Let $x_i$ be a Boolean value (0 or 1) representing a logical variable i which is either false or true (respectively). Let the true logical relation $\{i\} \to j$ be defined by a true cause function, $$x_j = f_C(\{i\} \to j)$$

For example, if only $A \wedge B \wedge \overline{C} \wedge \overline{D} \to E$ and $\overline{A} \wedge B \wedge C \wedge D \to E$, $$x_E = f_C(\{A,B,C,D\} \to E) = (x_A x_B (1-x_C)(1-x_D)) + ((1-x_A)(1-x_B)x_C x_D)$$

Let a linear transfer function be defined as follows:

$$h(a_j^k, \{i\}, n^k) = \sum_i a_{i,j}^k \left( \frac{1-n_i^k}{2} + n_i^k x_i \right)$$

where the k superscript indicates an instance of a set and $n^k$ is a negation permutation vector. This function yields a value representative of delay (although not necessarily a delay). A negation entry is coded as either negating −1 or non-negating +1. Effectively, this transforms the Boolean valued inputs to their negated values according to the vector $$h(a_j^k, \{i\}, n^k) = \frac{1}{2} \sum_i a_{i,j}^k (1 - n_i^k) + \sum_i (n_i^k a_{i,j}^k) x_i$$

Further, let coefficients $\alpha_j^k$ be defined such that the function above is equal to $\theta$ for logical variable combinations represented by $\{x_i\}$ that have a true logical implication (e.g., A, B, not C, and not D), so for all k the following expression is satisfied:

$$h(a_j^k, \{i\}, n^k) = \theta$$

This is equivalent to setting a target for the homeostatic learning as described above. Effectively the above target $\theta$ can be translated into an output delay target.

Substituting the above equations, $$\sum_i (n_i^k a_{i,j}^k) x_i = \theta - \frac{1}{2} \sum_i a_{i,j}^k (1 - n_i^k)$$

or $$\sum_i (n_i^k a_{i,j}^k)\left(x_i - \frac{1}{2}\right) = \theta - \frac{1}{2} \sum_i a_{i,j}^k$$

Or $$\sum_i (n_i^k a_{i,j}^k)(x_i') = \theta - \frac{1}{2} \sum_i a_{i,j}^k$$

Thus, with enough equations, given a number of unknowns $x_i$, a logical condition in the set $\{x_i\}$ may be recognized, for example, using another neuron which receives all the ensemble neuron outputs as inputs and fires upon a threshold (of coinciding input timing).

For example, consider some instances for the above example. With no negation a first neuron (labeled k=1) can learn coefficients to satisfy the true causation. However, it will also satisfy some other conditions, $$f_1(\{A, B, C, D\} \to E) =$$
$$(x_A \wedge x_B \wedge \overline{x_C} \wedge \overline{x_D}) \vee (\overline{x_A} \wedge x_B \wedge \overline{x_C} \wedge x_D) \vee (\overline{x_A} \wedge x_B \wedge \overline{x_C} \wedge x_D) \vee$$
$$(x_A \wedge \overline{x_B} \wedge \overline{x_C} \wedge x_D) \vee (\overline{x_A} \wedge x_B \wedge x_C \wedge \overline{x_D}) \vee (x_A \wedge \overline{x_B} \wedge x_C \wedge \overline{x_D})$$

This is because $a_{i,j}^1 = \theta/2$ for each variable in the above example if $n_i^1 = +1$ for all i. Thus, the true cause may not be unambiguously detected. However, if another neuron (labeled k=2) is added, $$f_1(\{\overline{A}, B, \overline{C}, D\} \to E) =$$
$$(x_A \wedge x_B \wedge \overline{x_C} \wedge \overline{x_D}) \vee (\overline{x_A} \wedge \overline{x_B} \wedge x_C \wedge x_D) \vee (\overline{x_A} \wedge x_B \wedge \overline{x_C} \wedge x_D) \vee$$
$$(x_A \wedge \overline{x_B} \wedge \overline{x_C} \wedge x_D) \vee (x_A \wedge x_B \wedge x_C \wedge x_D) \vee (x_A \wedge \overline{x_B} \wedge \overline{x_C} \wedge \overline{x_D})$$

Here it may be seen that in combination, the two neurons may be used to reduce the ambiguity because in combination, there are only four overlapping logical conditions (the first four). With more neurons, the ambiguity may be eliminated altogether. However, one may also find a negation vector that has no ambiguity for this particular logical condition:

$$f_3(\{A, \overline{B}, \overline{C}, D\} \to E) = (x_A \wedge x_B \wedge \overline{x_C} \wedge \overline{x_D}) \vee (\overline{x_A} \wedge \overline{x_B} \wedge x_C \wedge x_D)$$

In this case, there is no need for multiple neurons because this neuron will fire at the desired delay only if the logical conditions corresponding to the true cause are met.

In general however, one may be motivated to have a solution for any particular logical condition that may arise. For this, an ensemble of neurons with different negation vectors may be utilized. One may then feed their output to a temporal coincidence recognition neuron that detects when enough of these neurons fire at the same time, thereby recognizing the logical condition corresponding to true cause unambiguously. Having enough neurons typically refers to a state or condition when the population of neurons distinguishes true and false logical conditions (i.e., when the neurons together, measured by coincidence firing to a predetermined time precision, can correctly predict either the cause-effect relation, the lack of the effect, or both to a desired degree or accuracy).

Figure 31:
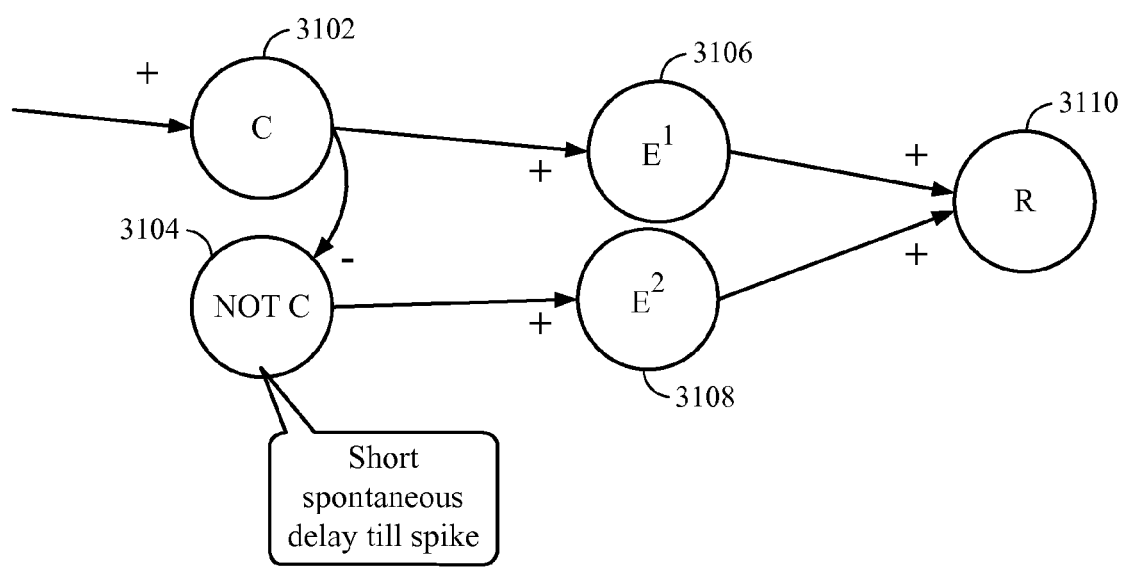
FIG. 31 illustrates implementing both negation and ensemble deduction for learning in a spiking neural network, in accordance with certain aspects of the present disclosure.

FIG. 31 illustrates how both negation and ensemble deduction may be implemented, in accordance with certain aspects of the disclosure. Neuron C 3102 is an example of one input. Neuron C inhibits neuron (Not C) 3104 representing neuron C's negation. Note that if neuron C fires late, neuron (Not C) will fire first. Recall that a short delay means a large value (a logical "true") and a long delay means a small value (a logical "false"). Each is an input to a different neuron with different negation vectors (i.e., neuron $E^1$ 3106 uses non-negated C, and neuron $E^2$ 3108 uses negated C). A third neuron $E^3$ (not shown), if used, may use either non-negated C or negated C, depending on the negation vector for $E^3$. Furthermore, each of the learning neurons 3106, 3108 may have other input, whether negated or non-negated (e.g., neuron A, neuron (Not A), neuron B, neuron (Not B), neuron D, or neuron (Not D)), according to the negation vector for each learning neuron. The delays associated with each input are adapted in the learning neurons to meet a target output delay, as described above. The outputs of these learning neurons 3106, 3108 are fed as inputs to the neuron R 3110, which is able to recognize a temporal coincidence in their outputs (i.e., if neurons $E^1$ and $E^2$ agree as to the logical condition match).

Hebbian Learning

Hebbian learning is a form of learning in which inputs and outputs fire together. A simple form of Hebbian learning rule is the STDP rule, $$\Delta w_{tk} = A_{stgn(\Delta T)} e^{-|\Delta T|/\tau_{stgn(\Delta T)}}$$

where $\Delta T = t_{post} - t_{pre} = t_k - t_t = \tau_{kr} - \tau_{tr}$ where r is a reference providing a time reference. Assuming a multiplicative change, $w_{tk}' = w_{tk}(1 + \Delta w_{tk})$, converting to the temporal domain, $$q^{-\Delta \tau_{jk}'} = q^{-\Delta \tau_{jk}}(1 + \Delta w_{tk})$$

or $$\Delta\Delta\tau_{jk} = \Delta\tau'_{jk} - \Delta\tau_{jk} = -\log_q(1 + \Delta w_{tk})$$

Thus, $$\Delta\Delta\tau_{jk} = -\log_q(1 + A_{stgn(\Delta T)} e^{-|\Delta T|/\tau_{stgn(\Delta T)}})$$

Accordingly, Hebbian learning may be used in the temporal domain, adjusting the delays depending on the input/output spike timing $\Delta T$, without any weights. Notice that the larger the value of $\Delta T$, the closer the value of the log parameter to 1, and thus, the smaller the change in delay. An increase in weight according to long-term potentiation (LTP) has a positive A value for positive $\Delta T$ and thus, the log parameter will be larger than one yielding a negative change (increase) in the delay. A decrease in weight according to long-term depression (LTD) has a negative A value for negative $\Delta T$ and thus, the log parameter will be less than one yielding a positive change (increase) in the delay. Longer delay means less significant input. Shorter delay means more significant input.

Figure 32:
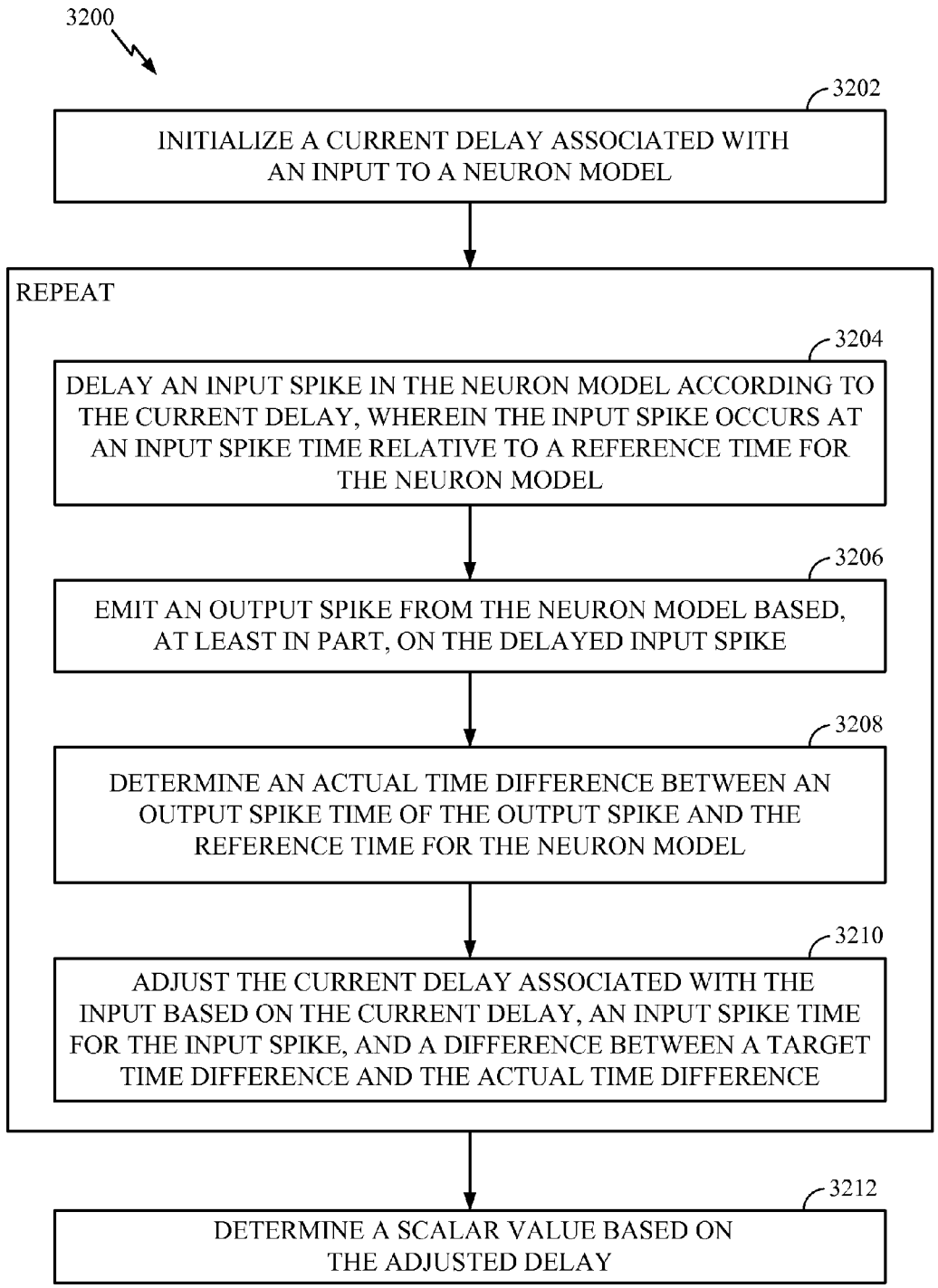
FIG. 32 is a flow diagram of example operations for learning in a spiking neural network, in accordance with certain aspects of the present disclosure.
Figure 32A:
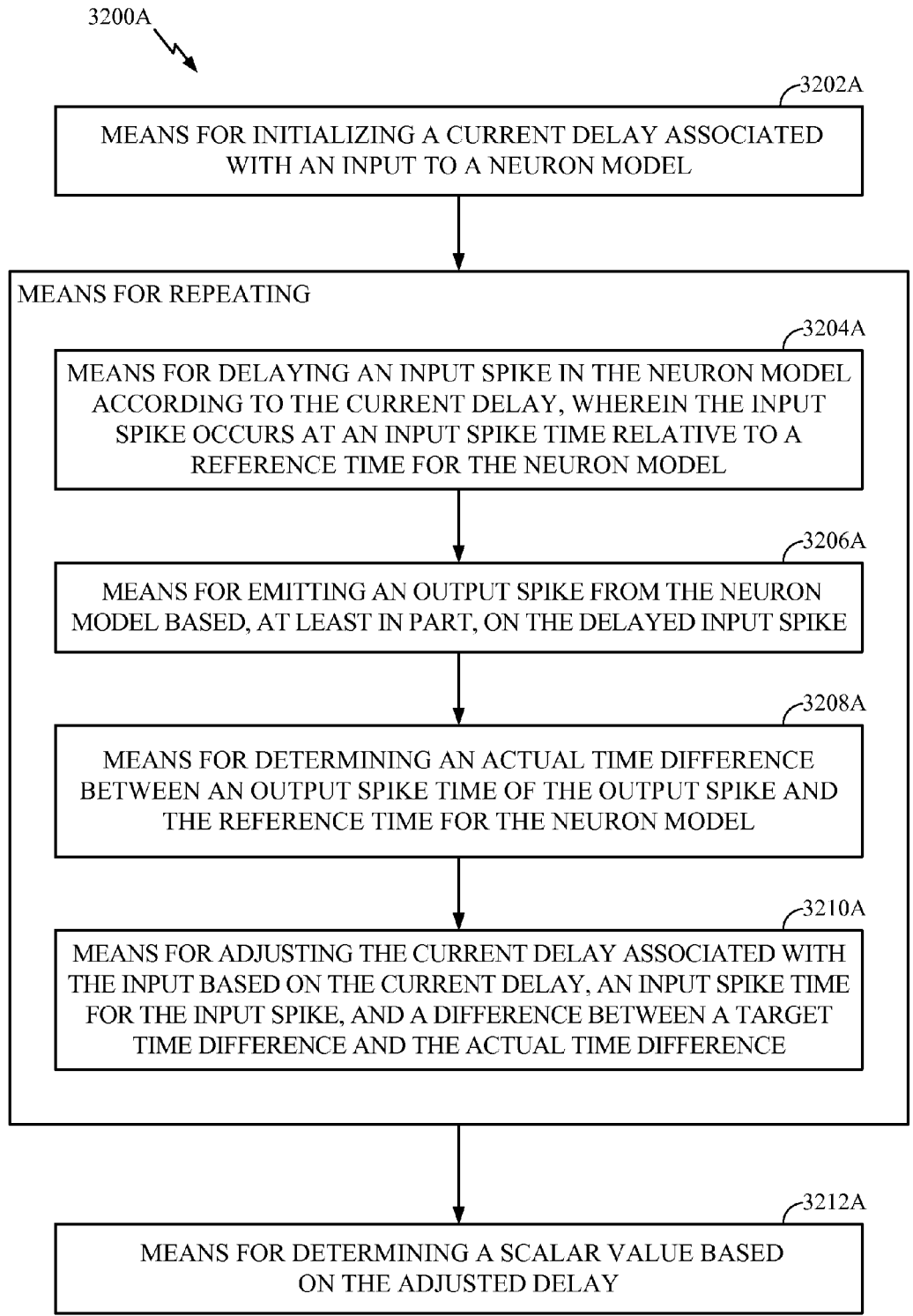
FIG. 32A illustrates example means capable of performing the operations shown in FIG. 32.

FIG. 32 is a flow diagram of example operations 3200 for learning in a spiking neural network for emitting an output spike, in accordance with certain aspects of the present disclosure. The operations 3200 may be performed in hardware (e.g., by one or more processing units), in software, or in firmware.

The operations 3200 may begin, at 3202, by initializing a current delay associated with an input (e.g., a dendrite) to a neuron model. The current delay may be initialized to 0 for certain aspects.

At 3204, an input spike in the neuron model may be delayed according to the current delay. The input spike may occur at an input spike time relative to a reference time for the neuron model. At 3206, an output spike may be emitted from the neuron model based, at least in part, on the delayed input spike. At 3208, an actual time difference between an output spike time of the output spike and the reference time for the neuron model may be determined.

At 3210, the current delay associated with the input may be adjusted based on the current delay, an input spike for the input spike, and a difference between a target time difference and the actual time difference. If the difference between the target time difference and the actual time difference is greater than a threshold or the number of iterations has not reached the upper limit, the operations at 3204-3210 may be repeated with the adjusted delay (as the current delay). The operations at 3204-3210 may be repeated a number of times, at least until the difference between the target time difference and the actual time difference is less than or equal to the threshold or until a maximum number of iterations has been performed (i.e., the number of iterations has reached the upper limit). According to certain aspects, the target time difference may be a setpoint for a homeostatic process involving the neuron model, as described above.

At 3212, a scalar value may be determined based on the adjusted delay. In other words, the scalar value was learned by the neuron model. The scalar value may be determined as the inverse of an exponential value of a coefficient of change of a membrane potential for the neuron model, the exponential raised to the power of the adjusted delay before taking the inverse. For certain aspects, the scalar value may be a coefficient of a linear transformation. For certain aspects, the scalar value may be output to a display or any other suitable means for indicating the scalar value.

Figure 33:
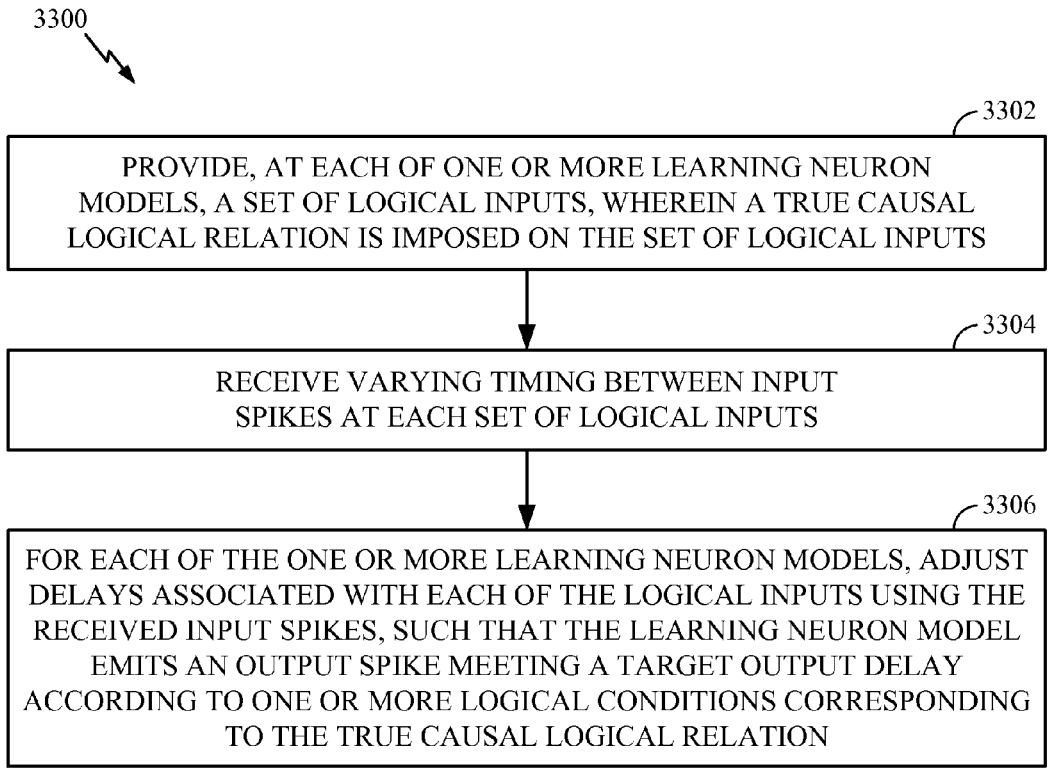
FIG. 33 is a flow diagram of example operations for causal learning in a spiking neural network, in accordance with certain aspects of the present disclosure.
Figure 33A:
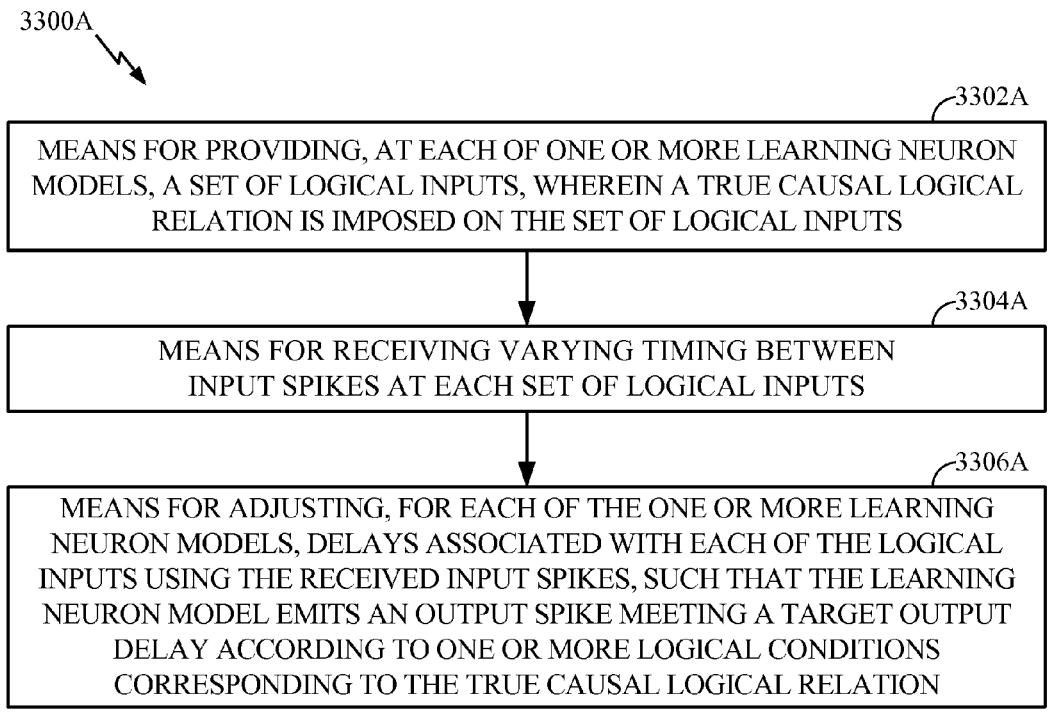
FIG. 33A illustrates example means capable of performing the operations shown in FIG. 33.

FIG. 33 is a flow diagram of example operations 3300 for causal learning in a spiking neural network, in accordance with certain aspects of the present disclosure. The operations 3300 may be performed in hardware (e.g., by one or more processing units), in software, or in firmware.

The operations 3300 may begin, at 3302, by providing, at each of one or more learning neuron models, a set of logical inputs, wherein a true causal logical relation is imposed on the set of logical inputs. At 3304, varying timing between input spikes may be received at each set of logical inputs. For each of the one or more learning neuron models, delays associated with each of the logical inputs may be adjusted at 3306 using the received input spikes, such that the learning neuron model emits an output spike meeting a target output delay according to one or more logical conditions corresponding to the true causal logical relation.

For each of the one or more learning neuron models, the delays associated with each of the logical inputs may be initialized before adjusting the delays at 3306, for certain aspects, According to certain aspects, providing the set of logical inputs at 3302 may include selecting each set of logical inputs from a group comprising a plurality of logical inputs. For certain aspects, the group may also include negations of the plurality of logical inputs, wherein selecting each set of logical inputs comprises selecting each set of logical inputs from the group comprising the plurality of logical inputs and the negations.

The operations 3300 may further include modeling each of the plurality of logical inputs as an input neuron model and, for each of the plurality of logical inputs, providing a negation neuron model representing a negation of the logical input if at least one of one or more negation vectors has a negation indication for the logical input, wherein each set of logical inputs is selected according to one of the negation vectors. In this case, each learning neuron model may correspond to one of the negation vectors and, for each of the plurality of logical inputs, an output of the input neuron model or of its corresponding negation neuron model may be coupled to an input of the learning neuron model according to the negation vector. For certain aspects, each of the input neuron models may inhibit the corresponding negation neuron model. For certain aspects, the negation indication may comprise a −1.

The operations 3300 may further include determining that the one or more learning neuron models have learned the one or more logical conditions corresponding to the true causal logical relation based on timing of the output spikes from the learning neuron models. For certain aspects, this determining may include determining a coincidence or a pattern of firing among the learning neuron models.

According to certain aspects, a temporal coincidence recognition neuron model may be coupled to an output from each of the learning neuron models. The temporal coincidence recognition neuron model may be configured to fire if a threshold number of the learning neuron models fire at about the same time. The operations 3300 may further include determining that the one or more learning neuron models have learned at least one of the logical conditions corresponding to the true causal logical relation if the temporal coincidence recognition neuron model fires.

According to certain aspects, receiving the varying timing between the input spikes at each set of logical inputs at 3304 may comprise receiving a varying Boolean vector at the set of logical inputs. For certain aspects, a relatively short delay represents a logical TRUE and a relatively long delay represents a logical FALSE in the varying Boolean vector.

For certain aspects, the adjusted delays, the one or more logical conditions, and/or the true causal logical relation may be output to a display or any other suitable means for indicating these. For certain aspects, the learning neuron models may comprise ALIF neuron models.

CONCLUSION

By coding information in the relative time of spikes, there may actually be a computational advantage to using spiking neurons. Thus, a neuron model (a type of simulator design) is described herein which can efficiently simulate temporal coding in spiking neural networks to an arbitrary precision.

As described above, any linear system may be computed using the spiking neuron model disclosed herein using a logarithmic transformation into relative temporal codes. The information content of any individual spike is limited only by time resolution so a single neuron model may compute a linear transformation of arbitrary precision yielding the result in one spike. Certain aspects use an anti-leaky-integrate-and-fire (ALIF) neuron as an exemplary neuron model with no synaptic weights or post-synaptic filters. Computation may occur in a log-value domain using temporal delays and conversion between self-referential (SR) spike timing and non-self-referential (NSR) spike timing. Multiple means of achieving this are described above, including conversion using a second neuron model or using a method of propagating a reference time frame wave, much like a biological oscillation. Since weight multiplication need not be performed and post-synaptic filters need not be computed, a highly efficient method of computing neuron output in continuous or discrete time is possible.

Furthermore, a spiking neural network may be simulated in software or hardware using an event-based schedule including two types of events: (1) delayed synaptic input events and (2) expected future spike time events. When a pre-synaptic neuron fires, an event may be scheduled for each post-synaptic neuron at a time in the future depending on the axonal or dendritic delay between the neurons. When an input event occurs, a neuron's state may be updated directly since the prior update rather than in time steps. The input may be added, and a future firing time may be computed directly. This may be infinite if the neuron will not fire given the current state. Regardless, a future firing time event may be re-scheduled. In this way, arbitrarily high precision in timing (even continuous time) may be simulated without any additional cost, thereby reducing power consumption.

Figure 22A:
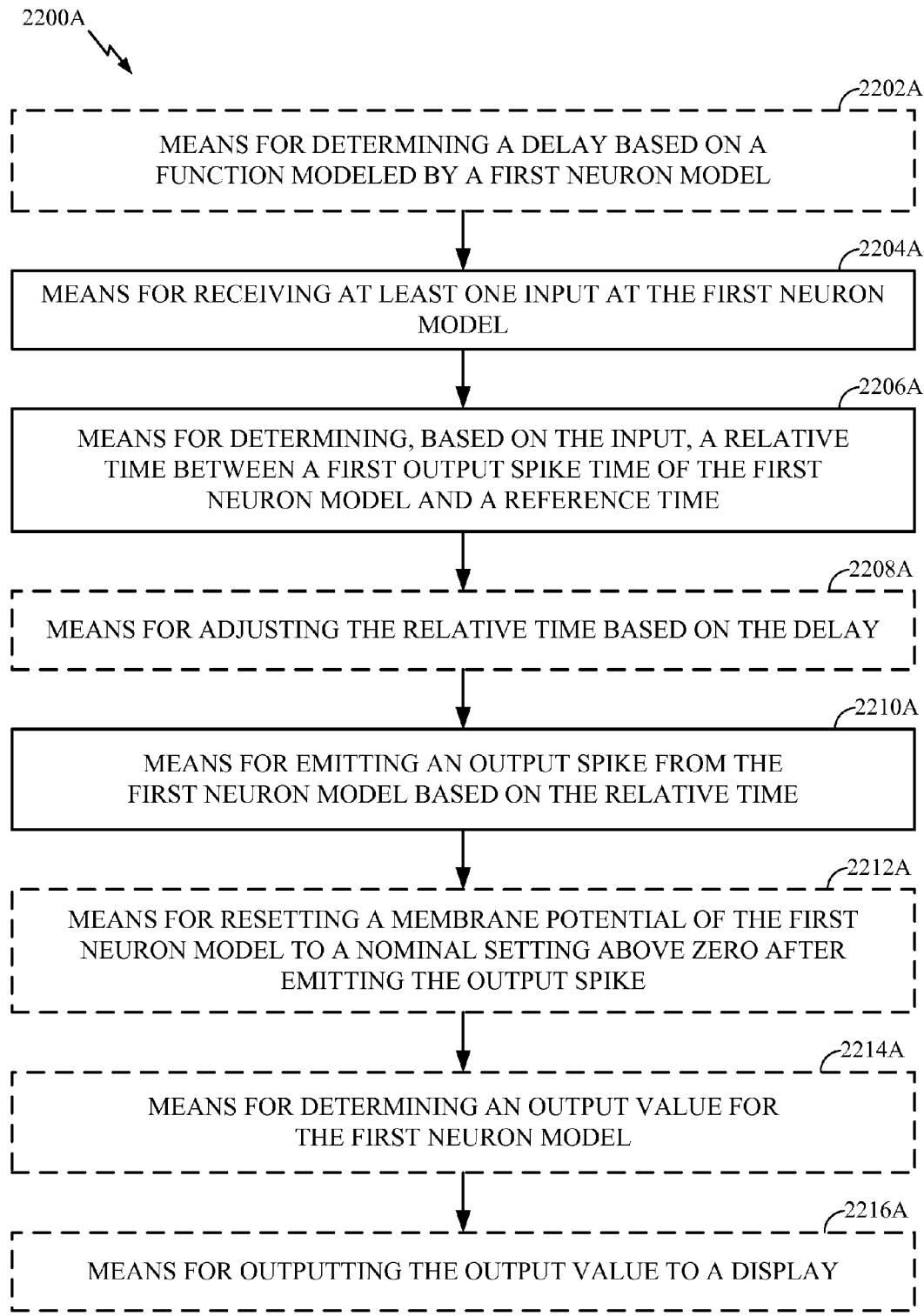
FIG. 22A illustrates example means capable of performing the operations shown in FIG. 22.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 2200 illustrated in FIG. 22 correspond to means 2200A illustrated in FIG. 22A.

For example, the means for indicating may comprise a display (e.g., a monitor, flat screen, touch screen, and the like), a printer, or any other suitable means for indicating a value. The means for processing, means for receiving, means for emitting, means for adding, means for outputting, means for resetting, means for delaying, means for adjusting, means for repeating, means for initializing, means for modeling, means for providing, or means for determining may comprise a processing system, which may include one or more processors.

As used herein, the term "determining" encompasses a wide variety of actions: For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example; a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of learning using a spiking neural network, comprising:
   (a) delaying an input spike in an artificial neuron according to a current delay associated with an input to the artificial neuron, wherein the input spike occurs at an input spike time relative to a reference time for the artificial neuron;
   (b) emitting an output spike from the artificial neuron based, at least in part, on the delayed input spike;
   (c) determining an actual time difference between the emission of the output spike from the artificial neuron and the reference time for the artificial neuron; and
   (d) adjusting the current delay associated with the input based on a difference between a target time difference and the actual time difference, the current delay, and an input spike time for the input spike.

2. The method of claim 1, further comprising:
   initializing the current delay before delaying the input spike.

3. The method of claim 1, further comprising:
   repeating (a)-(d) with the adjusted current delay, at least until the difference between the target time difference and the actual time difference is less than or equal to a threshold or until a maximum number of iterations has been performed.

4. The method of claim 1, further comprising:
   determining a scalar value based on the adjusted current delay, wherein the scalar value is an inverse of an exponential value of a coefficient of change of a membrane potential for the artificial neuron, the exponential raised to a power of the adjusted current delay before taking the inverse.

5. The method of claim 4, wherein the scalar value is a coefficient of a linear transformation.

6. The method of claim 1, wherein the target time difference is a setpoint for a homeostatic process involving the artificial neuron.

7. The method of claim 1, wherein the artificial neuron has an exponentially growing membrane potential and continues to depolarize in an absence of an inhibitory input and wherein an excitatory input causes the artificial neuron to fire sooner than the artificial neuron would fire without the excitatory input.

8. The method of claim 1, wherein the reference time for the artificial neuron occurs at a time delayed from another artificial neuron.

9. An apparatus for learning using a spiking neural network, comprising:
   a processing unit configured to:
      (a) delay an input spike in an artificial neuron according to a current delay associated with an input to the artificial neuron, wherein the input spike occurs at an input spike time relative to a reference time for the artificial neuron;
      (b) emit an output spike from the artificial neuron based, at least in part, on the delayed input spike;
      (c) determine an actual time difference between the emission of the output spike from the artificial neuron and the reference time for the artificial neuron; and
      (d) adjust the current delay associated with the input based on a difference between a target time difference and the actual time difference, the current delay, and an input spike time for the input spike.

10. The apparatus of claim 9, wherein the processing unit is further configured to:
    initialize the current delay before delaying the input spike.

11. The apparatus of claim 9, wherein the processing unit is further configured to:
    repeat (a)-(d) with the adjusted current delay, at least until the difference between the target time difference and the actual time difference is less than or equal to a threshold or until a maximum number of iterations has been performed.

12. The apparatus of claim 9, wherein the processing unit is further configured to:
    determine a scalar value based on the adjusted current delay, wherein the scalar value is an inverse of an exponential value of a coefficient of change of a membrane potential for the artificial neuron, the exponential raised to a power of the adjusted current delay before taking the inverse.

13. The apparatus of claim 12, wherein the scalar value is a coefficient of a linear transformation.

14. The apparatus of claim 9, wherein the target time difference is a setpoint for a homeostatic process involving the artificial neuron.

15. The apparatus of claim 9, wherein the artificial neuron has an exponentially growing membrane potential and continues to depolarize in an absence of an inhibitory input and wherein an excitatory input causes the artificial neuron to fire sooner than the artificial neuron would fire without the excitatory input.

16. An apparatus for learning using a spiking neural network, comprising:

(a) means for delaying an input spike in an artificial neuron according to a current delay associated with an input to the artificial neuron, wherein the input spike occurs at an input spike time relative to a reference time for the artificial neuron;
(b) means for emitting an output spike from the artificial neuron based, at least in part, on the delayed input spike;
(c) means for determining an actual time difference between the emission of the output spike from the artificial neuron and the reference time for the artificial neuron; and
(d) means for adjusting the current delay associated with the input based on a difference between a target time difference and the actual time difference, the current delay, and an input spike time for the input spike.

17. The apparatus of claim 16, further comprising:
means for initializing the current delay before delaying the input spike.

18. The apparatus of claim 16, further comprising:
means for repeating (a)-(d) with the adjusted current delay, at least until the difference between the target time difference and the actual time difference is less than or equal to a threshold or until a maximum number of iterations has been performed.

19. The apparatus of claim 16, further comprising:
means for determining a scalar value based on the adjusted current delay, wherein the scalar value is an inverse of an exponential value of a coefficient of change of a membrane potential for the artificial neuron, the exponential raised to a power of the adjusted current delay before taking the inverse.

20. The apparatus of claim 19, wherein the scalar value is a coefficient of a linear transformation.

21. The apparatus of claim 16, wherein the target time difference is a setpoint for a homeostatic process involving the artificial neuron.

22. The apparatus of claim 16, wherein the artificial neuron has an exponentially growing membrane potential and continues to depolarize in an absence of an inhibitory input and wherein an excitatory input causes the artificial neuron to fire sooner than the artificial neuron would fire without the excitatory input.

23. A computer-program product for learning using a spiking neural network, comprising a non-transitory computer-readable medium comprising instructions executable to:

(a) delay an input spike in an artificial neuron according to a current delay associated with an input to the artificial neuron, wherein the input spike occurs at an input spike time relative to a reference time for the artificial neuron;
(b) emit an output spike from the artificial neuron based, at least in part, on the delayed input spike;
(c) determine an actual time difference between the emission of the output spike from the artificial neuron and the reference time for the artificial neuron; and
(d) adjust the current delay associated with the input based on a difference between a target time difference and the actual time difference, the current delay, and an input spike time for the input spike.

24. The computer-program product of claim 23, further comprising instructions executable to:
initialize the current delay before delaying the input spike.

25. The computer-program product of claim 23, further comprising instructions executable to:
repeat (a)-(d) with the adjusted current delay, at least until the difference between the target time difference and the actual time difference is less than or equal to a threshold or until a maximum number of iterations has been performed.

26. The computer-program product of claim 23, further comprising instructions executable to:
determine a scalar value based on the adjusted current delay, wherein the scalar value is an inverse of an exponential value of a coefficient of change of a membrane potential for the artificial neuron, the exponential raised to a power of the adjusted current delay before taking the inverse.

27. The computer-program product of claim 26, wherein the scalar value is a coefficient of a linear transformation.

28. The computer-program product of claim 23, wherein the target time difference is a setpoint for a homeostatic process involving the artificial neuron.

29. The computer-program product of claim 23, wherein the artificial neuron has an exponentially growing membrane potential and continues to depolarize in an absence of an inhibitory input and wherein an excitatory input causes the artificial neuron to fire sooner than the artificial neuron would fire without the excitatory input.

* * * * *